US010410223B2

(12) United States Patent
Hillerbrand et al.

(10) Patent No.: US 10,410,223 B2
(45) Date of Patent: Sep. 10, 2019

(54) ONLINE SOCIAL NETWORKING SYSTEM FOR CONDUCTING COMMERCE

(75) Inventors: Eric Thomas Hillerbrand, Wilmette, IL (US); Kelly Joseph Wical, Arlington Heights, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 646 days.

(21) Appl. No.: 12/755,702

(22) Filed: Apr. 7, 2010

(65) Prior Publication Data

US 2010/0262477 A1 Oct. 14, 2010

Related U.S. Application Data

(60) Provisional application No. 61/212,171, filed on Apr. 8, 2009.

(51) Int. Cl.
*G06Q 30/00* (2012.01)
*G06Q 30/02* (2012.01)
*G06Q 30/06* (2012.01)
*G06Q 50/00* (2012.01)

(52) U.S. Cl.
CPC ......... *G06Q 30/02* (2013.01); *G06Q 30/0214* (2013.01); *G06Q 30/0601* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2009/0132311 A1* | 5/2009 | Klinger et al. | 705/7 |
| 2009/0198581 A1* | 8/2009 | Lidestri | 705/14 |

* cited by examiner

*Primary Examiner* — Yehdega Retta
(74) *Attorney, Agent, or Firm* — McAndrews, Held & Malloy, Ltd.

(57) ABSTRACT

An online social networking system for conducting commerce utilizes a grid environment, a widget architecture including a widget operating system, and semantic integration technologies to provide personalized bundling of products and services tied to an individual's life, emergent marketplaces that support collaboratively-based product and service development, merchandising, and recommendations, emergent user experiences, emergent gaming, emergent behavior predictions, collaborative discovery, i.e., social searching, and content and/or people voyeurism. These features are achieved through the use of various techniques including emergent programming, emergent widget processing, emergent computations, emergent applications, widget composition, data integration and exchange, complex system management, security graphs, trust/reputation management, intersecting graphs, database sharding, use of fractal graphs (which may be thinned and expanded), and content mashups.

20 Claims, 48 Drawing Sheets

ONLINE SOCIAL NETWORKING SYSTEM FOR CONDUCTING COMMERCE

RELATED APPLICATION INFORMATION

This application claims the benefit of U.S. Provisional Application No. 61/212,171, filed on Apr. 8, 2009, which provisional application is incorporated herein by reference in its entirety.

SUMMARY

The subject invention is directed to an online social networking system for conducting commerce which utilizes a grid environment, a widget architecture including a widget operating system, and semantic integration technologies to provide, among other features, personalized bundling of products and services tied to an individual's life, emergent marketplaces that support collaboratively-based product and service development, merchandising, and recommendations, emergent user experiences, emergent gaming, emergent behavior predictions, collaborative discovery, i.e., social searching, content and/or people voyeurism, and the like. As will become apparent from the descriptions that follow, these various features are achieved through the use of various techniques including, but not limited to, emergent programming, emergent widget processing, emergent computations, emergent applications, widget composition, data integration and exchange, complex system management, security graphs, trust/reputation management, intersecting graphs, database sharding, use of fractal graphs (which may be thinned and expanded), and content mashups.

More particularly, the subject invention seeks to overcome several trends that are currently seen as disrupting Internet based commerce models. These trends include the way: 1) the increased role of online social networks and social media affects consumer thinking and behavior making it more difficult for a retailer to control communication with consumers; 2) the increased fragmentation of the Internet through the use of micro-sites and widget architectures making it more difficult for a retailer to provide centralized control and access; 3) the increased number of online identities that a consumer manages and the pressure on profile holders to allow consumers to integrate and control their own data making it more difficult for retailers to control consumer data; 4) the increased use of open standards, data stores and services which pushes expectation for openness and free data exchange making it more difficult for retailers to maintain exclusivity; and 5) the increase of new technologies that allow consumer's opportunities to gain personalized intelligence and insight, and build customized compositions of services, increasing demands on retailers to provide customized bundles of products and services based on an individual's lifestyle. These trends are each discussed below.

First, the increased role of social network and social media is affecting how consumers obtain and use commerce related information. Through various social network and social media applications consumers now have options to create and consume media that is shared across a network of other consumers. This information distribution model provides limited opportunities for a brand owner to control brand-related information. In the future, a user's social network will be less of a formalized, explicitly defined set of relationships but will instead be a dynamic connection to people that are relevant to that user in a specific context (e.g., coffee shop, at home, at church). A contextually defined network of relationships will therefore become increasingly ubiquitous. The dynamism of the contextual networks will create even greater difficulty for brand owners in controlling their message.

Second, the increased fragmentation and specialization of the Internet will make finding these dynamically configured networks more and more difficult. While dominant applications (e.g., Google, Facebook, etc.) will prevail, users will interact with more and more specialized applications and services that connect them to other users as part of specific life tasks or need states. These context specific applications will be shared across specialized networks. For example, a baby sitting scheduling service may be shared throughout a specific community based on geography. The increased fragmentation will mean that consumers will look to have commercial operations pushed into these relationships rather than have consumers seek out commerce web sites. Businesses will need to create services that support meaningful relationships in these specialized networks.

Third, consumer's multiple online identifies will create problems for consumers and for marketers. Consumers will suffer from managing multiple online identities and profiles and will seek applications that allow them to easily interoperate across services and that carry their personal data with them. Consumer ownership of data will be resolved in favor of consumers and consumers will use tools to actively manage their data, doling out data when and if they determine value and relevance.

Fourth, open standards, data, and services will continue to push an expectation for openness and free data exchange. More and more, businesses and service providers will provide access to data stores through open application programming interfaces ("APIs"), creating data clouds of information that is personally relevant. Integration of personal data, whether data describing social relationships or personal behavior, will become a key technical challenge. The ability to integrate data across multiple data stores and services in order to provide relevant services to a specific consumer will be a significant challenge. The future marketplace will mirror this trend with requirements for complete openness and transparency. In order to maintain trust, businesses will need to push transparency, allowing users to access information over which they have little control primarily because it will be impossible for the business to control access to alternative points of view and data sources. Adoption of openness will become a key requirement for commerce operations. Retailers will differentiate themselves by their ability to mesh information from multiple sources into customized compositions based on an individual's personal preferences.

Finally, consumers will come to expect greater relevance, convenience and service through more intelligent and personalized insight. Fragmented profile data, the importance of social media, dynamic social networks that emerge based on specific contexts, expectations of openness and transparency will not reduce the consumer's expectation that they are able to get products, services, and information the way they want it and in a way that they trust.

Because these trends pose significant problems for ecommerce retailers, for retailers to be relevant in a consumer's life, a need exists for retailers to integrate successfully into the online services and personal data stores that encapsulate a user's digital life. For retailers to be relevant, retailers must deliver value in helping consumer personalize the management of life events. The present invention thus provides technologies for managing consumer life events. These technologies are dynamically configurable based on the specific consumer's context. These technologies consist of tools that allow consumers to co-create with retailers semantic mashups which bundle information and application services together tied to an individual's life and that assists them in management their life in the context of their social network by organizing information based on social network characteristics and behaviors, and organizing and invoking services based on individual functional requirements.

It is generally assumed that a consumer's information will be broadly distributed across what some call the "data cloud." The data cloud consists of personal and $3^{rd}$ party data stores that are accessible across the Internet using freely available application or service interfaces. Managing these distributed sources of content will require a highly flexible and distributable set of functions which are, within the subject technology, architected as personalized agents. Agents operate proactively, and organize and push information and services based on individuals.

As a consumer's information is captured and integrated, it will also be organized within a specific context. For example, the capture and organization of information for the purposes of selecting a cell phone plan for text messaging is a different context from international dialing. The organization of this information, how it is captured and then mashed-up into an integrated presentation or sequence is affected by the behavior of those individual's discerned to be like the user in the specific context. In the present invention, information capture and organization is managed by the collective behavior of the latent network of users that is most closely associated to the user in a given context. For example, information and application services relevant to purchasing tires is organized for individual's based on those networks of individuals who share certain characteristics, e.g., people who are in the market to purchase tires, people who drive mini-vans, and people for whom the greatest value is paramount.

The ability to capture and organize the information based on social behavior requires the ability to capture and connect user behaviors. Retailers must be able to capture user behaviors and through tools enable the tagging, sharing, linking, and rating of information. The ability to tie this information to social networks and create networks of like minded consumers will be critical. Once identified, these groups can be communicated with using a variety of experiences that are designed to provide appropriate management of life events. Tagging, sharing, linking, and rating also provide clear behavioral data that helps organize content into meaningful bundles. Retailers can therefore tie together products tagged "best value" and connect those product bundles with social networks seeking "best value."

The complexity of these relationships between context, individual, and life event or task, likely overwhelms simple rule-based systems. This is especially true if the system is open and allows $3^{rd}$ parties to provide application services (i.e., "Widgets") and unique datastores without centralized control and management.

The present technology thus leverages principles of complex systems and emergence to establish connections between an individual, and his/her context, and the specific task that is being tackled. The technology creates highly customized experiences and deliver those experiences interactively to the user (a process termed 'category experiences').

This highly dynamic, contextual, and bundled collection of information and application services creates new challenges and opportunities for pricing. For example, several catalogs of information may be inked together and therefore mashed up. When this collection of catalogs contributes to the sale of a product then each participant may potentially receive a portion of the transaction. The greater the value may be tied to the greater the contribution. Managing the graphic of connections leading to a commercial transaction creates new affiliate models and algorithms for the distribution of revenues.

This network based commerce model, i.e., one in which everyone contributes information, application services, and organizational structures, allows retailers to reward specific user behaviors. This pay for performance model allows the retailer to directly target users and target specific behaviors that enable commerce. Retailers can present users with highly targeted opportunities or pay for desired network behavior. Network behaviors may include such things as rating a product, creating a bundle of products and information, or collaboratively participating in an online experience.

Therefore, to address these and other needs, the present invention is designed to allow customers to: 1) organize and syndicate content related to their life to others in the consumer's online network and/or services that consumers use to help them personalize the management of life events; 2) share and collaborate with others in creating, organizing, and gaining insight from online content; 3) buy and sell products, services, and information based on dynamically created pricing which is tied to relevance and personal value; 4) integrate personal data stores in order to allow greater relevance of commercial opportunities and bundles of products, services, and information tied to life events; 5) participate in dynamically created online social networks containing friends/family, experts, community members, brands, and retailers organized around life events; and 6) allow consumers to create and manage multiple contexts and allow for dynamic rather than static organization and management of information and application services.

More particularly, the present invention is designed to have the ability to: 1) create specialized commercial operations or "Widgets" that can be easily re-composed to support these unique, context specific processes that are personalized to the user; 2) deploy specialized commercial operations based on a individual consumer's preference across multiple distributed touchpoints; 3) integrate understandings of the consumer across multiple data stores in order to provide high relevance; 4) create dynamic networks that allows the retailer and the retailer's agents to provide value by enabling consumer preferred problem solving and preferences; 5) integrate $3^{rd}$ party services that comply with open standards to interoperate without prejudice; 6) personalize the bundling and pricing of information and application services into what are referred to hereinafter as "catalogs"; and 7) integrate $3^{rd}$ party data stores on the fly in relationship to ever-changing set of lie events.

Thus, the present invention specifies three areas: 1) how information is dynamically integrated to support customized bundling of information and application services tied to together for the purposes of managing life events; 2) how services are dynamically composed to support customized commercial operations; and 3) how a dynamic marketplace is created to allow uncontrolled and open connections to catalogs of products, services, and information whereby marketplace transactions may emerge through the dynamic mapping of buyer, seller, bundle, and price.

While the foregoing generally describes the inventive online social networking system for conducting commerce, a better understanding of the objects, advantages, features, properties and relationships of the subject system will be obtained from the following detailed description and accompanying drawings which set forth illustrative embodiments which are indicative of the various ways in which the principles of the invention may be employed.

BRIEF DESCRIPTION OF DRAWINGS

FIG. 45 shows a user interface according to an embodiment of the present disclosure.

FIG. 47 shows a user interface according to an embodiment of the present disclosure.

Figure 1:
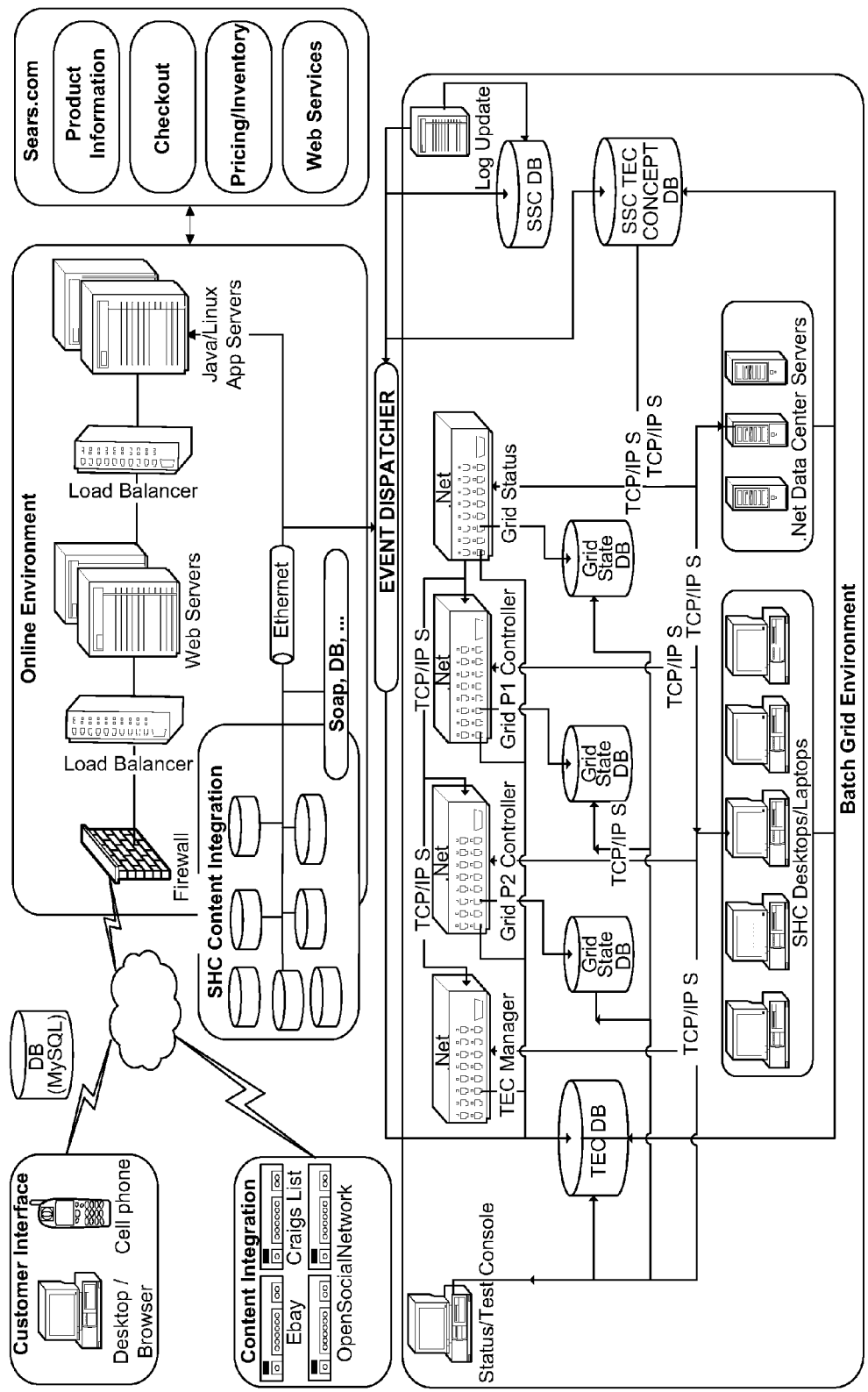
FIG. 1 shows an online social networking system according to an embodiment of the present disclosure.

DETAILED DESCRIPTION i) Exemplary Network Architecture, Grid Environment, Widget OS, and Data Exchange As illustrated in FIG. 1, the subject online social networking system for conducting commerce will be described in the context of a plurality of processing devices linked via a network, such as the World Wide Web or the Internet. In this regard, client processing devices, illustrated in the exemplary form of a desk top computer system, cell phone, etc., provide a means for a user to access an online environment and thereby gain access to content, such as media, data, Web pages, catalogs, games, etc., associated with the online environment. Since the manner by which the client devices are used to access the online environment are all well known in the art, they will not be discussed herein for the sake of brevity.

As will be further appreciated by those of skill in the art, the computing devices, as well as the computing devices within the online environment, will include computer executable instructions stored on computer-readable media such as hard drives, magnetic cassettes, flash memory cards, digital videodisks, Bernoulli cartridges, nano-drives, memory sticks, and/or other read/write and/or read-only memories. These executable instructions will typically reside in program modules which may include routines, programs, objects, components, data structures, etc. that perform particular tasks or implement particular abstract data types. Accordingly, those of skilled in the art will appreciate that the computing devices may be embodied in any device having the ability to execute instructions such as, by way of example, a personal computer, mainframe computer, personal-digital assistant ("PDA"), cellular telephone, gaming system, personal appliance such as television, refrigerator or the like. Furthermore, while various of the computing devices within the network illustrated in FIG. 1 are illustrated as single devices, those of skill in the art will also appreciate that the various tasks described hereinafter may be practiced in a distributed environment having multiple processing devices linked via a local or wide-area network whereby the executable instructions may be associated with and/or executed by one or more of multiple processing devices.

Figure 2:
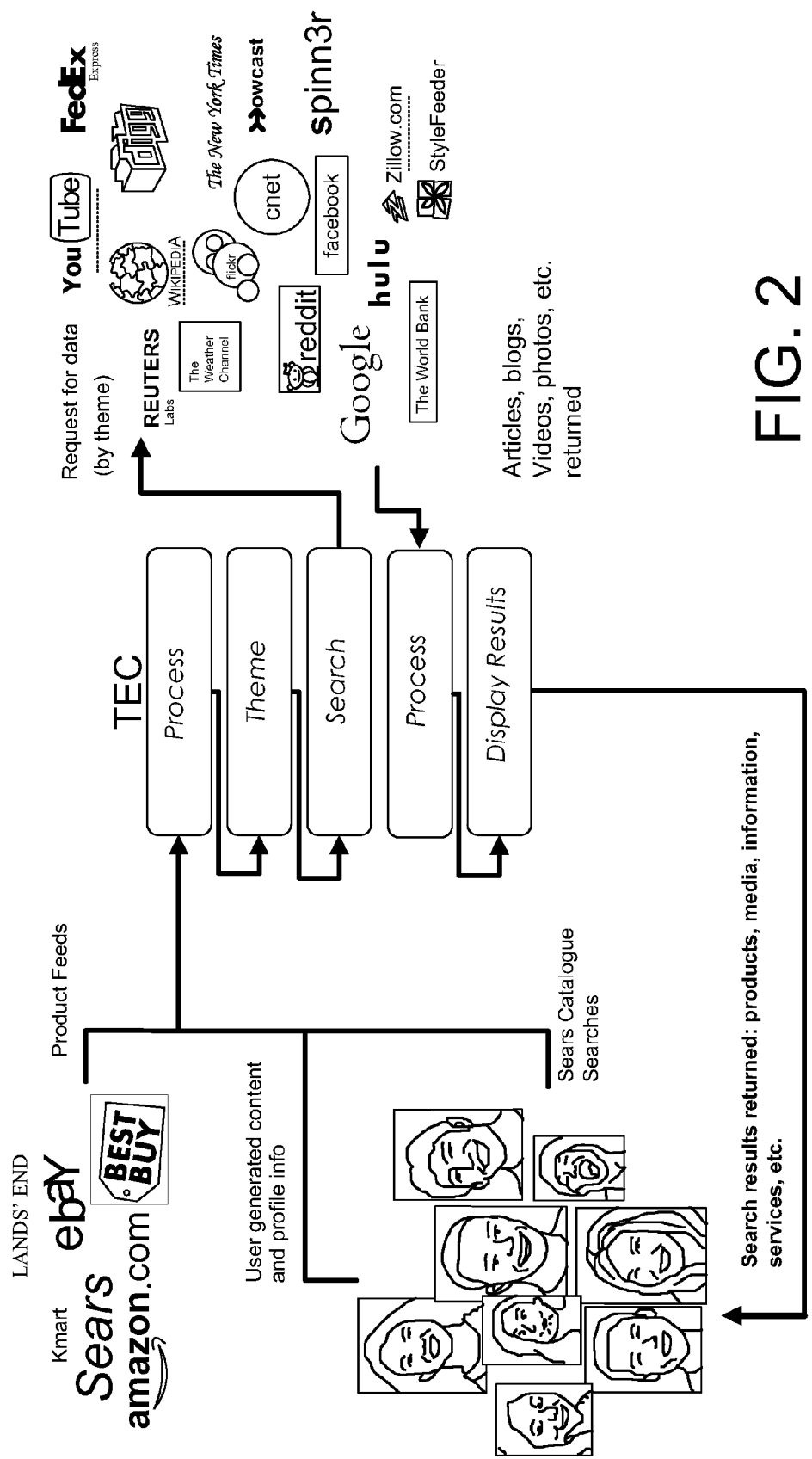
FIG. 2 shows an online social networking system according to an embodiment of the present disclosure.

As further illustrated in FIG. 1, the network may also provide logical connections to one or more third party computing devices, such as the third party content servers which may include many or all of the elements described above relative to a computing device. Communications between the client computing devices, the online environment, and third party computing devices may be exchanged via a further processing device, such as network router that is responsible for network routing. While the client computing devices generally provide user events to the online environment for processing, the third party content servers are generally accessed to provide the online environment within content and data for processing as generally illustrated in FIG. 2 and discussed in greater detail hereinafter.

Figure 3:
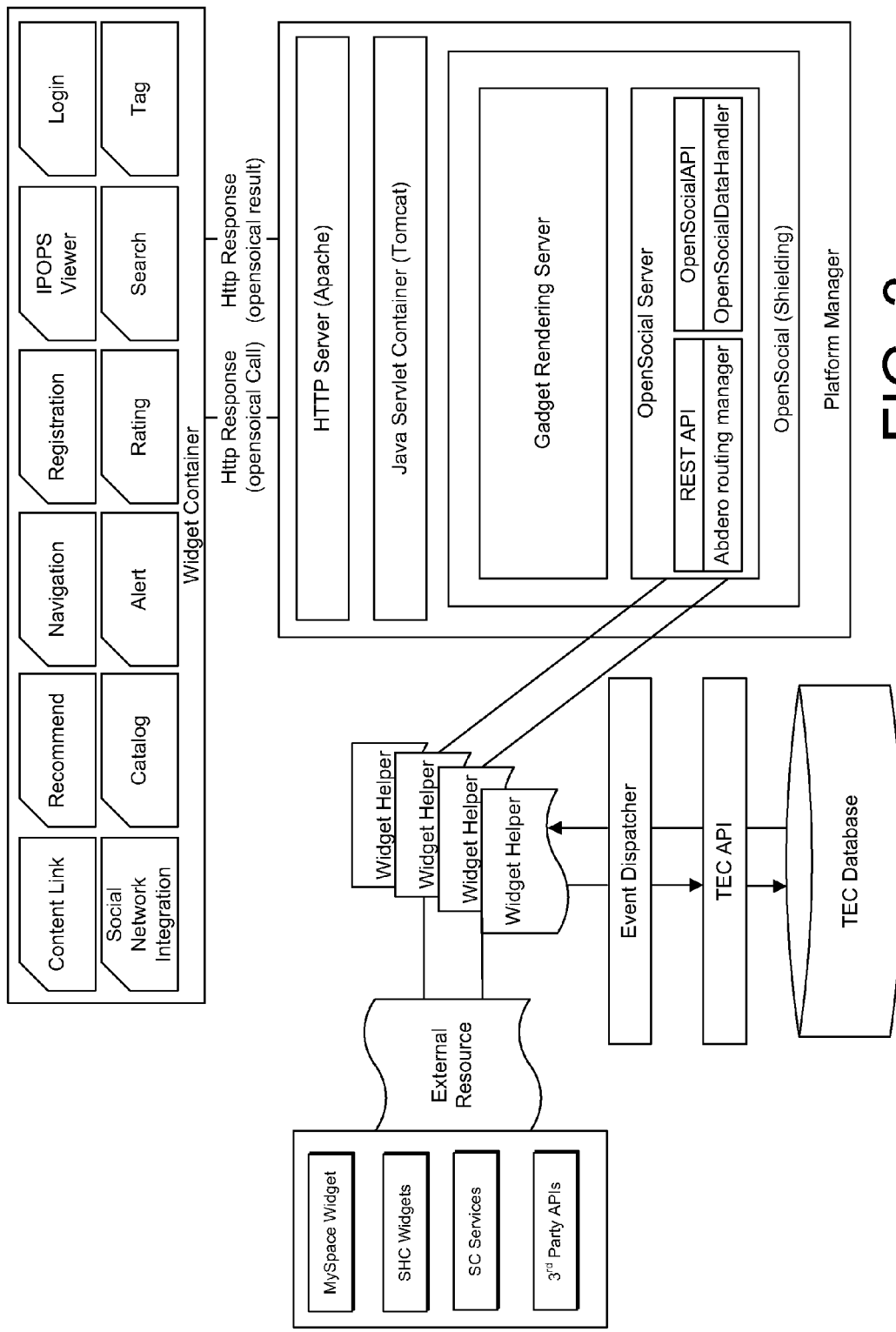
FIG. 3 shows a Widget based system according to an embodiment of the present disclosure.
Figure 4:
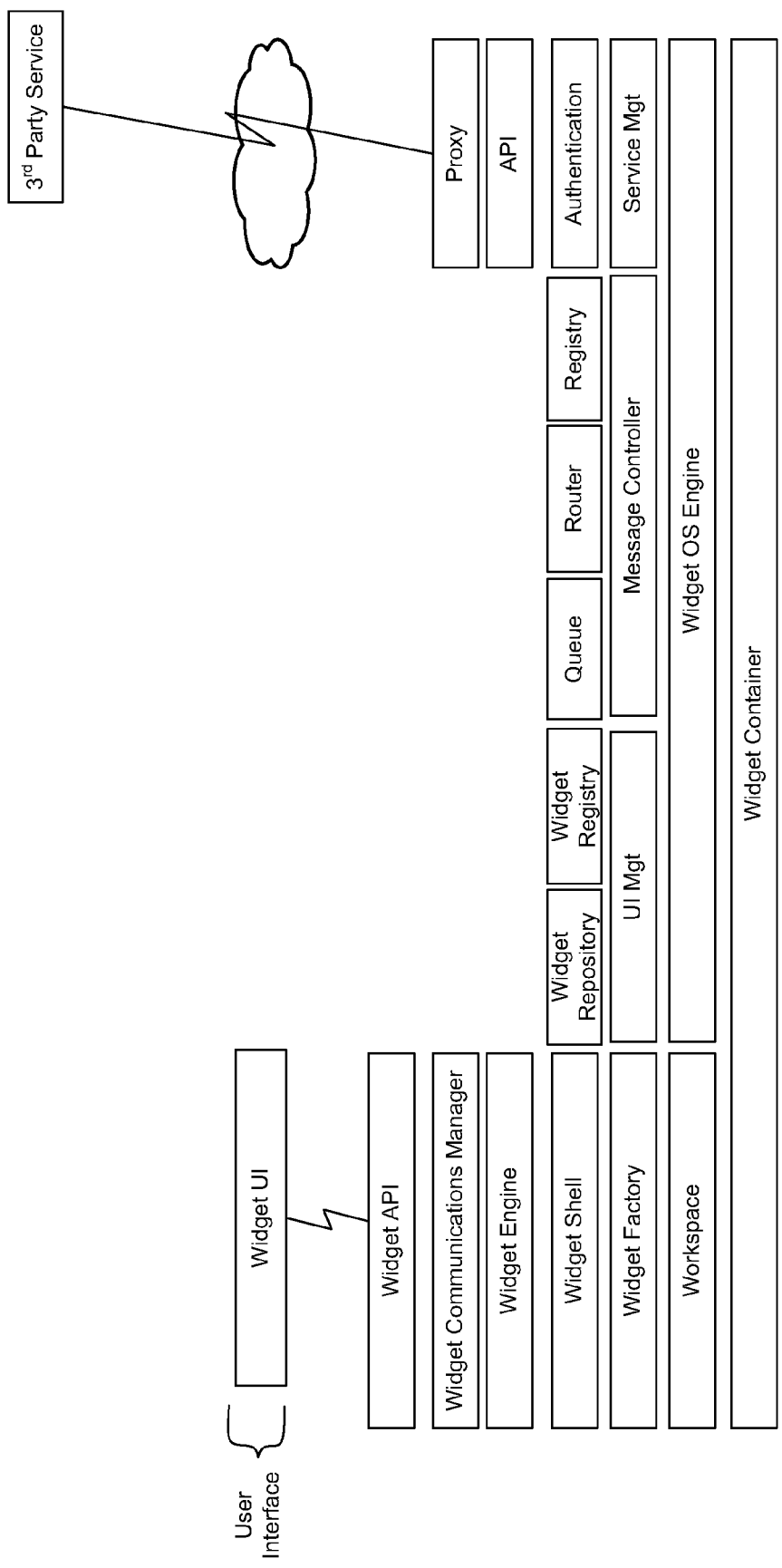
FIG. 4 shows layer functions according to an embodiment of the present disclosure.
Figure 5:
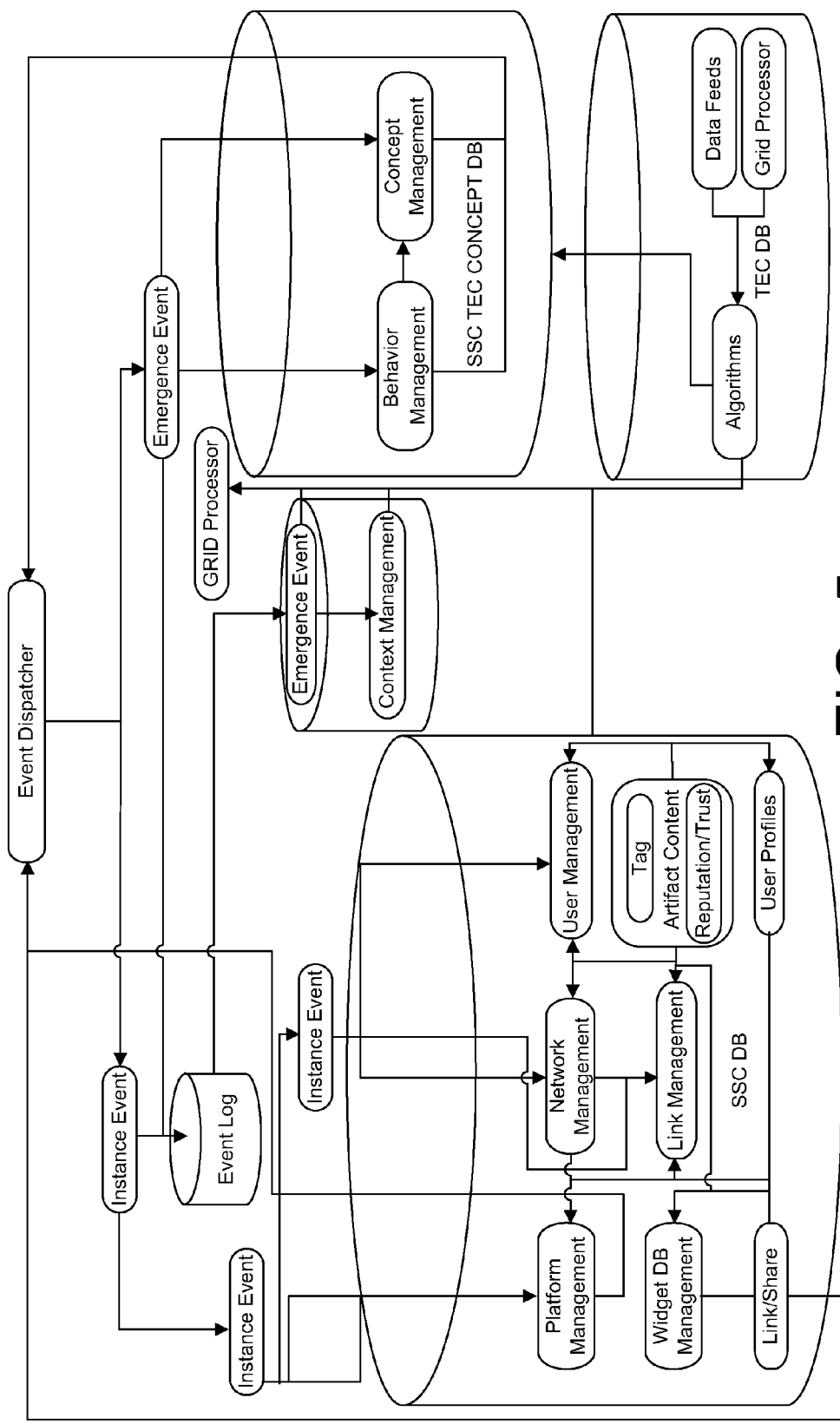
FIG. 5 shows an online social networking system according to an embodiment of the present disclosure.
Figure 49:
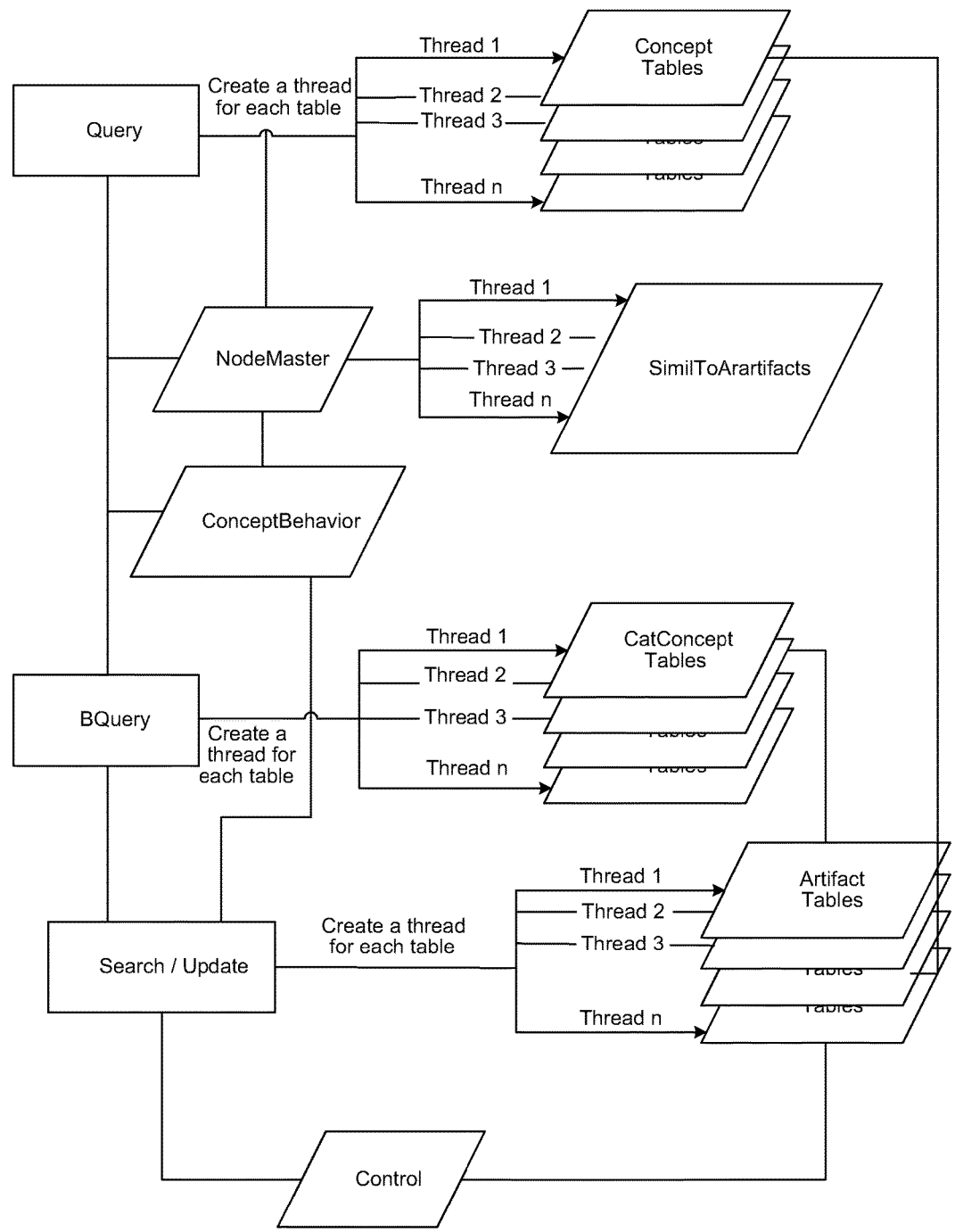
FIG. 49 shows a parallel processing system according to an embodiment of the present disclosure.

Considering now FIGS. 3-5, the network of FIG. 1 is generally implemented using a Widget based architecture having access to a logical database architecture (FIG. 5) in which Widgets, instance data, concepts, etc. as well as links therebetween are maintained. In the exemplary system, a user may download a specific Widget or plug-in to be hosted within a host application. A host application is any server services or client side code including HTML web pages that that may interact with Widgets or plug-ins and provides services which the plug-in or Widget can use, including a way for plug-ins to register themselves with the host application and a protocol for the exchange of data, and can operate independently of the plug-ins and Widgets, making it possible for end-users to add and update plug-ins/Widgets dynamically without needing to make changes to the host application. For this purpose, a plug-in is any functionality which depends on the services provided by the host application and the host application's user interface, has a well-defined boundary to a set of actions, and cannot work independently by itself while a widget is a portable chunk of code that can be installed and executed within any separate HTML-based web page by an end user without requiring additional compilation and which interacts with back end service to capture, manipulation or present data. Widgets may be distributed within HTML web pages that are not controlled or created by the provider of the services hereinafter described, i.e., 3rd Party widgets may also be created and displayed with HMTL-web pages provided by the service provider. To facilitate communications within this network environment, Widgets may use the Widget API, i.e., the interface through which Widgets can access core server side functionality or other services as may be exposed, to access local services, e.g., SHC Wishbook Services or may talk directly to third-party services such as Facebook, Flickr, or OpenSocial compliant providers. As further illustrated in FIG. 49, the system provides for parallel processing of such APIs. Furthermore, because the subject online social networking system will adapt to the functionality of each widget, e.g., emergent programming and emergent widget processing will allow the system to provide event reporting across widgets that otherwise use non-consistent terminology to describe contextually similar concepts because, when widgets are registered with the on-line environment, the registrant specifies meta-data descriptions of the widget, its operations, and events produced and consumed by the widget, the functionality of each widget may thus be left up to the developer.

More particularly, as illustrated in FIG. 4, a Workspace Component serves as the layer within which all Widgets will function. The Workspace component layer allows the system to transparently support Widgets across multiple different device deployment technologies such as a browser, mobile device, or desktop. When a workspace is launched on a device, the Workspace Component instantiates a Core Shell, which is the central repository of functionality and data that is used to manage Widgets. Within the Core Shell sits the Core Engine which serves to wrap the various service layers that are independent of the individual Widgets.

To handle communications with external services, including file and network access, the Widget OS provides a bottom layer which is the Service Controller. File management duties are funneled through a Platform Proxy, which is an abstraction layer between the different platforms. In this manner, for example, when a Widget requests to upload a file, the Platform Proxy will handle the distinction between a browser upload dialog versus a drag-n-drop message from the local filesystem. In addition, a Workspace API is used to communicate with external network services based on open APIs. Above these Proxies sits the Auth Proxy, which will be responsible for any authentication and authorization functions that should be performed prior to or immediately following service calls, permitting a higher level of control over Widget behavior, for example restricting video class Widgets to only video file formats.

The next layer in the Widget OS is the Workspace Controller, which is responsible for creating and launching Widgets. The Widget Factory takes XML from the Service Controller to build the collection of Widgets that should be started, and will register Messages with the Message Registry. The XML defines the attributes and behaviors of the Widget, including references to the (remote or embedded) HTML/JS and/or SWF code that will be used to render the Widget. The Widget Factory may also include behaviors/attributes that are defined in the Template, Adapter, and Behavior Libraries, to generate the final Widget definition. This definition will then be stored into the Widget Data Object for later reference. The Widget Data Object is thus a consolidated model of user data, widget behaviors and content and network link data that should be available to a Widget without having to go back to the Workspace. This may include, for example, a User Object, which is the local data store for information specific to a current user such as profile information (e.g., name, email, etc.), social network information (including cached credentials, if required), and other data as may be stored by and managed within the Workspace, and a Preferences Object, which is a local data store initialized for non-user-specific attributes, such as size and position attributes for a Workspace and state information for previously launched Widgets.

A Message Controller then serves as the interface layer between Widgets and the rest of the Workspace while a Message Router talks to the Communication Module within each instantiated Widget, passing Messages back and forth with other Widgets or services. In addition, a Message Registry is provides to serve as the local data store that contains a list of all currently available Messages, with associated dependencies while a Message Queue represents a transient list of Messages to be processed. In this manner, when the Message Router receives a Message, it checks the Message Registry for any related Messages that should be fired, which are then added to the Queue. The Message Router then processes each Message on the Queue that needs to be run.

Considering FIG. 4 still further, a Widget Shell represents a wrapper around each individually launched Widget. The Widget Shell will be injected with a Widget Engine, which facilitates communication between the Widget and the Core Engine. The Widget Shell is where default UI elements, such as close buttons, may be rendered, if not overridden by the Widget. Some Widget Shells may have no visible elements, allowing the Widget full control over its presentation. Meanwhile, the Widget Engine is the piece of functionality that lets the Widget interact with its containing environment. It passes Messages and Messages as generated by the Widget, which may be routed by the Core Engine to other Widgets or back to the core Services. Finally, a Communication Module is provided which is a small SWF component that will setup the named pipes by which the Widget and Message Router will talk.

ii) Example Widget OS Workflow

By way of example only, considering a case where a user logs into a workspace to interact with a Widget, the above-described Widget OS would function as follows:

1) Login to Workspace

User inputs credentials into a Login Widget and clicks a Login/Submit button.

The data is passed from the Login Widget through the Core to the online environment server.

If valid, the server returns an XML message containing the user's profile information, the list of Widgets to display to the user, and any other data relevant to the session.

The Workspace Controller will setup the Workspace with the specified Widgets

2) Open a Widget from the Widget Toolbar

User clicks on or drags a Widget from the Widget Toolbar.

The Widget Toolbar sends a Message to the Communication Module.

The Communication Module sends a Message to the Message Router.

The Message Router passes the Message to the Workspace Controller.

The Workspace Controller sends a Message to the Widget Factory.

A Widget Shell is launched by the Widget Factory onto the Workspace.

The Widget Shell is injected with the associated XML for the Widget.

The Widget is rendered in the Workspace.

3) User Interacts with Widget

User enters text and selects a Widget control creating a publishable event.

The Widget sends a state Message to the Widget Shell.

The Widget Shell's Communication Module sends an Message through the Message Router to the Workspace Controller.

The Workspace Controller sends the Widget's state message to any Widgets that have subscribed to listen for that Message.

4) Close a Widget

User clicks the close control on a Widget.

A Message is sent to the Widget Shell Communication Module.

The Communication Module sends an Message to the Message Router.

The Message Router passes the Message to the Workspace Controller.

The Workspace Controller scans the Message registry to determine what other Widgets have subscribed to the Widget's close Message.

The Workspace Controller sends a notification to the subscribing Widgets.

The Message Router sends the close confirmation to the originating Widget Shell.

The Widget Shell runs the Widget's close function, then removes the Widget instance.

5) Close the Workspace

The user closes the Workspace via a UI button or File-→Close menu action.

The Workspace controller scans the Message Registry to determine the sequence in which to send the close Messages.

All open Widgets are sent the close Message.

Each Widget runs its function to execute the close Message.

The Workspace then runs its own close function, which should save any state information to the local system and/or send to the server.

The user is logged out of the online environment.

iii) Graphs

Figure 6:
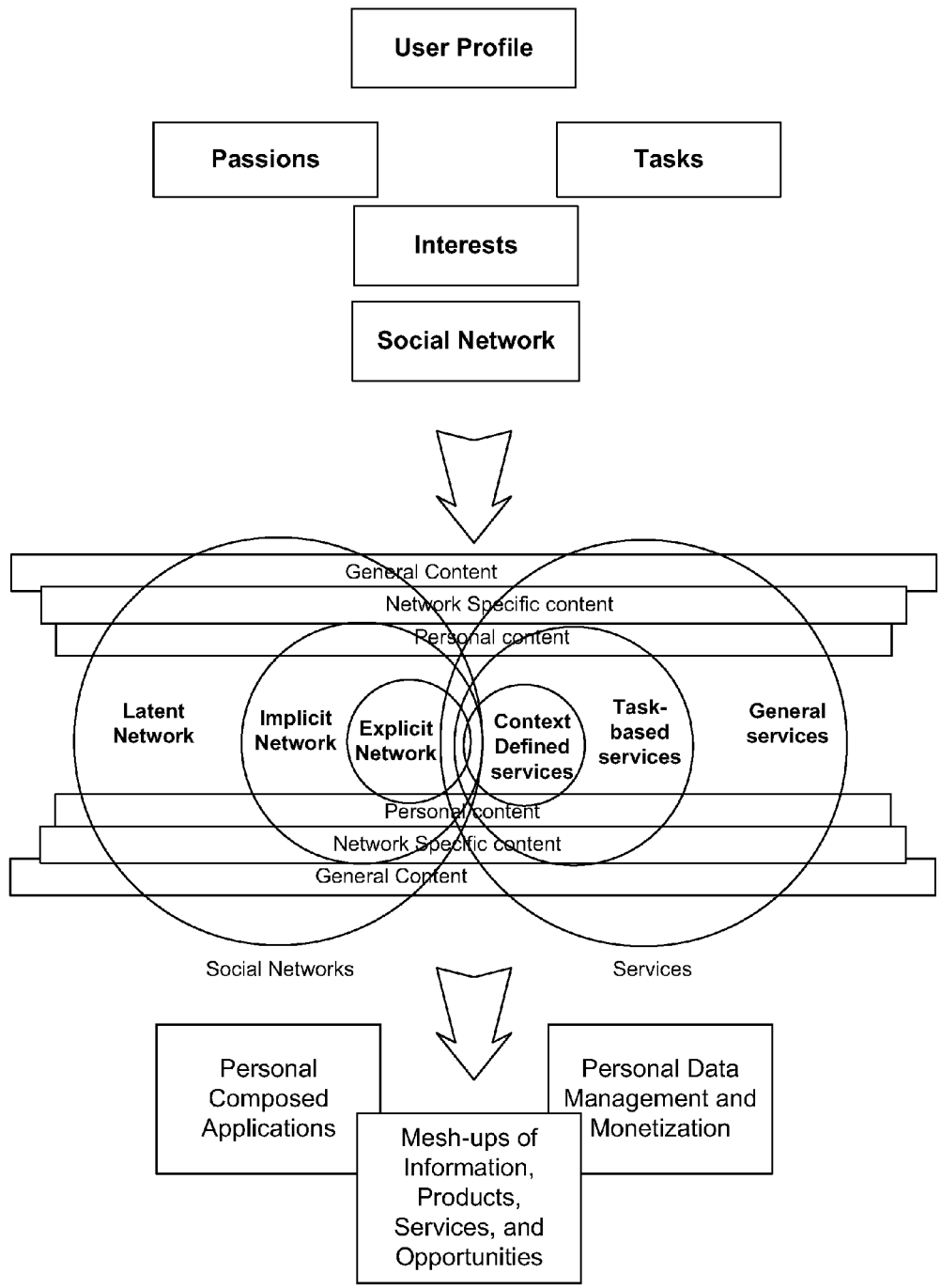
FIG. 6 shows a system of interconnected semantic graphs according to an embodiment of the present disclosure.
Figure 7:
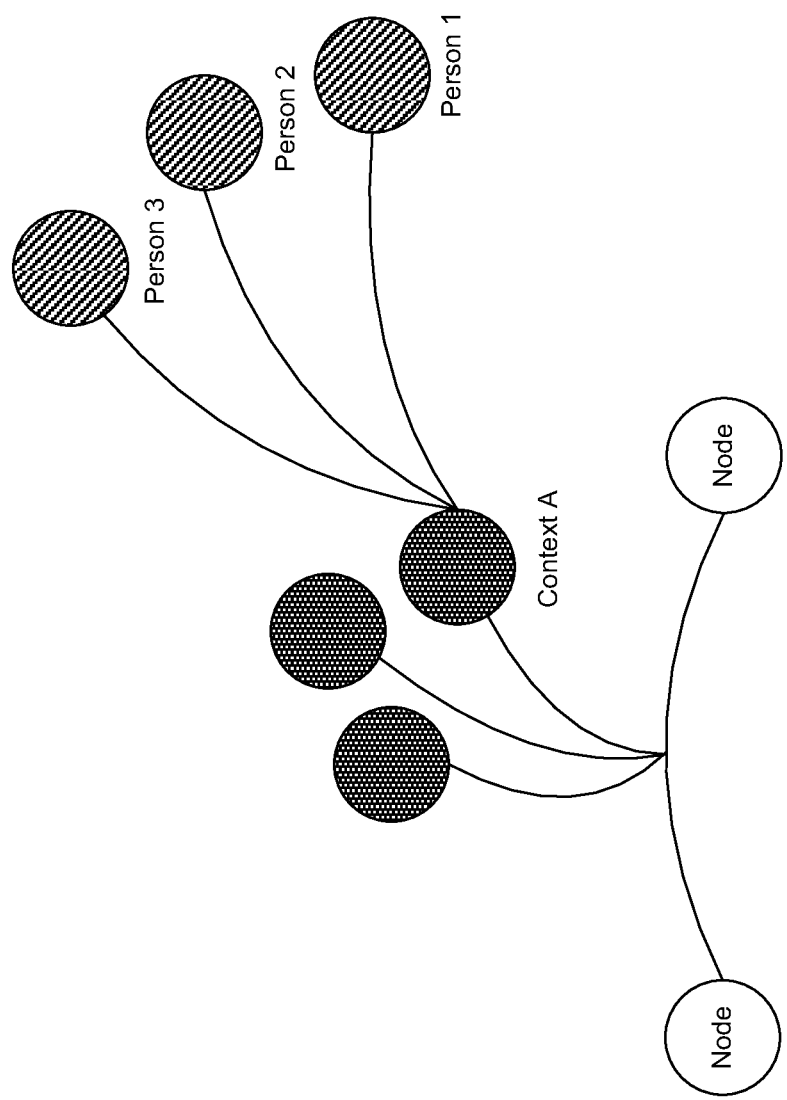
FIG. 7 shows item association according to an embodiment of the present disclosure.
Figure 8:
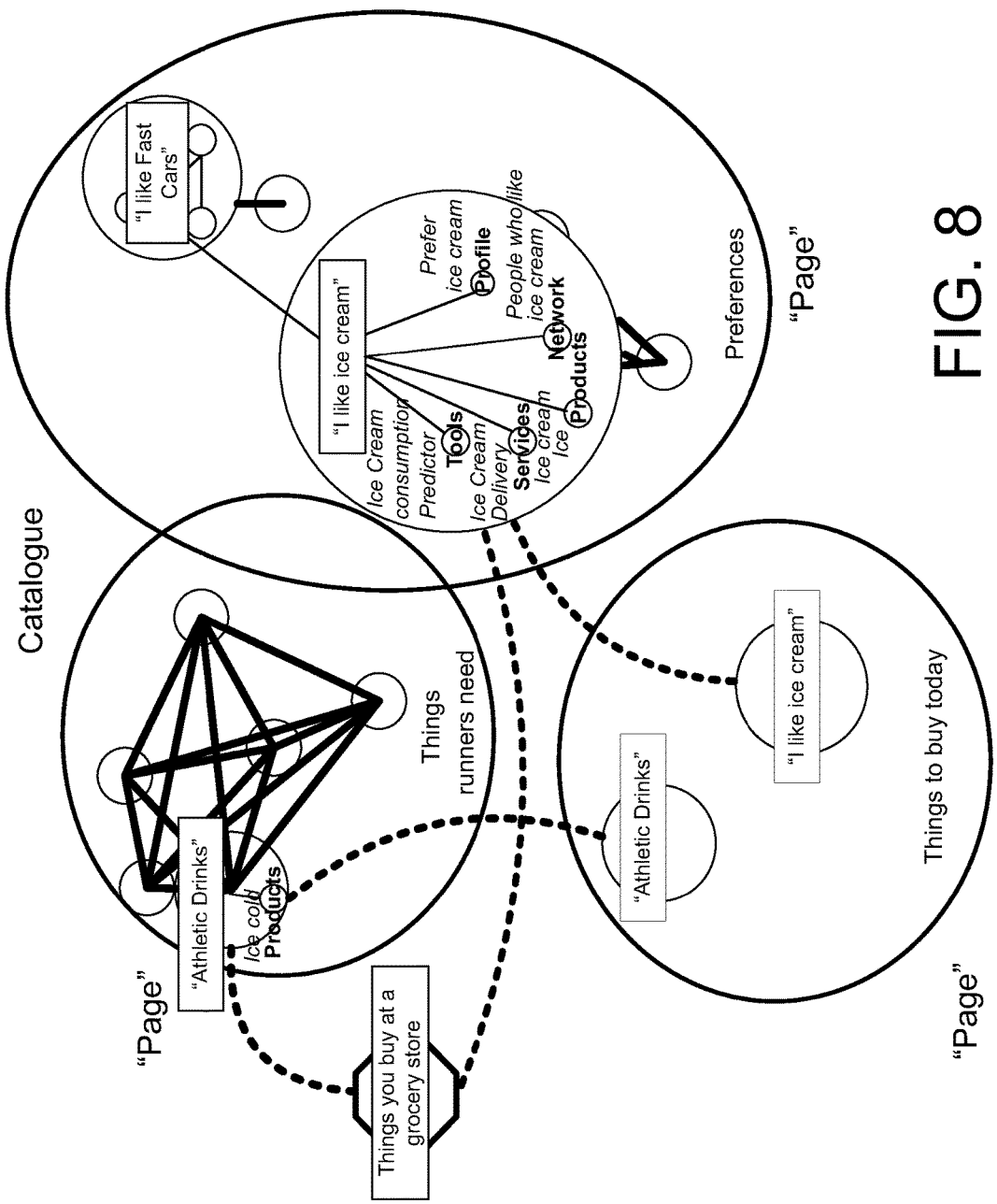
FIG. 8 shows a graphical representation of relationships between items and tags according to an embodiment of the present disclosure.

In the present invention, the needs of the system are met by the ability to create (e.g., as illustrated in FIG. 4B) and execute highly dynamic relationships across data stores through use of sets of interconnected semantic graphs, such as seen in FIG. 6. Personal data stores are graphs. Each profile item is associated with a user and each profile item is associated with all other items as shown in FIG. 7. The items are further associated by treating each individual item or response as an instance of the actual set or tag. For example, as seen in FIG. 8, the profile item "favorite ice cream flavor" may contain many answers and each answer represents a new node and is graphically related back to the tag. These items, their tags and the set of personal data that is part of the individual store are stored graphically. Across multiple stores, each graph representation can be fused together. Furthermore, agents may be utilized to monitor changes in states in nodes, arc/nodes, traversal paths, and sub-graphs to thereby adjust this matching and fusing.

Links between people and products, and the bundling of products and services occurs by managing a number of intersecting graphs which are maintained in a shard DB. First, there is the graph of the user which defines the user. Second, there is the context graph which describes the user's context. Third, there is the extended social graph which comprises the fused graph of all users that match the specific user within the specific context. Fourth, there is the product/service graph which is created so the context matches the context graph and the products/services connected to the fused social graph. For example, if the user's context is bass fishing, then the product/service graph also matches, to the extent possible, the bass fishing context. To manage and use these multiple graphs, the system employs fractal graphing techniques to discern data objects or schemas that overlap considering multiple variables, e.g., variables that define a given context. In this manner, the system may index and consider discerned contiguous graphs to thereby reduce the complexity of locating relevant information.

iv) Emergent Applications, Programming, and Widgets

Figure 9:
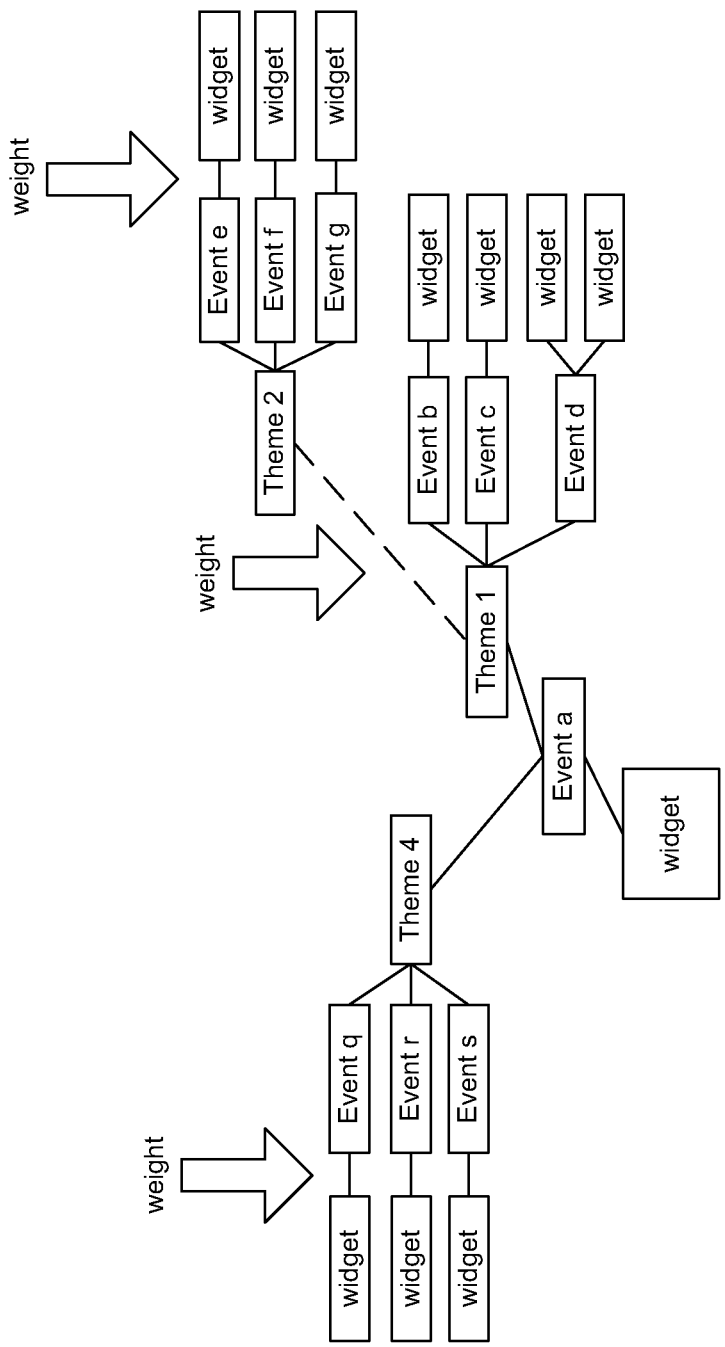
FIG. 9 shows a Widget based system according to an embodiment of the present disclosure.

In the present invention the ability to create, compose and execute sets of distributed services occurs by manipulating widgets. Widgets are discrete application services that can be deployed as self-contained capabilities and integrated on $3^{rd}$ party platforms. The ability for a retailer to provide technical services in the form of customized software applications will be paramount. By using the widget operating system, it is possible to create compositions of services as widgets and build these compositions based on specific user characteristics such as their profile, online behavior, and personal services and data requirements (e.g., my Calendar, Addressbook, etc.). Customized applications can be created by creating graphical representations of the individual widgets, the intended function or process for the application and the characteristics of the users such as illustrated in FIG. 9. Together, the intended functional requirements, the widget characteristics, and the user characteristics can provide custom applications.

v) Emergent Marketplace and Catalogs

Figure 10:
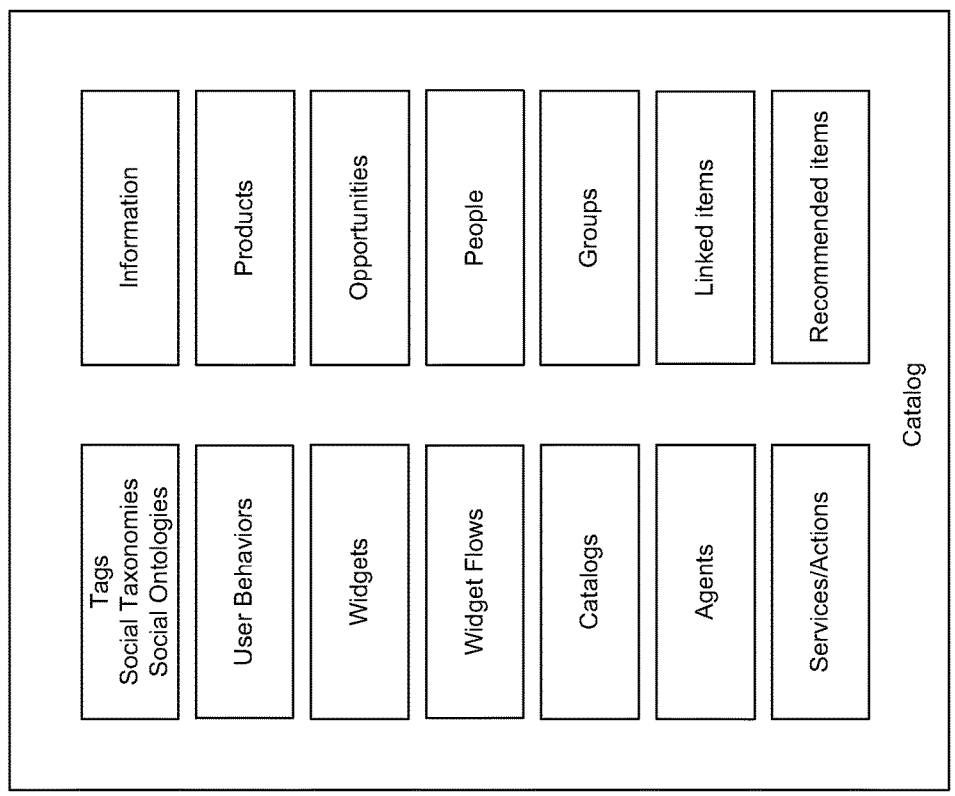
FIG. 10 shows a catalog according to an embodiment of the present disclosure.
Figure 11:
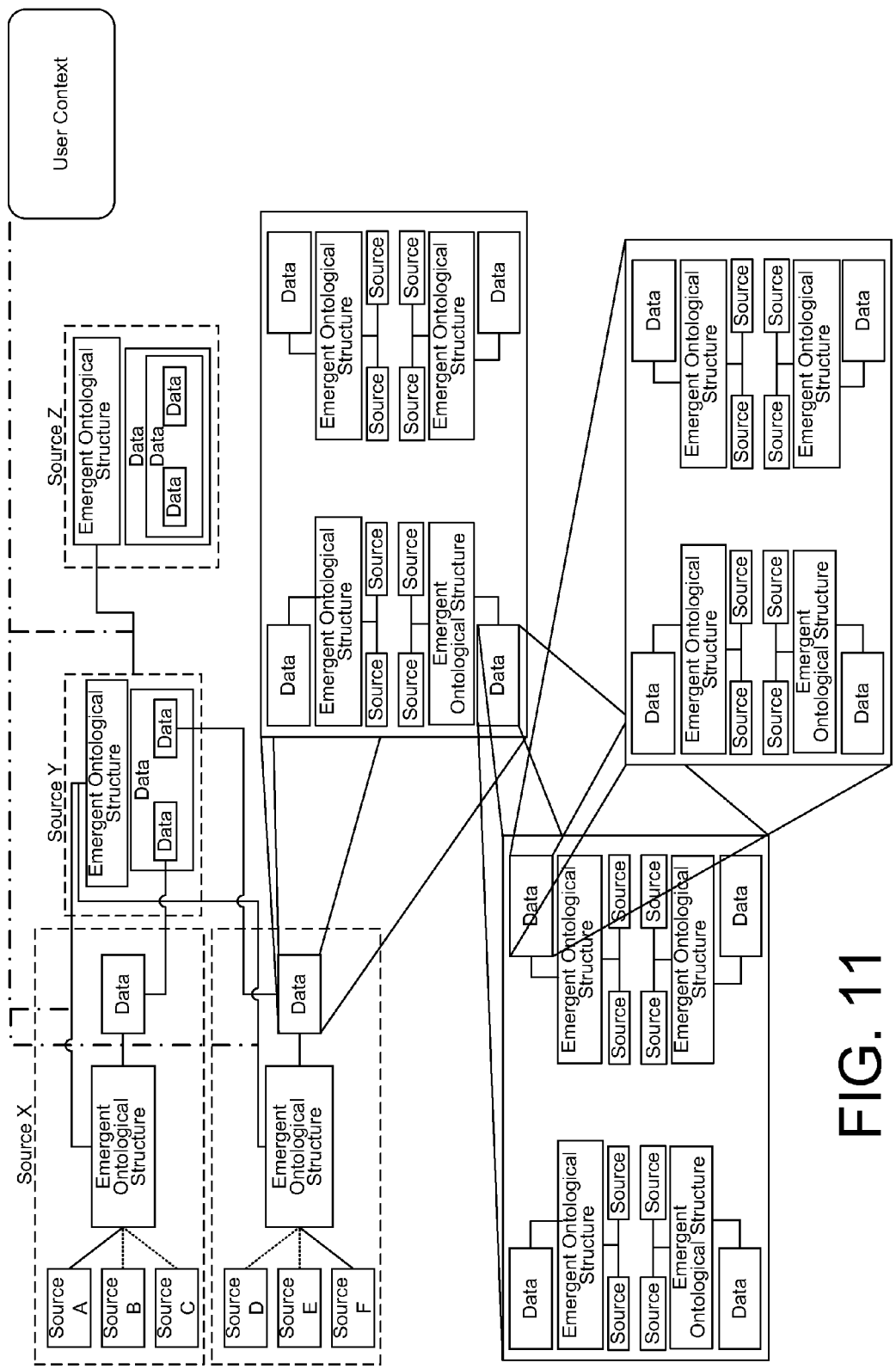
FIG. 11 shows multiple source system for use with a catalog based system according to an embodiment of the present disclosure.

In the present invention the ability to create an open emergent marketplace occurs by allowing uncontrolled and open connections to bundles ("catalogs") of products, services, and information to be created and marketplace transactions to emerge through the dynamic mapping of buyer, seller, bundle and price. By way of example, as seen in FIG. 10, a catalog may include one or more of tags, user behaviors, widgets, widget flows, other catalogs, agents, sevices/actions, information, products, opportunities, people, groups, linked items, recommended items, etc. Furthermore, as illustrated in FIG. 11, artifacts within a catalog may include content selected from multiple sources on both a macro and micro (parts of parts) level. How catalogs are utilized within the system will be described in greater detail below.

The open, emergent marketplace will support 3rd party services that perform commercial operations such as catalog presentation, product selection, product purchase and support. The open marketplace will need to allow these 3rd party services to interoperate seamlessly to support commerce. The open marketplace will support an open API to allow any 3rd party services. To insure that 3rd party services can operate fully decoupled and without interdependencies, the widget operating system allows 3rd party services to be composed into integrated composed services can be created and form a customized applications.

vi) Advertising and Merchandising

Figure 12:
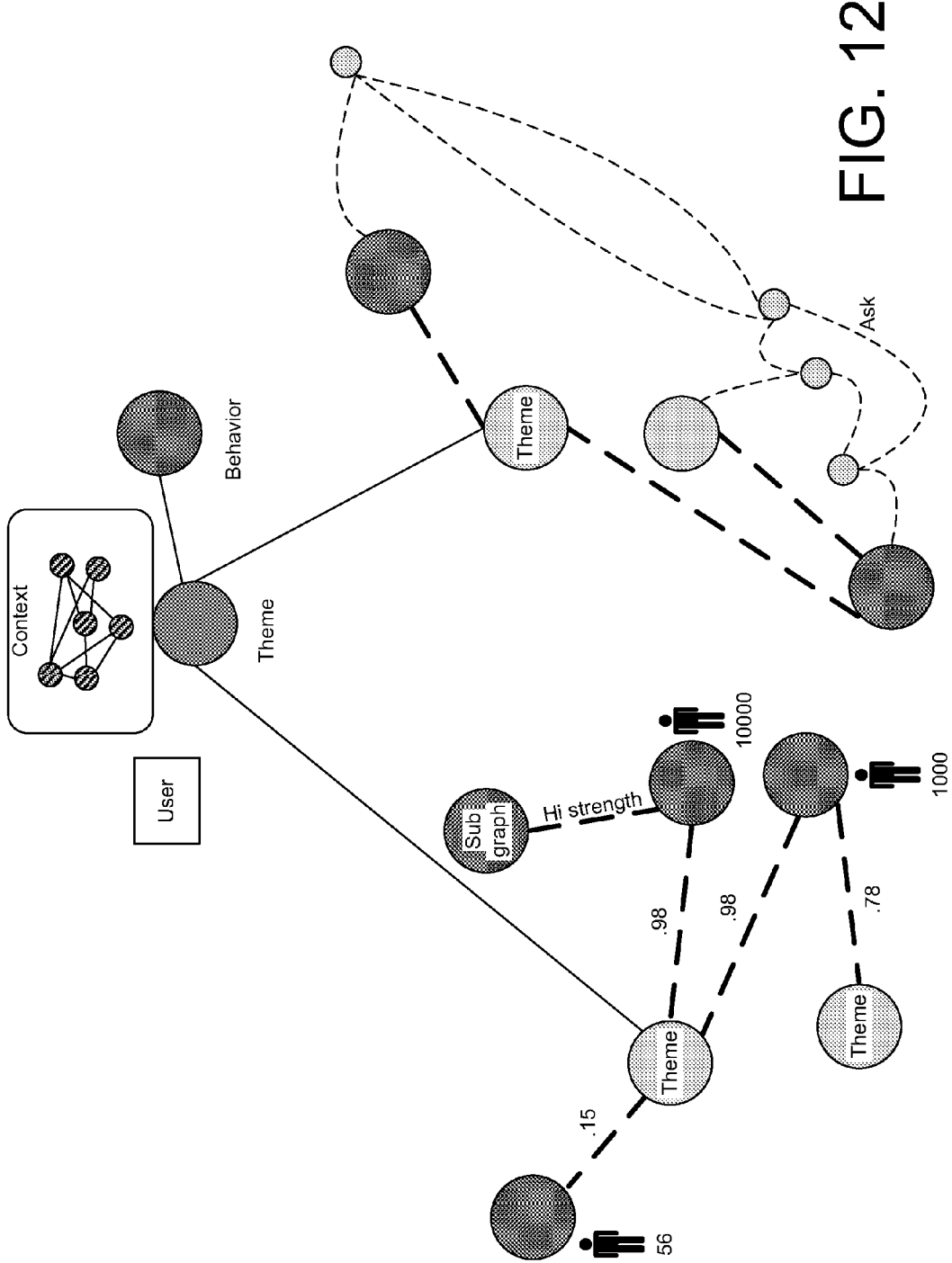
FIG. 12 shows a graph matching recommendation system according to an embodiment of the present disclosure.

A marketplace requires the ability for products, services, and information to be offered, merchandised, and transacted. Catalogs, as noted above, are collections of products, services, and information that are dynamically created through user behavior or system recommendation. Because things can be added to a catalog by a user, a catalog creates explicit and highly weighted connections which can be leveraged to provide recommendations, social discovery, etc. The user's network can also add things to a catalog of the user if the catalogs are linked. This also creates an explicit link but less highly weighted connection. The system can thus recommend items based on graph matching in which the graph contains the weighted characteristics of other similar people and their behavioral and profile data as shown in FIG. 12. As an example, if every sailor on the north shore of Chicago has put sailing shoes into their catalogs (an explicit connection), and a new north shore sailor creates a new sailing catalog, sailing shoes would be recommended by the system.

Each touchpoint (i.e., browser, mobile, television remote, refrigerator, Xbox) can be defined graphically as well. Each life event or life task, can be similarly graphically represented. Each individual has a similar integrated profile and context. Delivering the right product/service/information, based on the specific life event or task, to the right individual in the right context becomes a matter of fusing graphs together. Using the standard architectural approach, the system leverages processed artifacts to seed how these graphs can be fused as well as group behavior to solidify how the right touchpoint is selected for delivering the products, services, and information based on the individual context.

Figure 13:
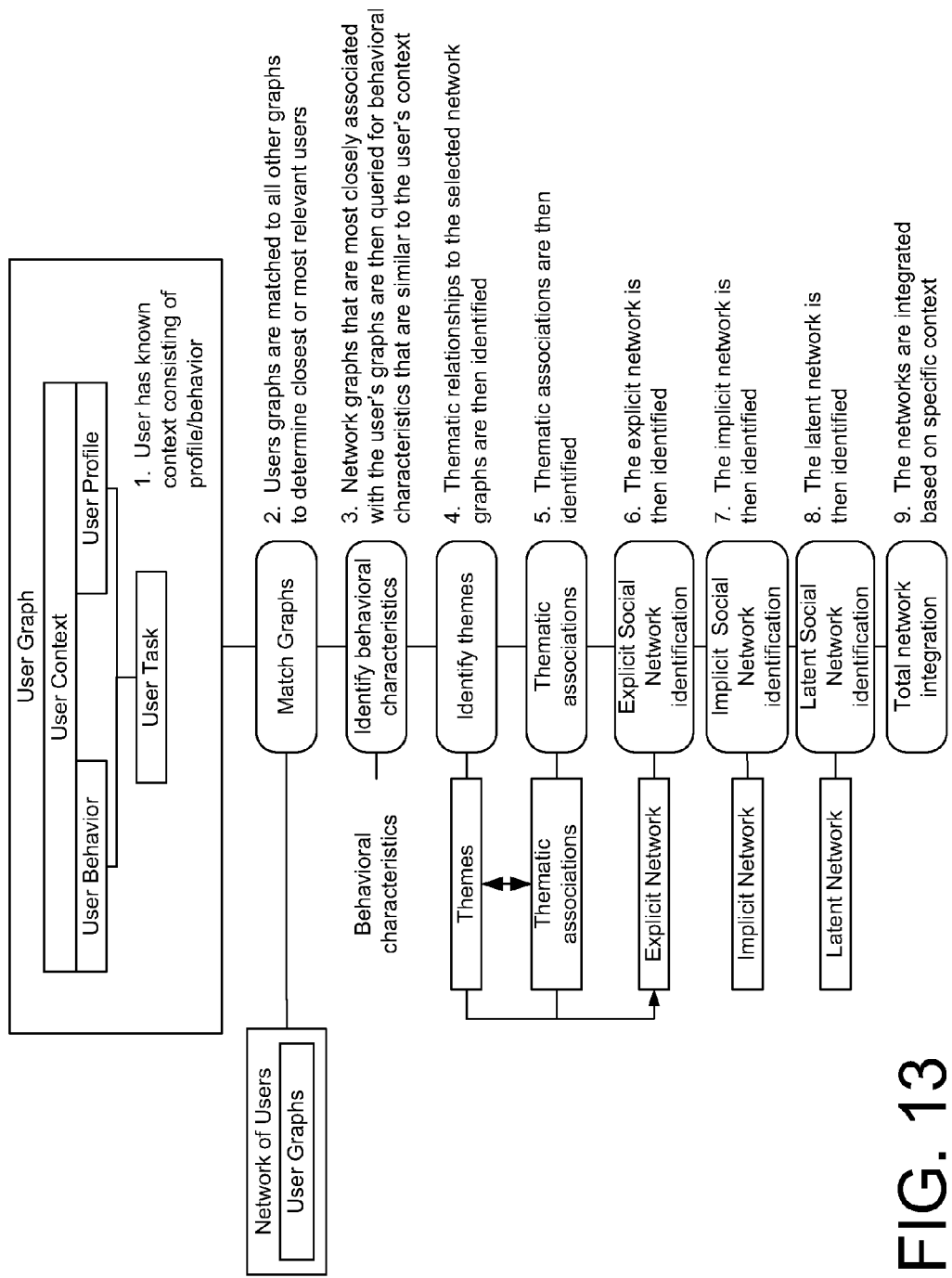
FIG. 13 shows a process for merging catalogs according to an embodiment of the present disclosure.

Each vendor's catalogs, like a user's, catalogs contain items. But since vendors do not share a common vocabulary or description logic for products it is incredibly difficult to fuse catalogs together without being able to understand the meaning of a specific product. Nevertheless, the items are related to various themes and these themes exist within a specific graph and are therefore graphically defined. Therefore, in order to merge catalogs, both catalog context graphs and individual product context graphs are processed as shown in FIG. 13 and the extent of the graph match determines the certainty of the match of products and product catalogs. Multiple vendors may therefore be merged by vectoring each item in a catalog into a catalog and then each catalog to each other. Thus, an item may match another ("jaguar" equals "jaguar") but the fact that the jaguar in one catalog contains relationships to other items like "lions," "tigers," etc. and the other jaguar is in a catalog that contains relationships with items like "car," "luxury," etc. would indicate that these catalogs should not be merged.

A group of products and services can also be cataloged together with a life event as noted above. This catalog bundles products and services to a life event by discovering a thematic connection. For example, the theme "wedding" will have an associated set of products and services. A Life Process consists of a set or sequence of themes that are actions. These actions are linked graphically together through weights. Products and services can be tied to each theme and there is strength of association for each thematic relationship.

Creating and conveying relevant opportunities to purchase to a buyer is typically seen as "advertising." An open, emergent marketplace must allow advertisers to build new types of advertisements which consist of exciting and custom experiences that engage their brand and marketing strategies. The ability to create personal experiences or narratives that are tied to an individual's characteristics will be the ultimate custom experience. Customized experiences are created by integrating disparate elements (e.g., individual videos) using the underlying semantic graphs. Because the graphs describe the elements, provide a narrative structure, and provide the characteristics of the users, from the graphs custom experiences can be created.

Merchandising is based on the premise that by associating a product to other products and services that the likelihood of purchase increases. Thus, by fusing together graphical representations of products from multiple vendors, and by then identifying strong associations between products based on the thematic strength of relationships, the system functions to identify all things that are connected, e.g., connected to "tires," to thereby identify vendors of these connected items.

Figure 14:
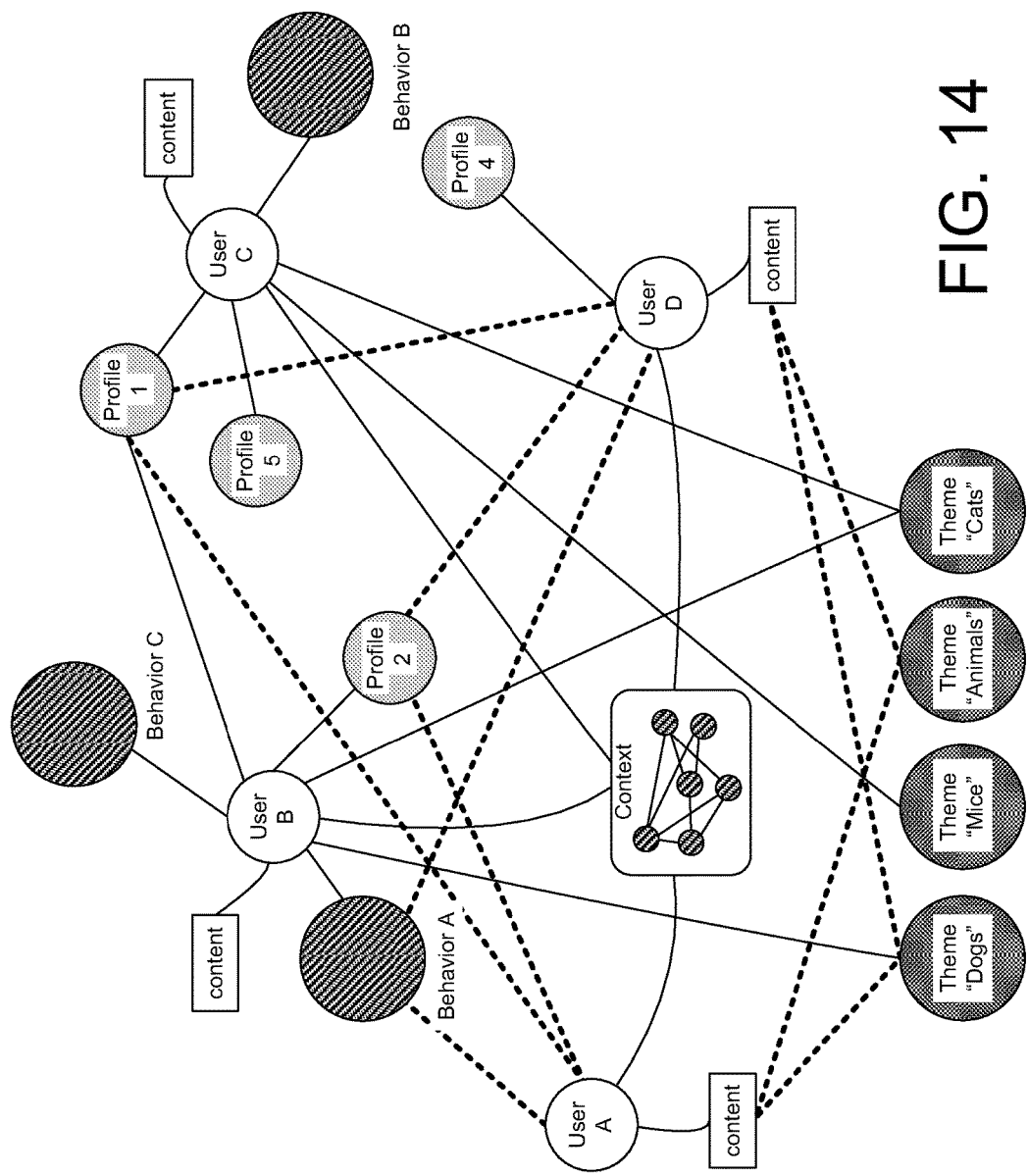
FIG. 14 shows a system for matching users based upon multi-dimensional graph analysis according to an embodiment of the present disclosure.
Figure 15:
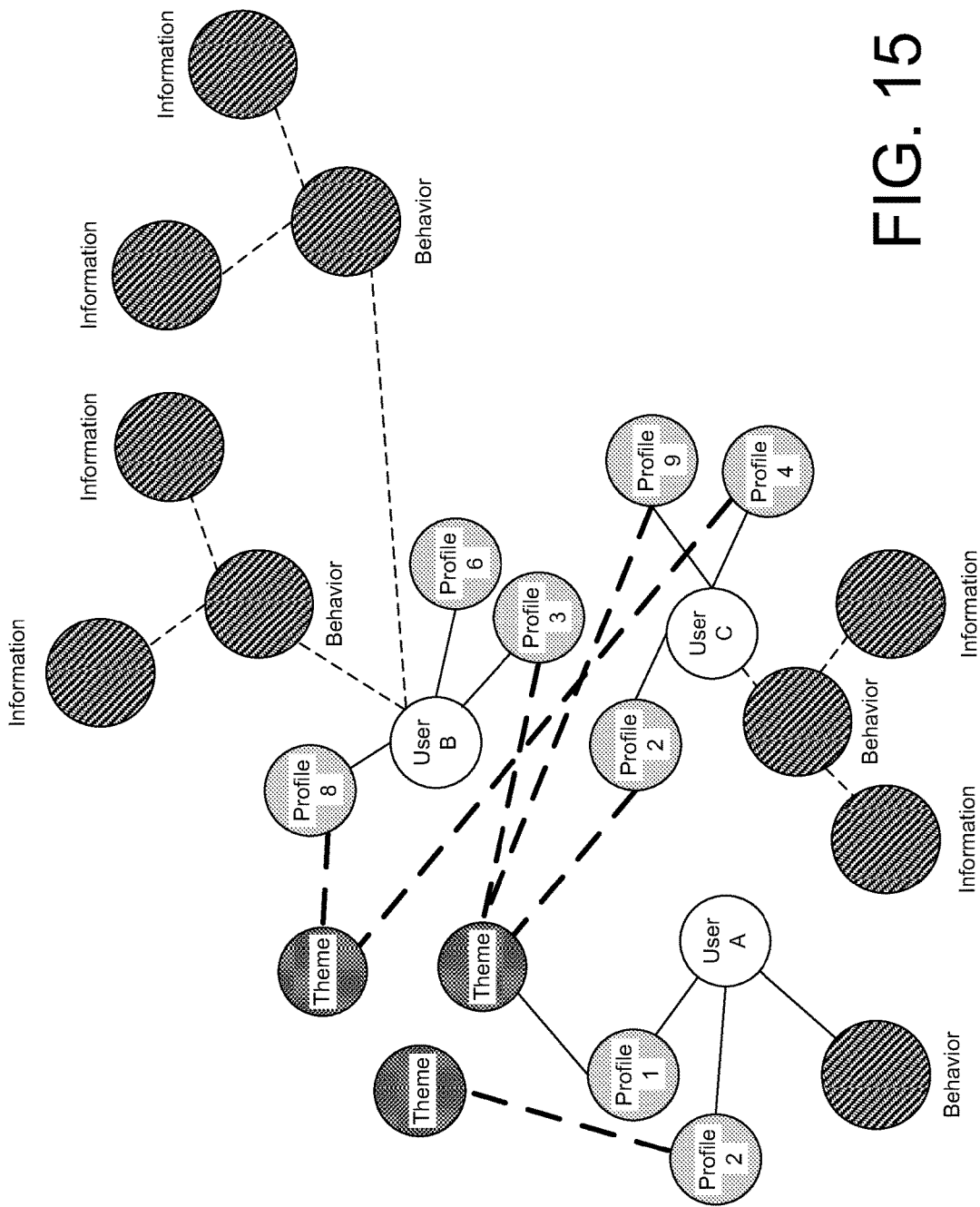
FIG. 15 shows a system for predicting behaviors according to an embodiment of the present disclosure.

More particularly, the system is able to deliver opportunities to more finely targeted individuals because the system is able to create a more comprehensive profile of the individual by integrating their profiles from multiple sources and understand those profiles and what those profiles say about the individual. Part of the understanding comes from the ability of understanding the individual within his or her social context. The system can also create a similar understanding of the individual products in a catalog, and across multiple vendors' catalogs by fusing together latent collections of products/services from across multiple vendor catalogs in ways that can then be tied to the integrated profile of the individual. Opportunities are leveraged to create connections between products/service bundles and groups of individuals. They can be used in two ways: 1) opportunities can represent collections of products and services and be delivered to the right individuals; or 2) groups of individuals can be identified and corresponding opportunities created. These individuals can be informed about these collections of relevant products that are tied to them through these targeted opportunities. Or, a brand manager can create an opportunity based on a specific individual's profile and then find products and services that correspond to the opportunities.

vii) Emergent Behavioral Predictions, Content and People Voyeurism, Emergent Gaming Recommendations and connections are created by determining the individual and the individual's context, and extending the individual's graph by identifying a matching network of people who share the user and context characteristics. Based on the matched graph that establishes a broader social network that is similar to the user, connections can be made from the user to relevant products and services. For example, after matching users based upon multi-dimensional graph analysis as illustrated in FIG. 14, the system will be able to see the highest weighted group of users matched to the user and highest weighted behaviors that are associated with those users and will be able to predict a set of behaviors, e.g., what product a user is likely to purchase, based on the strength of the match between the user and groups of like users and their behaviors as illustrated in FIG. 15.

Figure 16:
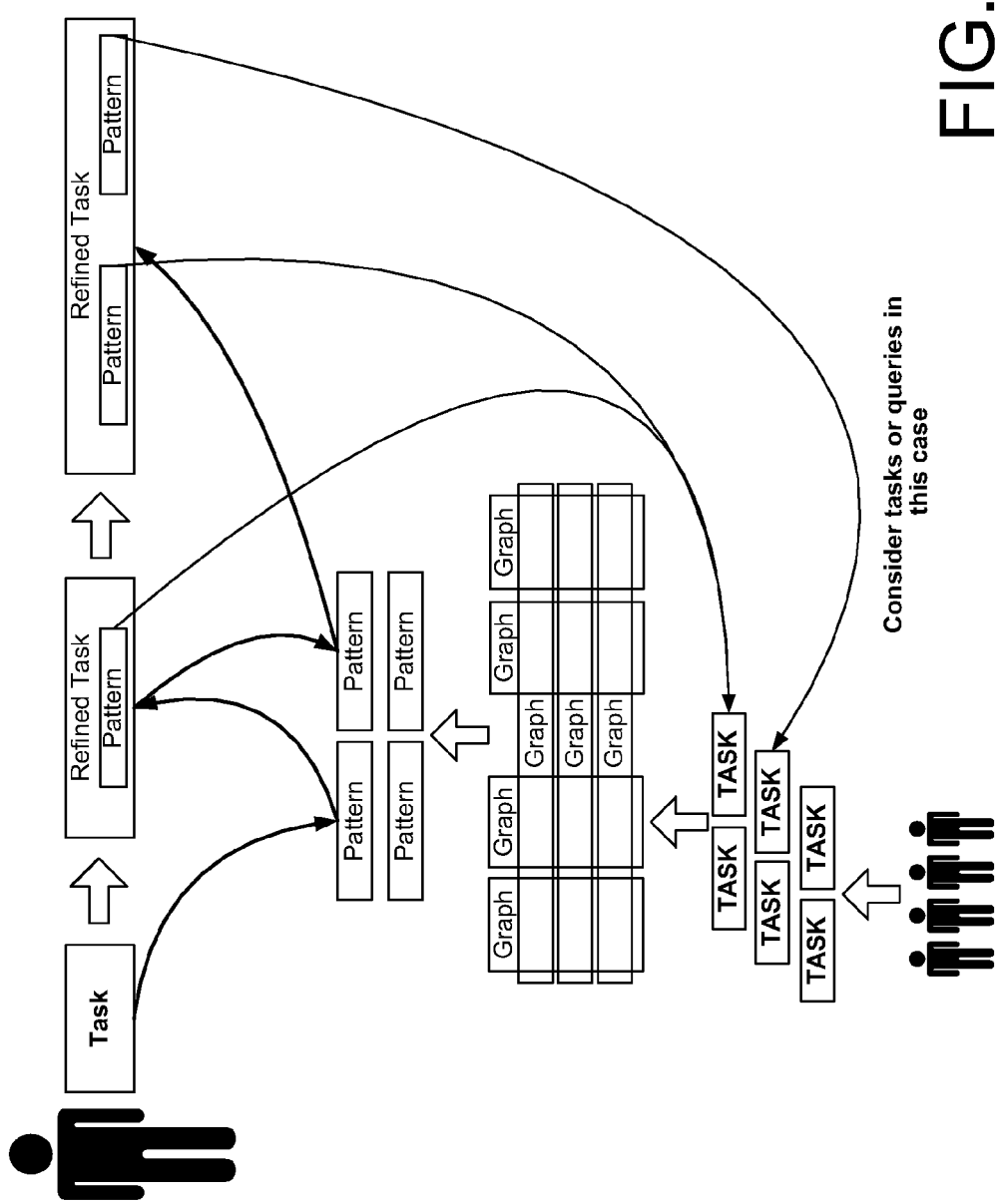
FIG. 16 shows system for understanding users based on context according to an embodiment of the present disclosure.
Figure 17:
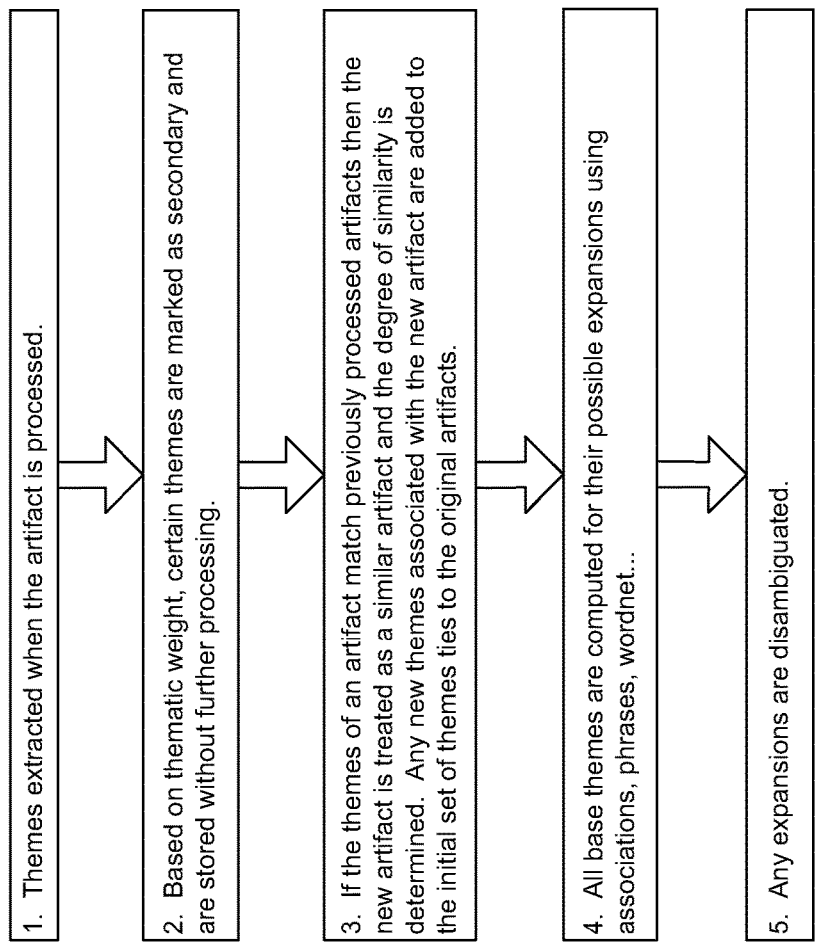
FIG. 17 shows a theme based process according to an embodiment of the present disclosure.
Figure 18:
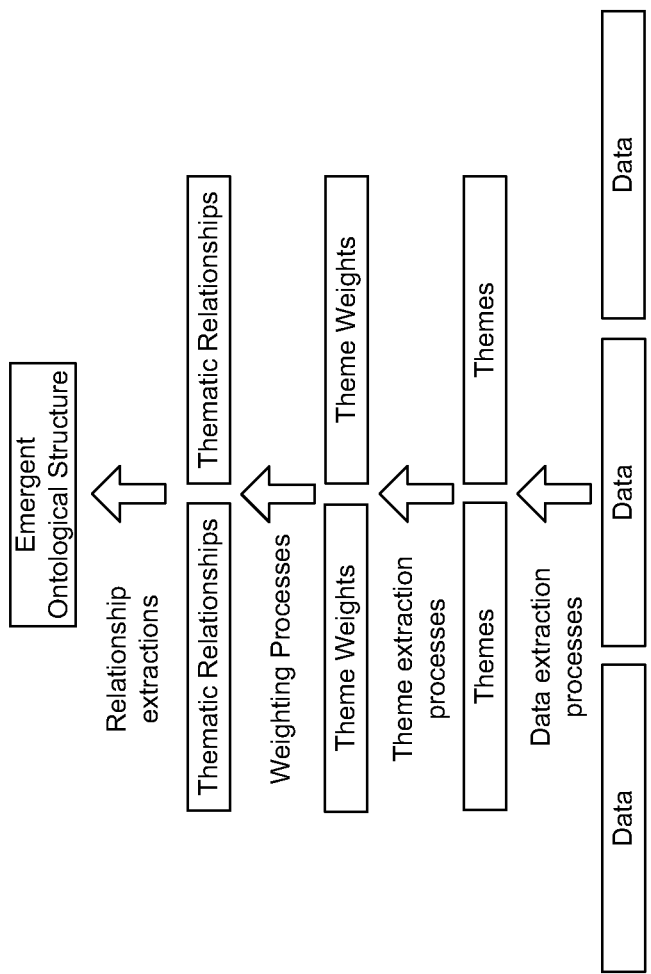
FIG. 18 shows a theme based process according to an embodiment of the present disclosure.
Figure 19:
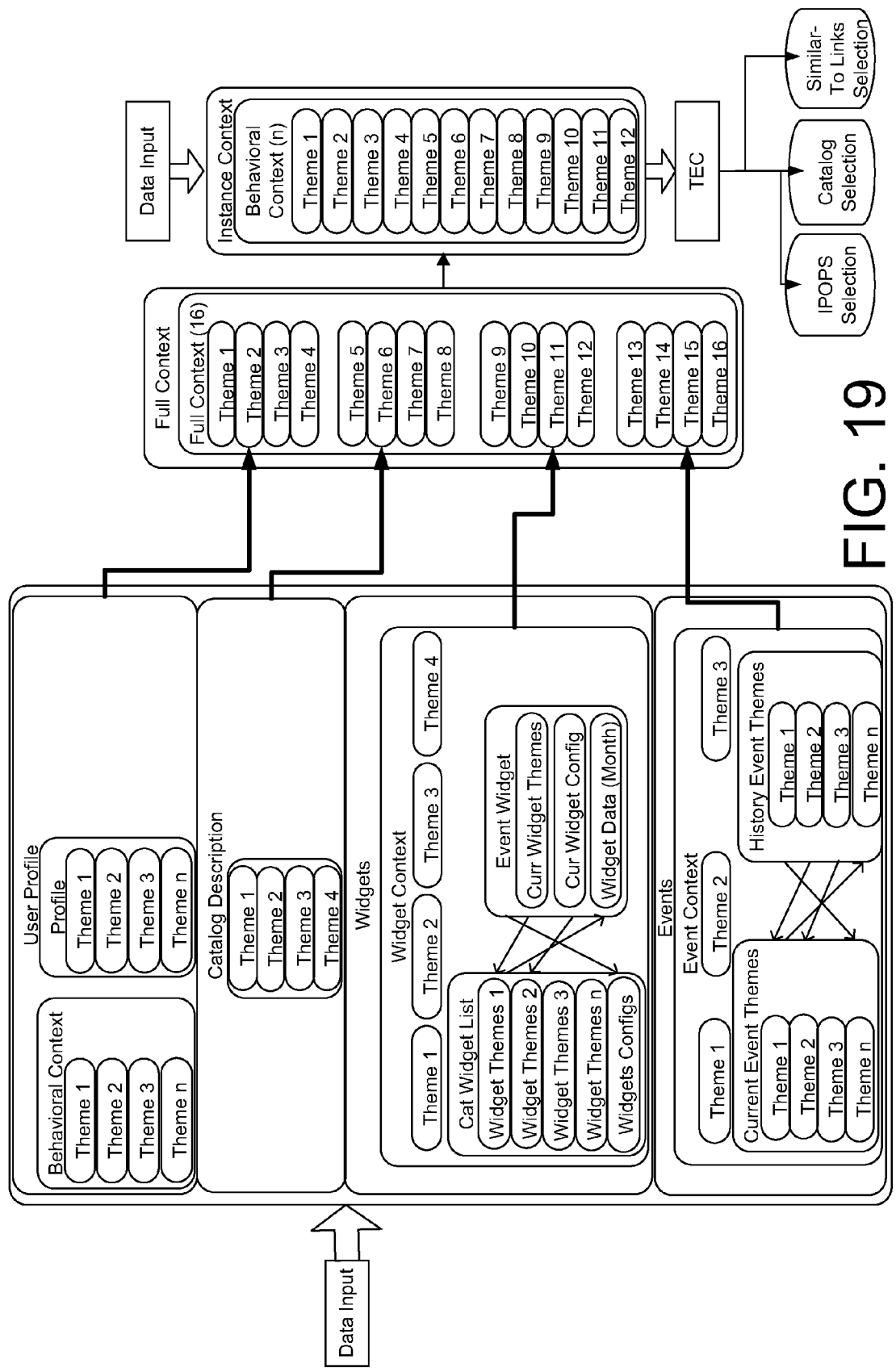
FIG. 19 shows a context based system according to an embodiment of the present disclosure.

To have maximum relevance it is critical that a buyer and seller are understood within context as shown in FIG. 16. In the present invention sellers are users with a contextual graph (commonly called a catalog of products and services). Buyers are users with a contextual graph of connections to specific products and services. These connections are established by creating thematic links between the user, the user's context, various products and services, etc. as shown in FIGS. 17-19. Emergent connections are created by linking the themes from the buyer and the themes of the seller. For example, a seller of fishing poles would be thematic related to the 'fishing' theme. An angler would similarly be thematically related to "fishing." For the angler, the "fishing" theme would be related to "fishing poles." The system would match the buyer and seller on the "fishing" theme and then connect the buyer and seller through fishing poles. Since this is accomplished graphically the matching occurs not by matching strings on terms but by matching graphs.

Figure 20:
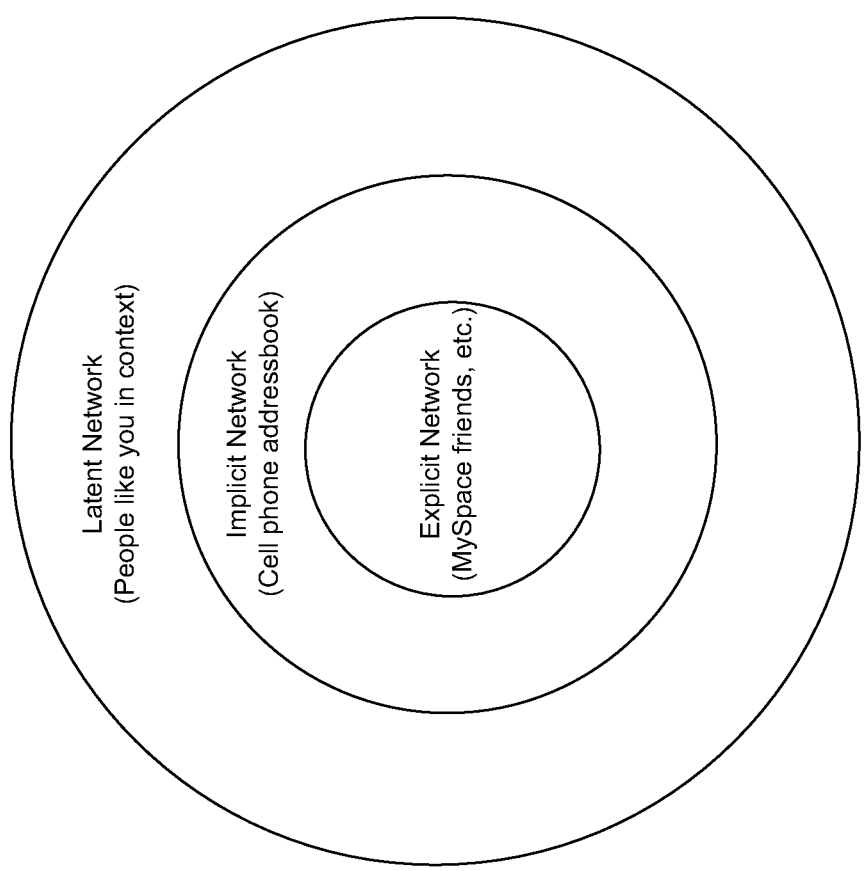
FIG. 20 shows a context based network system according to an embodiment of the present disclosure.

More particularly, recommendations and connections between individuals, products, catalogs, etc. are created by determining the individual and the individual's context, and extending the individual's graph by identifying a matching network of people who share the user and context characteristics considering explicit, implicit and/or latent networks of a particular user as shown in FIG. 20 as well as thematic or contextual associations between users. Based on the matched graph that establishes a broader social network that is similar to the user, connections to products and services are made. Members of the network that are less closely related to the user, or products and services and therefore graphically further way, may therefore be recommended less strongly. By way of particular example, considering a brand manager, the brand manager is tied to a set of products and these products are tied to a set of life problems or needs that the product can resolve. Thus, a brand manager, her products, and the associated life events operating as a context can be mapped to a social network of people closely related to that product.

Figure 21:
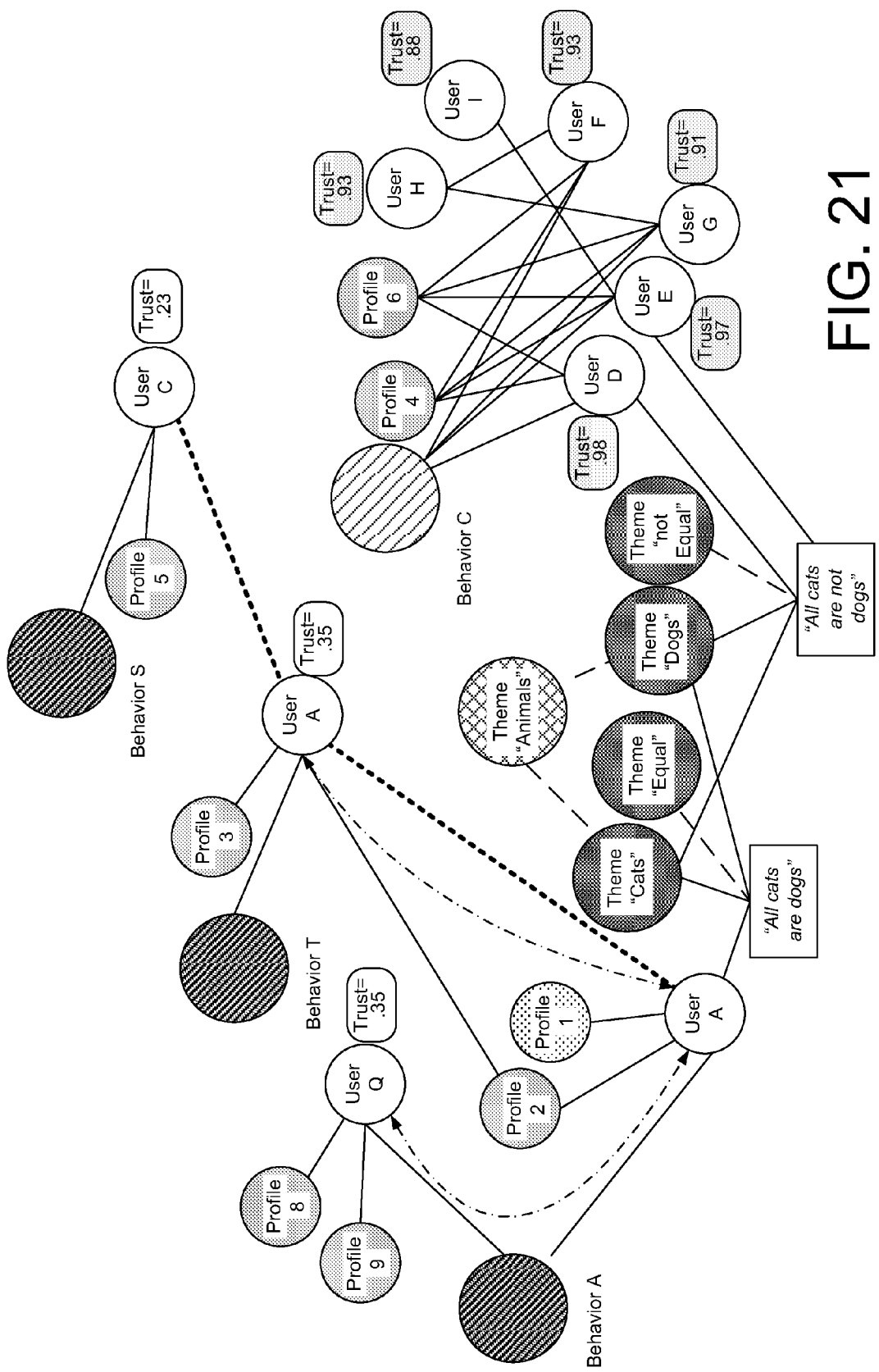
FIG. 21 shows a system based on trust and reputation according to an embodiment of the present disclosure.

Within the system trust and reputation based weights may be utilized when providing recommendations. In this regard, as illustrated in FIG. 21, trust and reputation determinations occur through the use of three mechanisms: 1) trust based upon the trustworthiness of the user's social graph (e.g., explicit trust/reputation rations); 2) trust based on the user's latent social graph in which trust is determined based on latent strengths of profile, behavior, and context; and 3) trust established by determining the matches of the thematic graph of the user's assertion to other assertion graphs. Thus, using this criteria, trust and weights can be established based on the degree to which graphs match.

Figure 22:
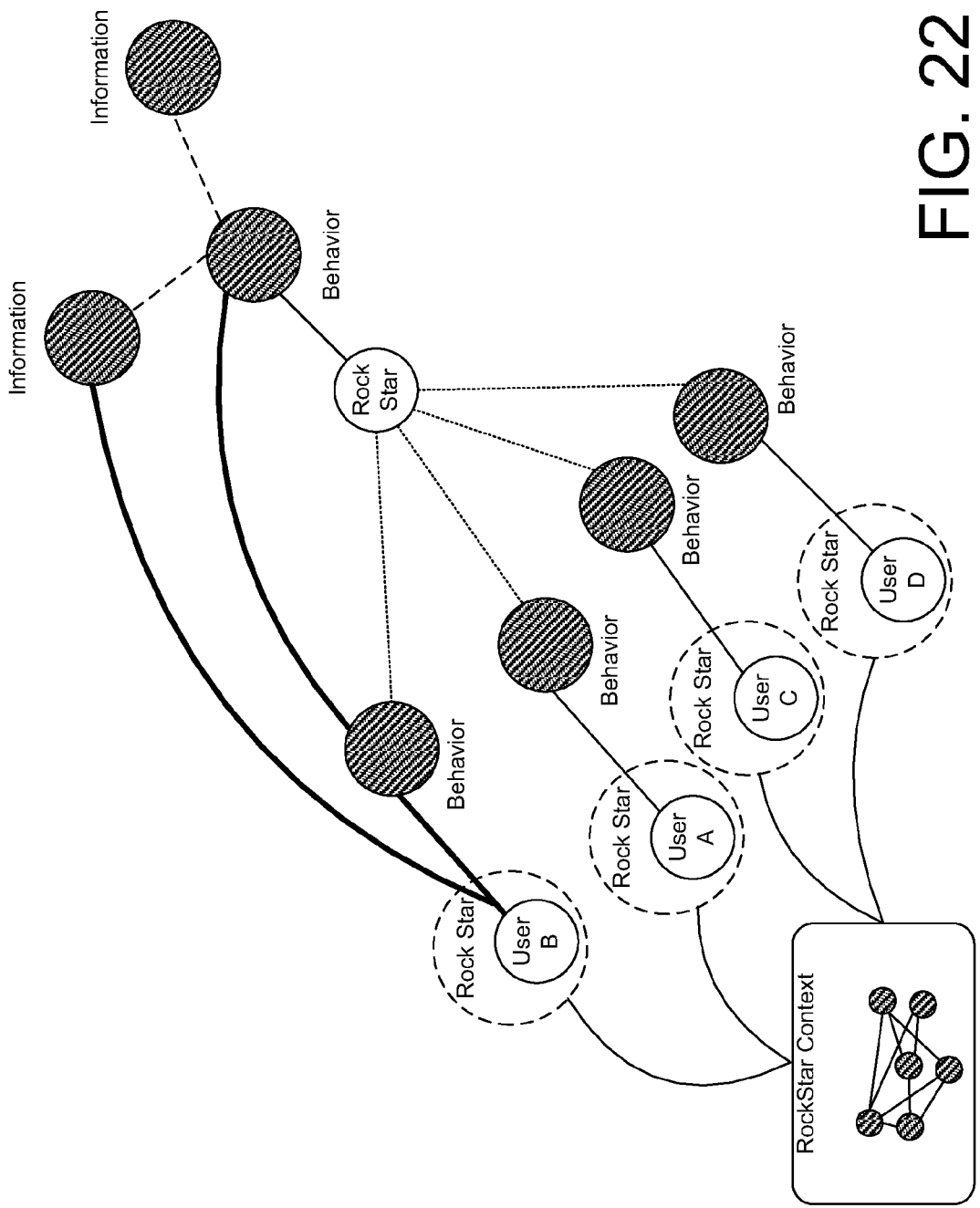
FIG. 22 shows persona assumption according to an embodiment of the present disclosure.

To provide voyeurism, the system may also provide for a user to step into the shoes of another user to see what products, content, catalogs, etc. would be of interest to that user. To this end, the system may allow a user to assume the graph of a particular user and thereby be treated as the user within the system, i.e., be presented with the opportunities that person would be presented with. For example, as illustrated in FIG. 22, a person can assume the persona of a "rock star" and will use within the system the graph associated with that "rock star" persona to thereby assume the same behaviors, contexts, information, opportunities, that are linked to that persona. It is to be appreciated that an adoptable persona can belong to a real person, e.g., a known friend which will allow a user to shop as that person, or the persona can be developed over time by allowing multiple users to interact with the system in that persona to thereby develop the links, behaviors, etc. to be used in the graphs of that persona.

Figure 23:
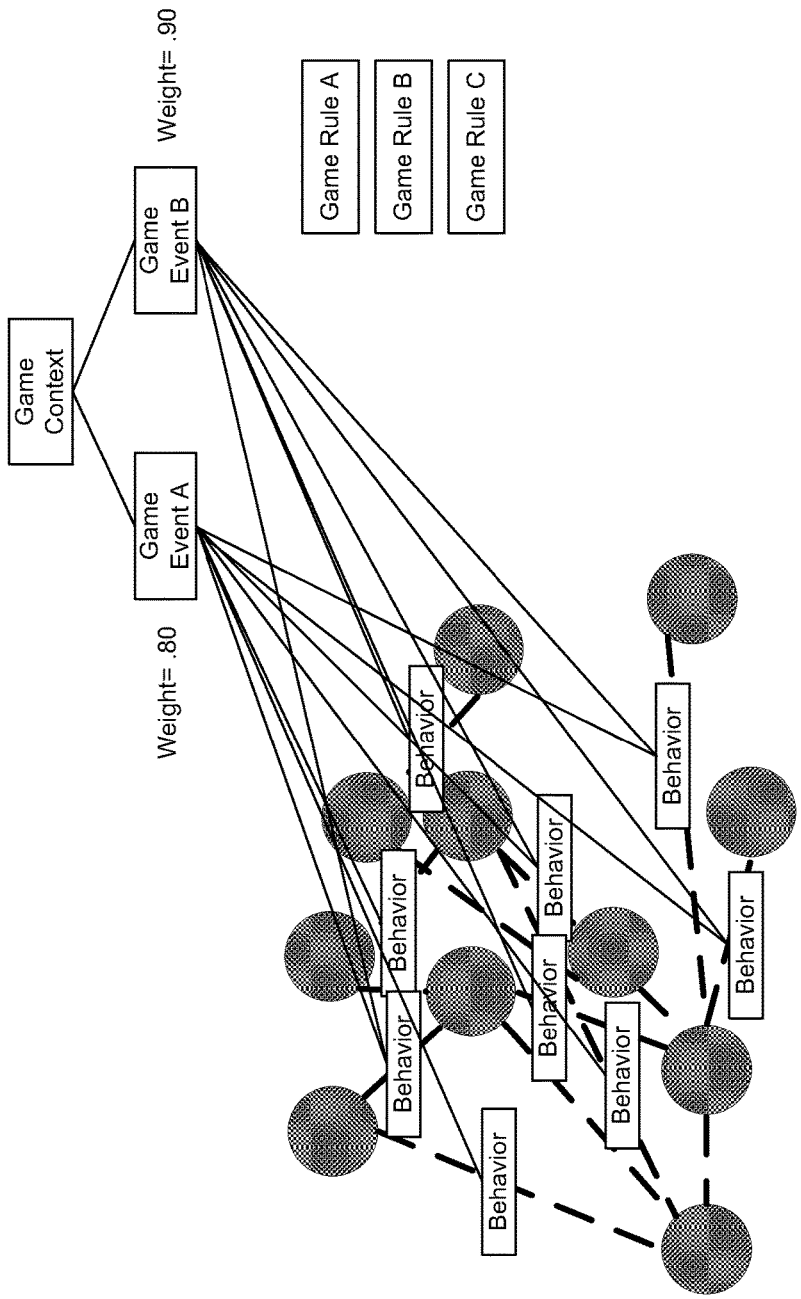
FIG. 23 shows a gaming system according to an embodiment of the present disclosure.

It is similarly contemplated that social network behaviors could also be used to provide emergent gaming. For example, based upon the behaviors of discerned similar users within the network, weights may be assigned to various rules, environments, etc. that are to be used during game play. Using such weights, a user can thus be provided with a gaming experience that utilizes the rules, environment, etc. that are most likely to be appealing to that user as indicated by those users having similar graphs as illustrated in FIG. 23.

vii) Dynamic Pricing of Products, Services, and Information

As noted above, the strength of relationships between products and the individual, and the strength of products to each other, based on context, provides a weight. The weight can be used as a factor in determining pricing of products, services, and information that will be provided to a user. Thus, a graph consisting of a fishing pole, reel, and fishing line, would suggest a higher price for the bundle or a higher price for an individual item if the other two items have been purchased. A product/service that is less strongly related may require a lower price.

viii) Example of System as Used to Conduct Commerce

Generally speaking, in use the system provides technology with which vendors may bundle product and service offerings together, i.e., as mash-ups, to present commercial opportunities to consumers in an unobtrusive and targeted manner. A fundamental concept underlying various embodiments is the idea of applying a social mash-up to the commercial context, and relying upon links and relationships between people, products, services and content in general, as opposed to the traditional two-party, consumer-vendor relationship we have grown accustomed to seeing.

Figure 24:
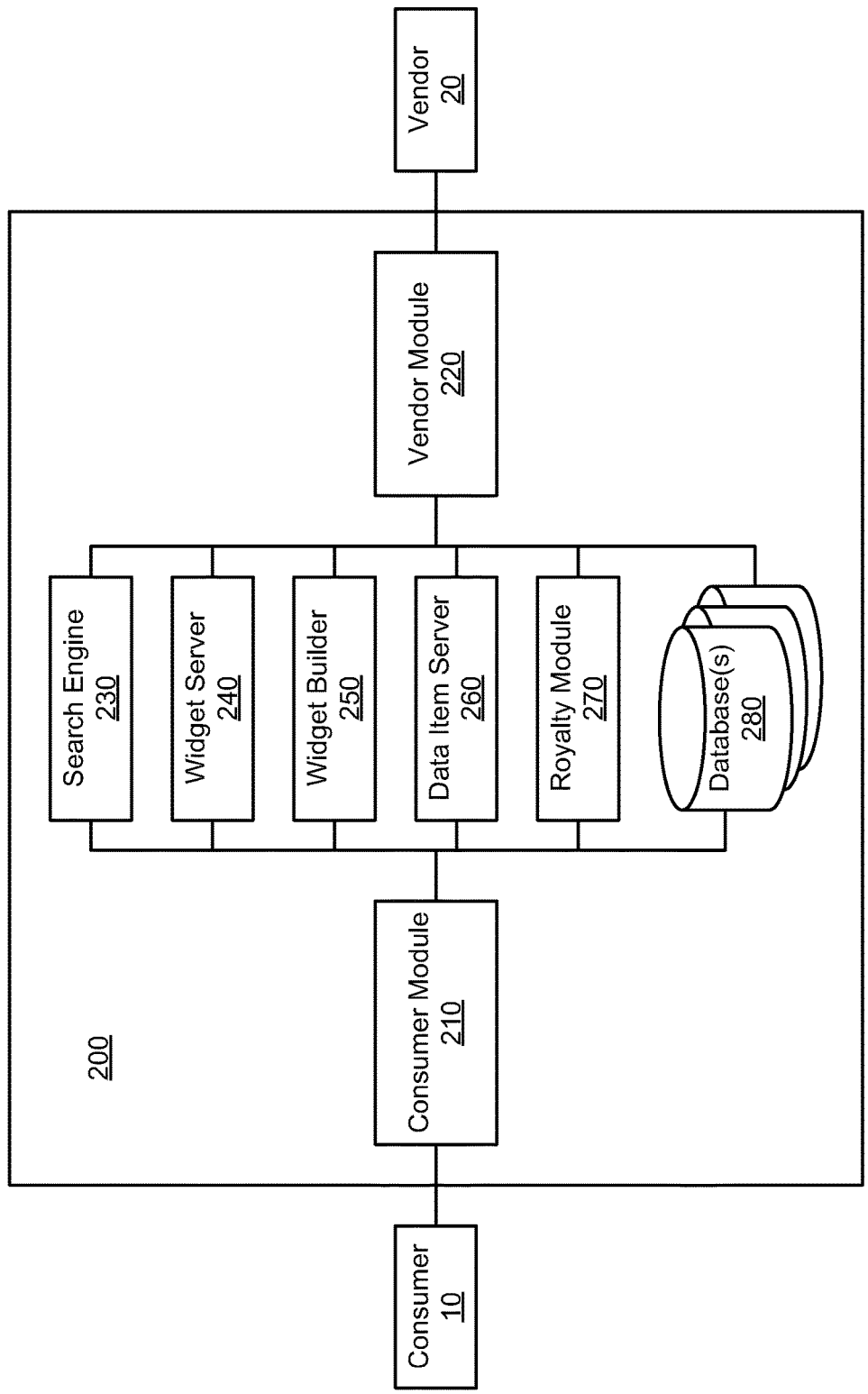
FIG. 24 shows a system accessible by a consumer and a vendor according to an embodiment of the present disclosure.

As discussed above, the subject system serves as a platform for exchanging information and transacting business between a plurality of consumers and a plurality of vendors. In particular, this is achieved, as illustrated in FIG. 24, by providing the consumers and the vendors 20 with access to several powerful components of the system 200, including but not limited to a search engine 230 (which relies at least in part upon the graph fusion techniques described above), a widget server 240, a data item server 260, a royalty module 270, and one or more databases 280, by way of respective consumer modules 210 and vendor modules 220.

Figure 25:
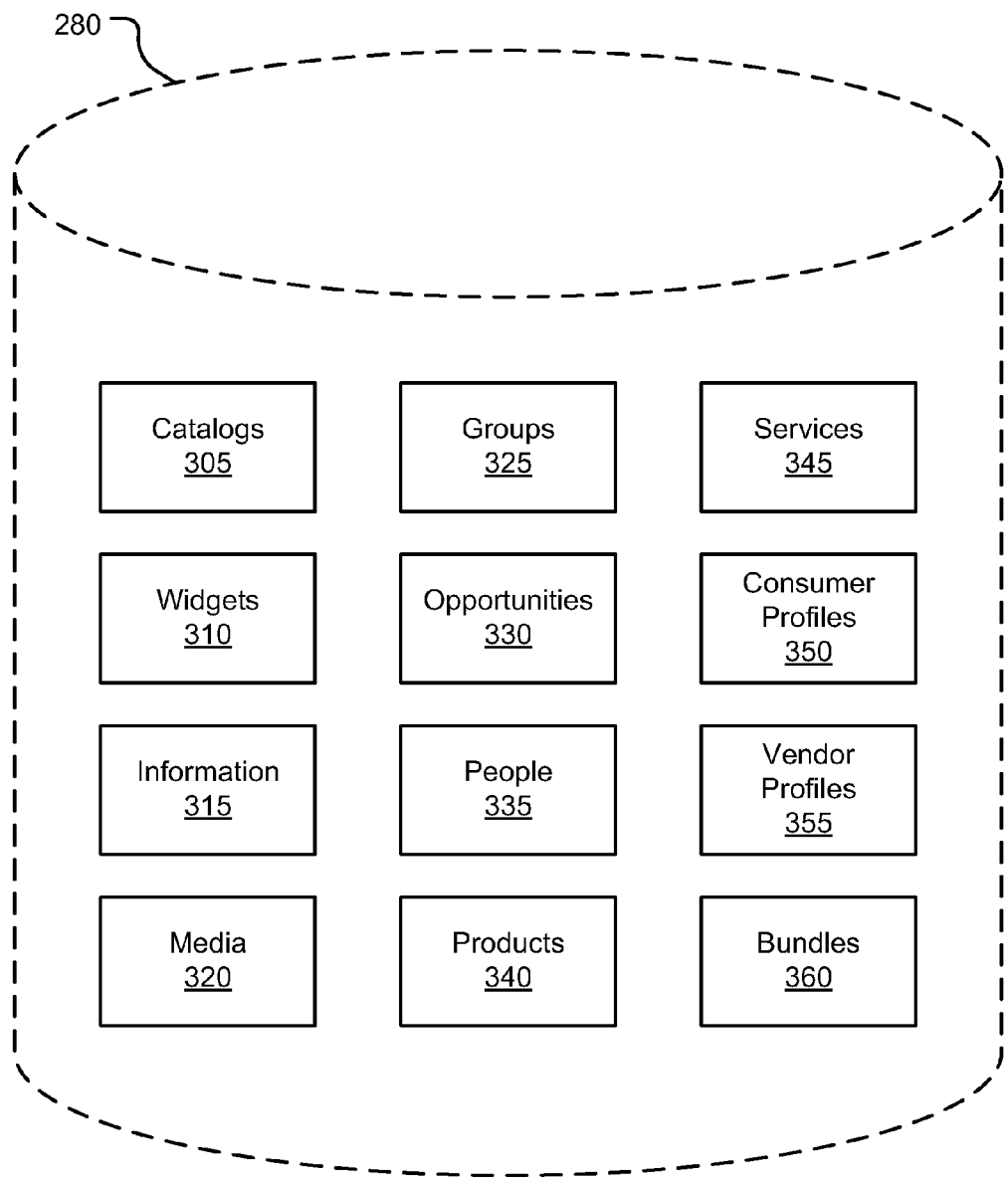
FIG. 25 shows a database according to an embodiment of the present disclosure.
Figure 35:
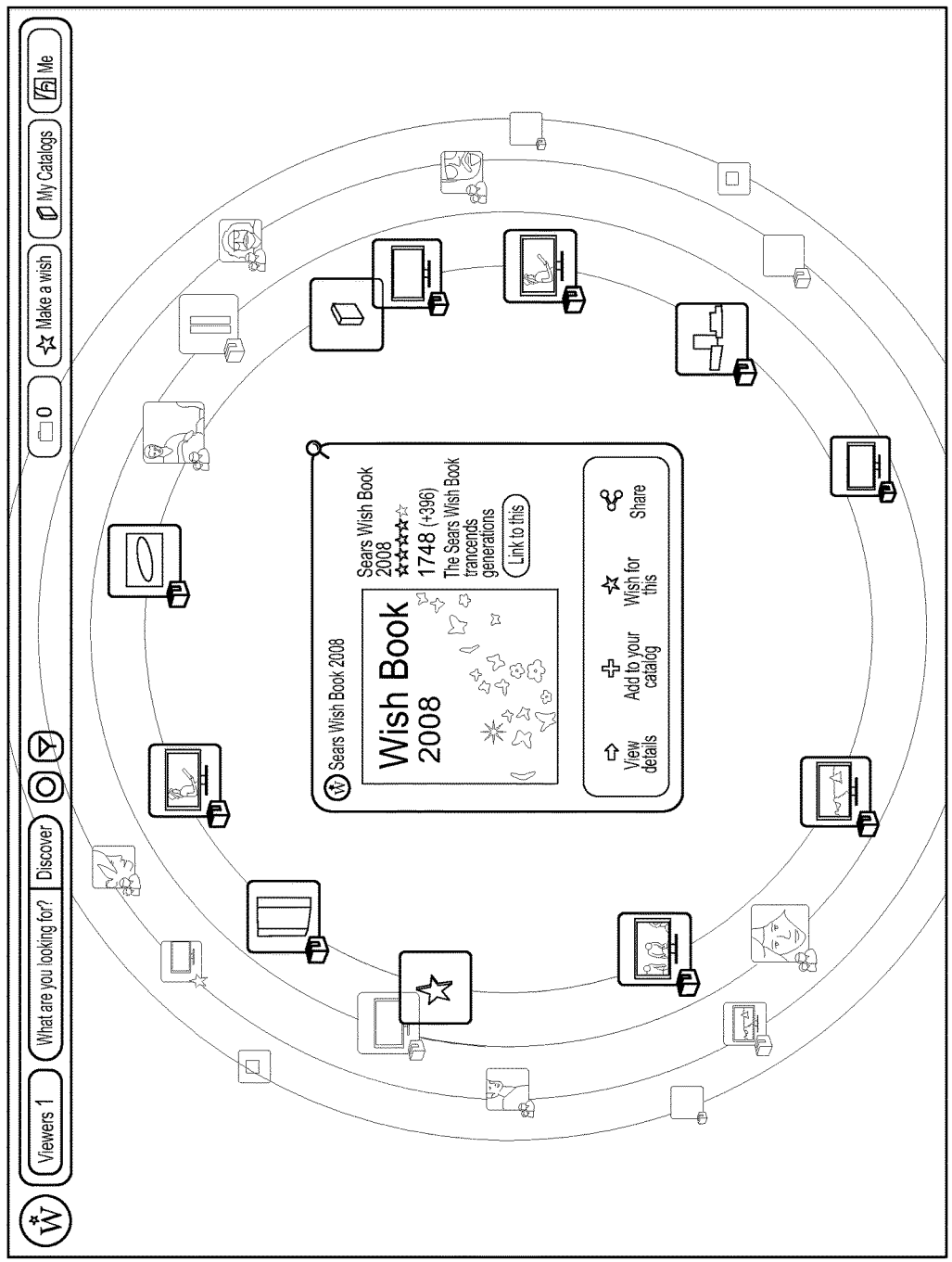
FIG. 35 shows a user interface according to an embodiment of the present disclosure.

The database 280 functions to store a plurality of data items. Data items are extracted during a pre-processing of artifacts from the data store. By way of example, FIG. 35 illustrates such pre-processing of artifacts and FIG. 25 illustrates a non-exhaustive diagram of the types of artifacts that may be stored within database 280. As shown, the types of artifacts include, but is not limited to, catalogs 305, widgets 310, information 315, media 320, groups 325, opportunities 330, people 335, products 340, services 345, consumer profiles 350, vendor profiles 355, and bundles 360.

Figure 50:
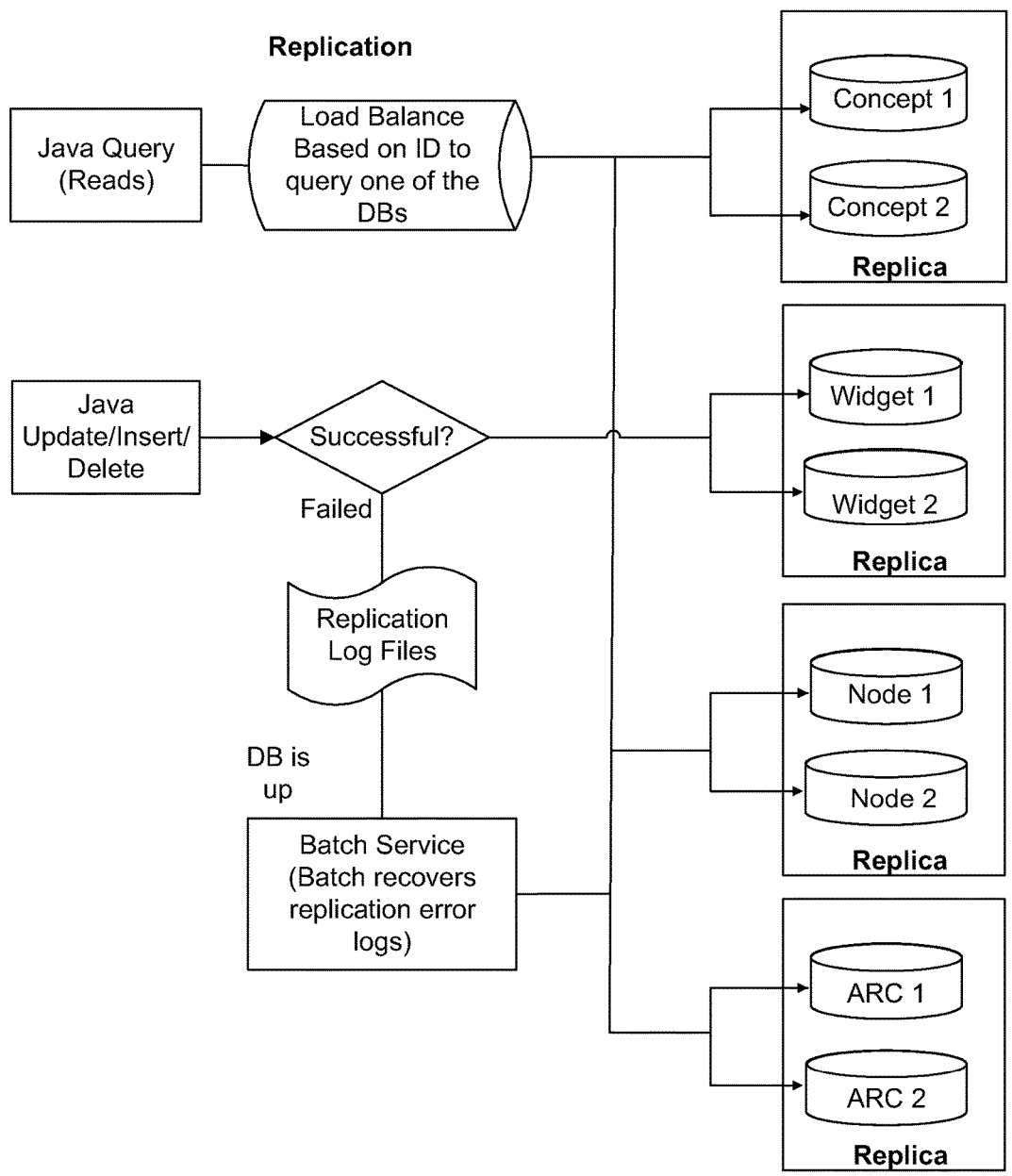
FIG. 50 shows a replication system according to an embodiment of the present disclosure.

As additionally illustrated in FIG. 50, the database 280 may be implemented as a shard database. For example, the system may utilize multiple, replicated database pairs where any database activity to a replicated database will cause the other database in the pair to be updated. If one of a pair is down, a file system is used to log errors and that database will auto-sync when it next comes back on line. In addition, all queries will be spread across both databases in each pair based on various sharding rules.

Database 280 not only stores the artifacts themselves, but also stores the data items structural relationship with the artifacts, the semantic relationships between data items, associations between the data items and user characteristics, associations between data items and contextual data defined by user behavior and session specific user provided data, and links, associations, and/or relationships between the artifacts. Furthermore, rather than simply storing and accessing these artifacts individually, the system 200 works with sets computed based on similarity or interrelatedness (i.e., by using fractals) and stores these sets as indexes in a multi-dimensional format in the database. Thus, by way of example only, the database may store data such as:

1. Node (1/2)—contains the following tables and is oriented around the main aspects of recording the nodes of the graph, or related tables that must be replicated.
   a. Artifact
   b. Control
   c. NodeMaster
   d. SimilarTo
   e. Stemming 2. Concept (1/2)—contains all Concept tables and ArcTheme and is oriented around returning the base concept node data.
3. Context (1)—contains ConceptBehavior
4. Context (2)—contains CatConcept
5. Arc (1/2)—contains Instance and TagInstance and is oriented around the Arcs from Widgets, which are, unlike standard TEC arcs, explicitly stated.
6. Widget (1/2)—contains all the widget Generic DB tables
7. ComCtl—contains all supporting tables that are not replicated, including: Parse, NodeInstance, Globals, CacheTables, User Seeding.
8. Batch—contains all batch server tables, and is not replicated. Note that the API Log table does have a file system backup generated.

Moreover, database 280 is not restricted to any specific type of data, but rather is operable to store a number of diverse types of artifacts.

Within the present system, the catalogs 305 are of particular significance, because they are one primary vehicle by which consumers 210 and vendors 220 are able to customize their experience within the system 200. In essence, a catalog 305 is a collection of one or more other artifacts, which may include other catalogs. For example, one user may have created a cooking catalog that includes some of the user's favorite foods, recipes, and cooking appliances. However, the catalog may also include people 335, such as famous chefs of whom the user is a fan. The catalog may also include another catalog, such as one created by one of the celebrity chefs. The catalog may also include a widget 310, such as a "purchase" widget that allows other consumers 210 to purchase one or more of the items in the user's catalog.

The inclusion of selected artifacts into a catalog 305 may be implemented by way of links from the catalog 305 to the selected artifacts. In situations where a dynamic item, such as a group 325, a user profile 350, 355, or another catalog 305 is included in a user's catalog, a change made in the dynamic item may thus be reflected through to the user's catalog. In some situations, however, a user may not be interested in changes to dynamic items, but rather the user may prefer to preserve the present state of such item. Thus, in one embodiment, a user also has the option of "pinning" a dynamic item into the user's catalog, such that a static "snapshot" of the dynamic item is placed into the catalog, rather than a link to the dynamic data.

As discussed above, system 200 organizes the artifacts based on relationships and links. For example, users can link to each other and form groups 325. Users can also links to other artifacts by way of catalogs 305. In addition, some links between artifacts may be contextual. For example, a product artifact 340, such as one corresponding to a particular model of car may in turn be linked to information artifacts 315 including product reviews and information about the manufacturer, media artifacts 320 such as demonstrative videos, vendor profiles 355 of car dealers selling the subject car, commercial opportunities 330 involving the subject car, etc. Indeed, as discussed below, various embodiments present artifacts to the user in a manner that highlights such connections.

a) Exemplary Consumer Experience

Figure 26:
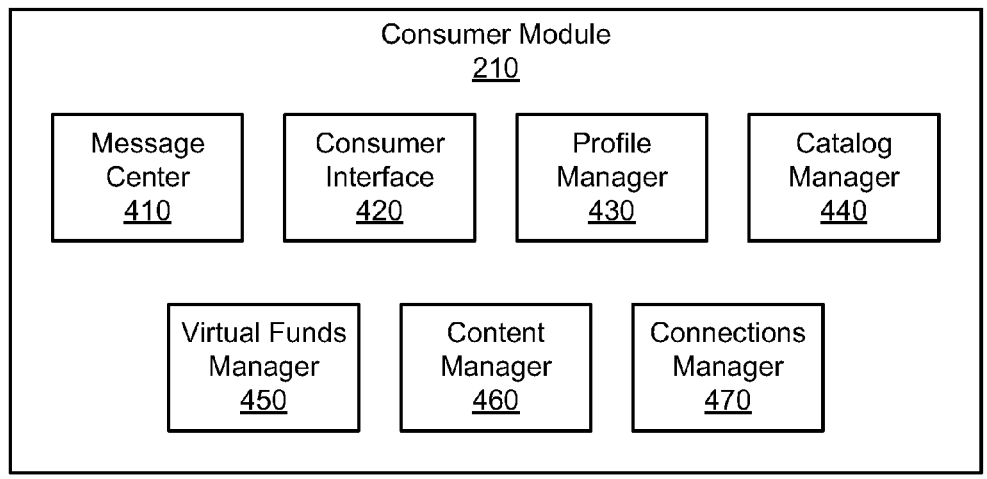
FIG. 26 shows a consumer module according to an embodiment of the present disclosure.

FIG. 26 illustrates a detailed block diagram of the consumer module 210, in accordance with various embodiments of the present invention. The consumer module 210 includes a consumer interface 420, which is a graphical user interface that allows a consumer 10 to interact with the system 200.

By way of the consumer interface 420, the consumer 10 has access to the other components of the consumer module 210.

As an initial matter, in order to gain access to many of the components of the consumer module 210, as well as to fully benefit from the features of system 200, a user may establish a user account and corresponding user profile. To that end, consumer module 210 includes a profile manager 430, which allows the user to create and manage the user's profile. A user profile may include, but is not limited to, information such as the user's contact information, users demographic information, as well as other information unique to the user, such as the user's interests, hobbies, education, languages spoken, etc. The information in the users profile may then be used to help define the users context—a concept which is discussed in greater detail below.

Figure 44:
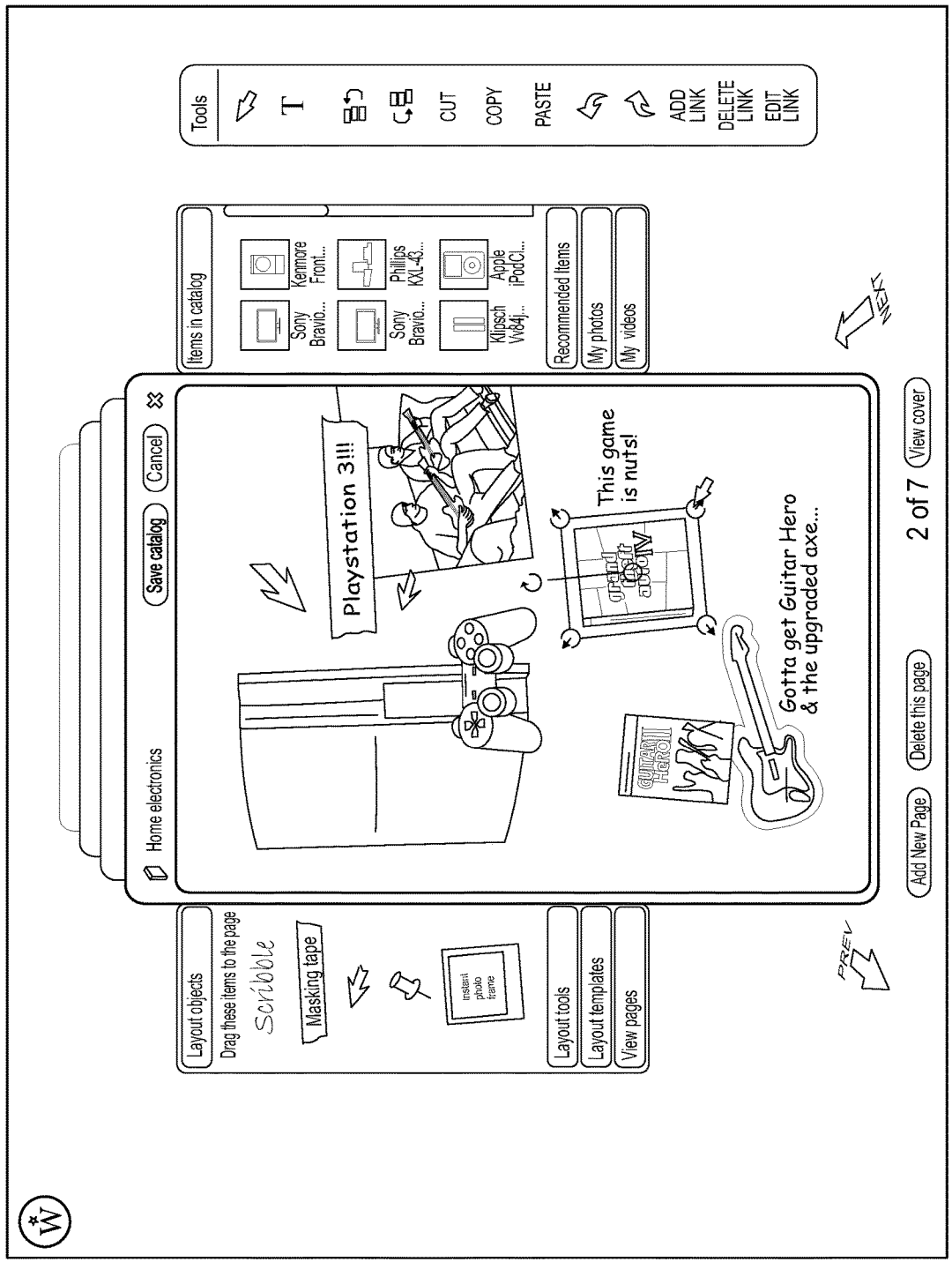
FIG. 44 shows a user interface according to an embodiment of the present disclosure.

The consumer module 210 also includes a message center 410, through which a user is able to send and receive e-mails and instant messages to and from other consumers 10 and vendors 20. The consumer module 210 also includes a catalog manager 440 for creating, organizing and managing the user's catalogs. FIG. 44 illustrates an example screenshot of one possible user interface for interacting with the catalog manager 440.

The consumer module 210 further includes a virtual funds manager 450 for managing virtual funds associated with the user's account (discussed in greater detail below), and a connections manager 470 for managing the user's connections, separate and apart from catalogs, to other artifacts in the database 280. In addition to the various data items already present in the database 280, users are able to provide their own content, such as products or services they wish to sell, digital media they wish to share, or commercial opportunities they wish to present. To this end, the consumer module 210 also includes a content manager 460, which allows users to add their own personal content to the database 280 and subsequently manage it.

In addition to accessing the other components of the consumer module 210, a user is also able to access information contained in the database 280 through the consumer interface 420. FIG. 35 illustrates a screenshot of one way in which artifacts may be presented to a user, in accordance with an embodiment of the present invention. As illustrated, the consumer interface 420 may not simply present a single artifact or even a one-dimensional list of artifacts, but rather the artifacts may be presented in a multi-dimensional graphical form where the artifacts may vary in size as well as transparency. The collection of artifacts that are displayed at any given time may in part also define the context referenced above. As used herein, the "context" is a concept that may be based on a number of factors, which may include, but are not limited to, the collection of artifacts that are displayed at any given time, information in a user's profile, the user's browsing behavior, such as browsing and searching history, external factors (discussed below), or the like.

In various embodiments, artifacts that are considered more relevant to the current context are displayed more prominently than those artifacts that are considered less relevant. In the illustrated embodiment, the "Sears Wish Book 2008" (a catalog) is considered most relevant to the context therein and is thus displayed in a prominent position (e.g., the center of the screen), in a relative size that is larger than the surrounding other artifacts. Among other options, the user may choose to "View details," in which case the consumer interface 420 may invoke a viewer widget (specifically, a catalog viewer widget) by way of the widget server 240 and display the Sears Wish Book 2008 catalog, in one embodiment, as shown in FIG. 36.

Figure 36:
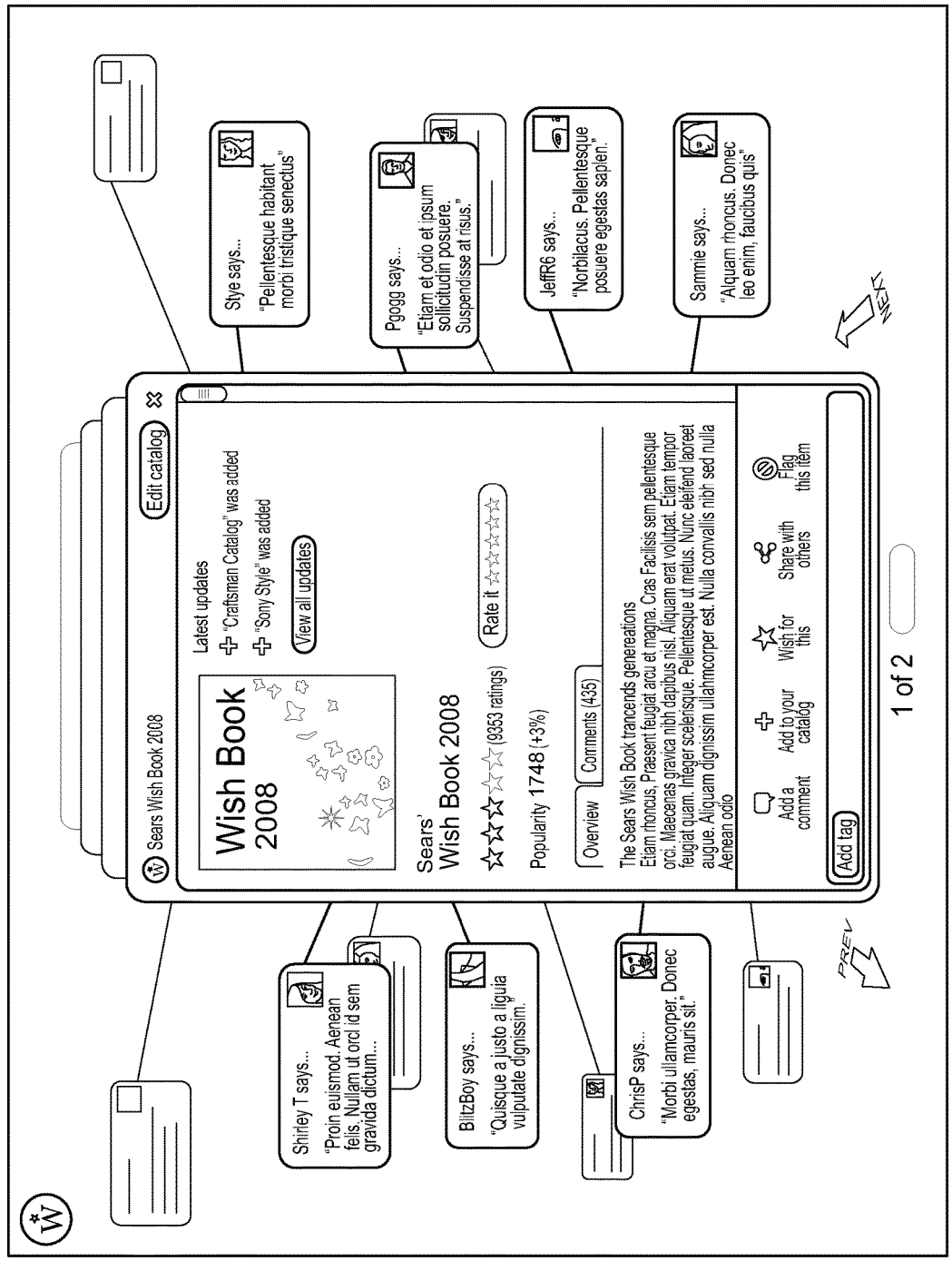
FIG. 36 shows a user interface according to an embodiment of the present disclosure.
Figure 37:
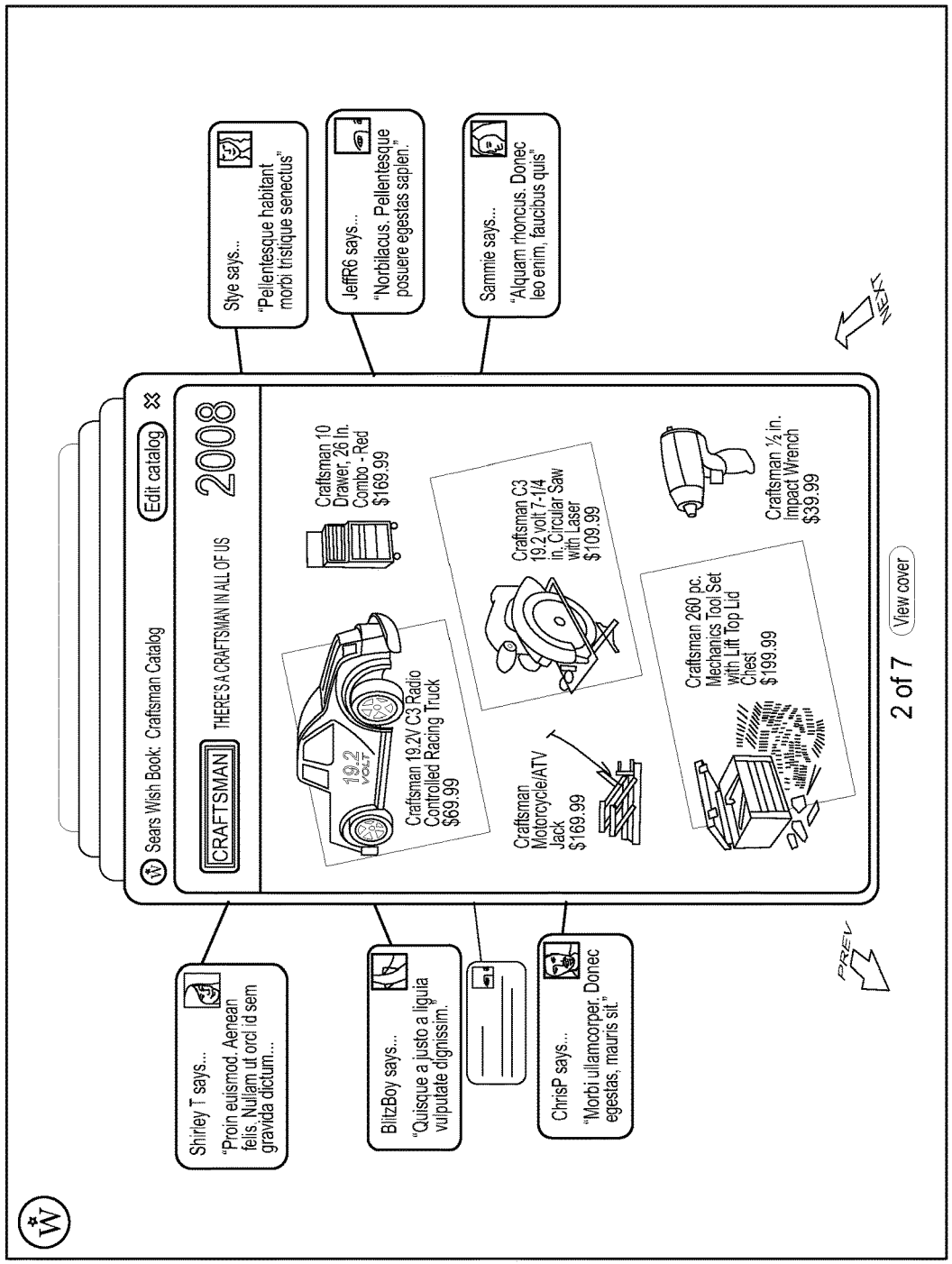
FIG. 37 shows a user interface according to an embodiment of the present disclosure.

FIG. 36 also shows that the "Craftsman Catalog" is also nested within the Sears Wish Book 2008. Accordingly, a user is able to access the Craftsman Catalog through the Sears Wish Book 2008. In so doing, the appropriate viewer widget is again invoked by way of the widget server 240 and, in one embodiment, the Craftsman Catalog is displayed as illustrated in FIG. 37.

Another important feature of various embodiments of the present invention is an intelligent search engine 230. Search engine 230 is considered intelligent in that, in one embodiment, it does not simply take a search term in isolation and return the most applicable result. Rather, when conducting a search, the search engine 230 also considers the context in which the search is made. In various embodiments, the "context" may include information specific to the user conducting the search, such as certain information obtained from the user's profile. For example, if a user indicates in his profile that he is an avid flyfisherman, and the user searches for "fishing," data items specifically relating to flyfishing, as determined using graph fusing techniques, are more likely to be relevant to the user and data items relating to ice fishing. The context may also include the user's browsing habits, such as recent browsing history or past searches. For instance, if a user has been viewing several data items relating specifically to flyfishing, and then the user searches for "fishing," data items relating to flyfishing are again determined to be more likely relevant to the user. Similarly, if the user had conducted similar searches in the past and tended to choose search results that related to flyfishing, even though the user may have only searched for "fishing," then the search engine 230, considering the context and graphs, will determine that data items relating to flyfishing have greater relevance to the current search. The "context," as discussed above, may be implemented as user-specific heuristics. The context may also include external factors, which may include, but are not limited to, time of day, time of year, market conditions, location, weather, etc. For example, if a user searches for "fishing" in the month of December, data items relating to ice fishing are likely to be more relevant than those relating to flyfishing.

Figure 28:
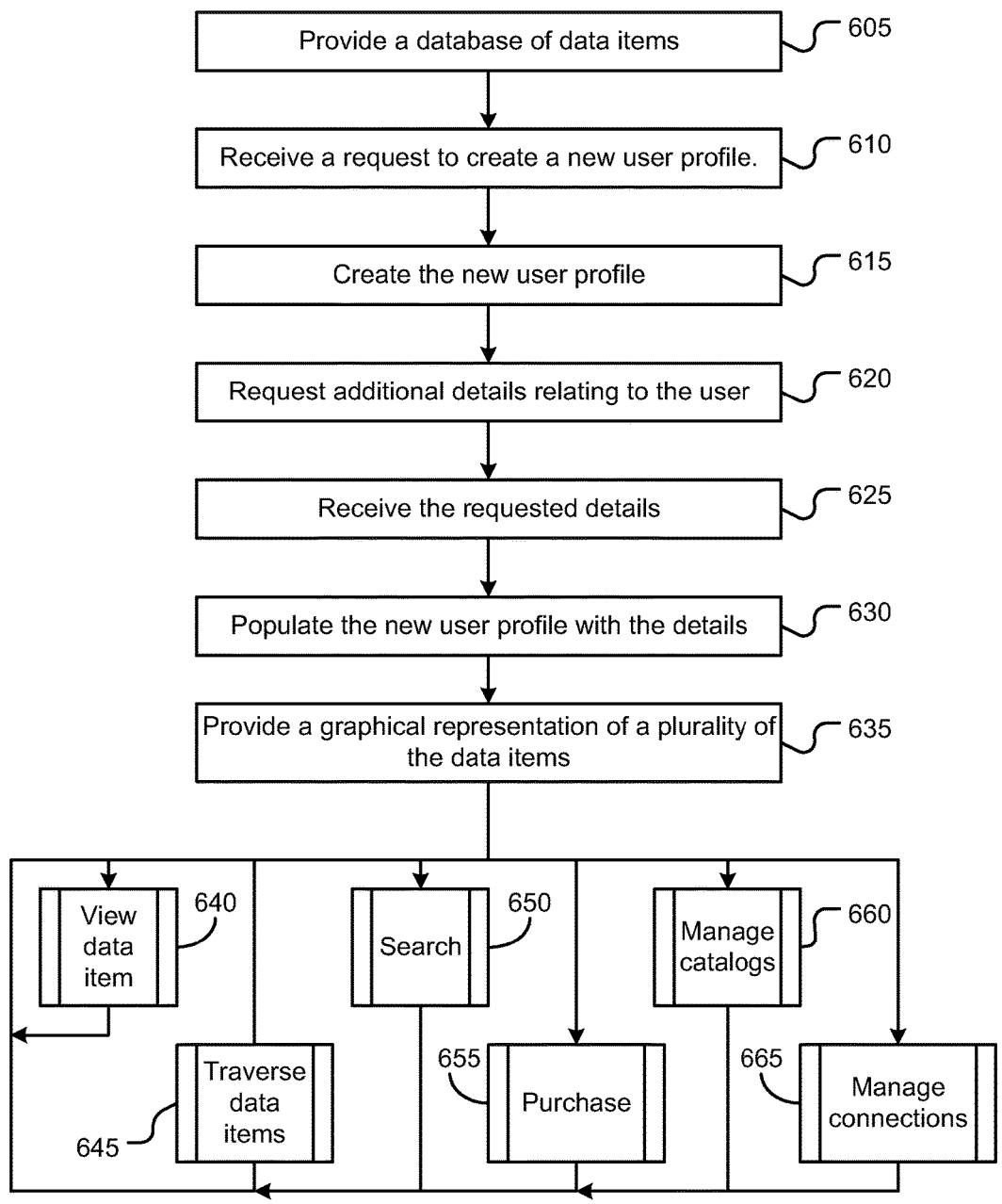
FIG. 28 shows a process for providing a social commerce network according to an embodiment of the present disclosure.

FIG. 28 illustrates an example user interface for conducting a search and returning search results, in accordance with an embodiment of the present invention. In the illustrated embodiment, a user has searched for "electronics." The user interface then displays the more relevant search results more prominently than those that are less relevant. In particular, the search engine 230 has in this instance determined that in view of the user's context, a person who calls himself "Electronics GURU" is the most relevant search result. As the other search results fan further out from the Electronics GURU, they are deemed less relevant by the search engine 230 and accordingly are displayed as smaller images with increased transparency. In one embodiment, as the system 200, by utilizing one or more agents, continues to "learn" from a user's browsing behavior, a data item that was once deemed relevant to a certain context may over time be deemed less and less relevant, such that the data item is displayed less and less prominently, and eventually disappearing from the display altogether. Conversely, a data item that was not originally considered relevant enough to display may over time become relevant enough to display. In determining relevance to a search, the search engine 230 may determine corresponding relevance scores/weights for the search results as discussed previously.

Figure 39:
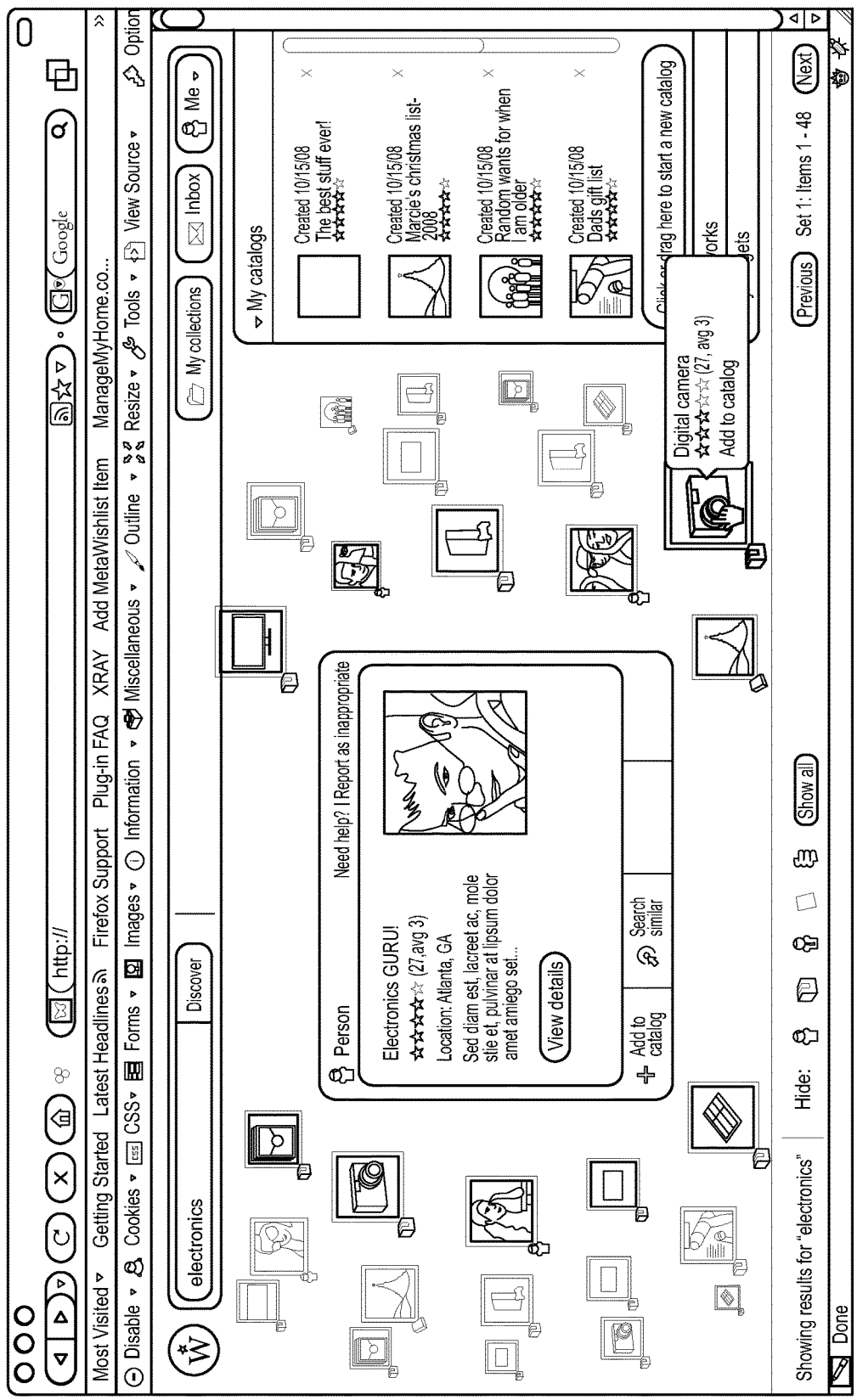
FIG. 39 shows a user interface according to an embodiment of the present disclosure.

In the present example, notwithstanding the fact that the search engine 230 considered the Electronics GURU to be the most relevant search results, the user may nonetheless be looking for a particular digital camera, as illustrated in FIG. 39. Should the user select a search result other than the most prominent one, the search engine 230 will refine the search results based on the user's selection and present a new set of search results to the user where, in one embodiment, the item selected by the user becomes the most prominently displayed search result—in essence "reshuffling the deck." Thus, the user's selections after the search is first conducted may also become part of the context for the search. Because the search results are continually refined based on selections made by the user, the present system virtually eliminates the need for a "Back" button.

Figure 40:
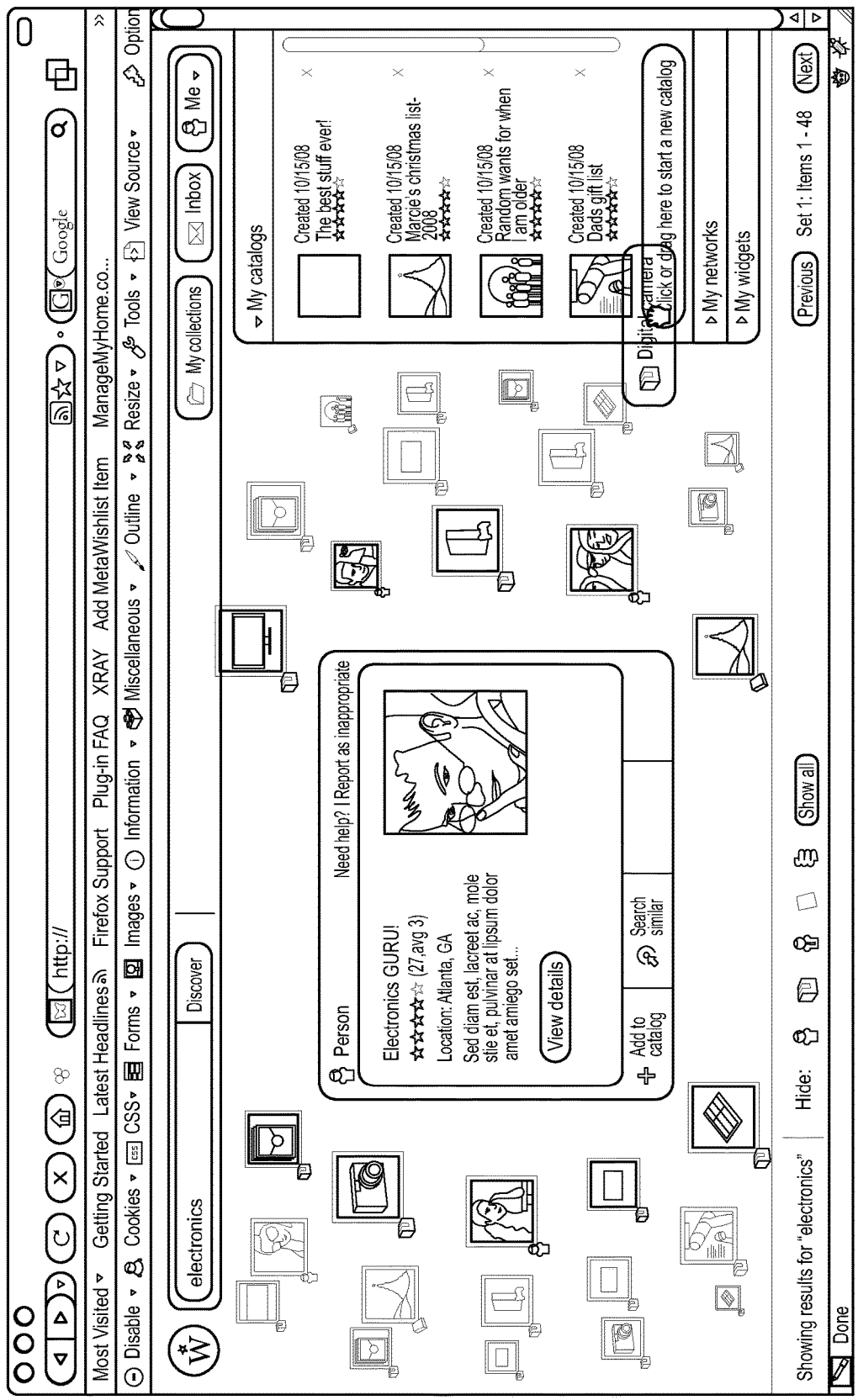
FIG. 40 shows a user interface according to an embodiment of the present disclosure.
Figure 41:
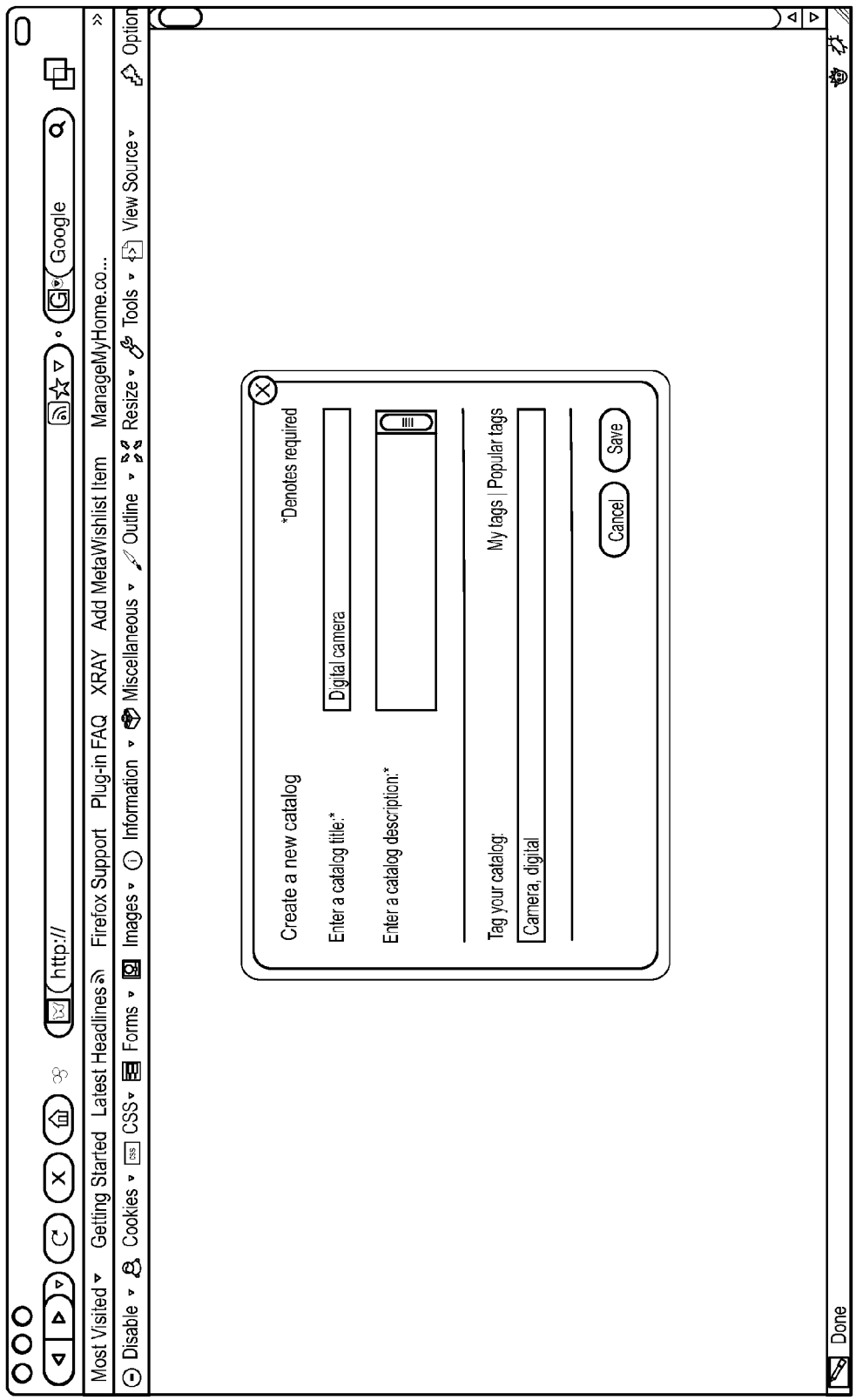
FIG. 41 shows a user interface according to an embodiment of the present disclosure.
Figure 42:
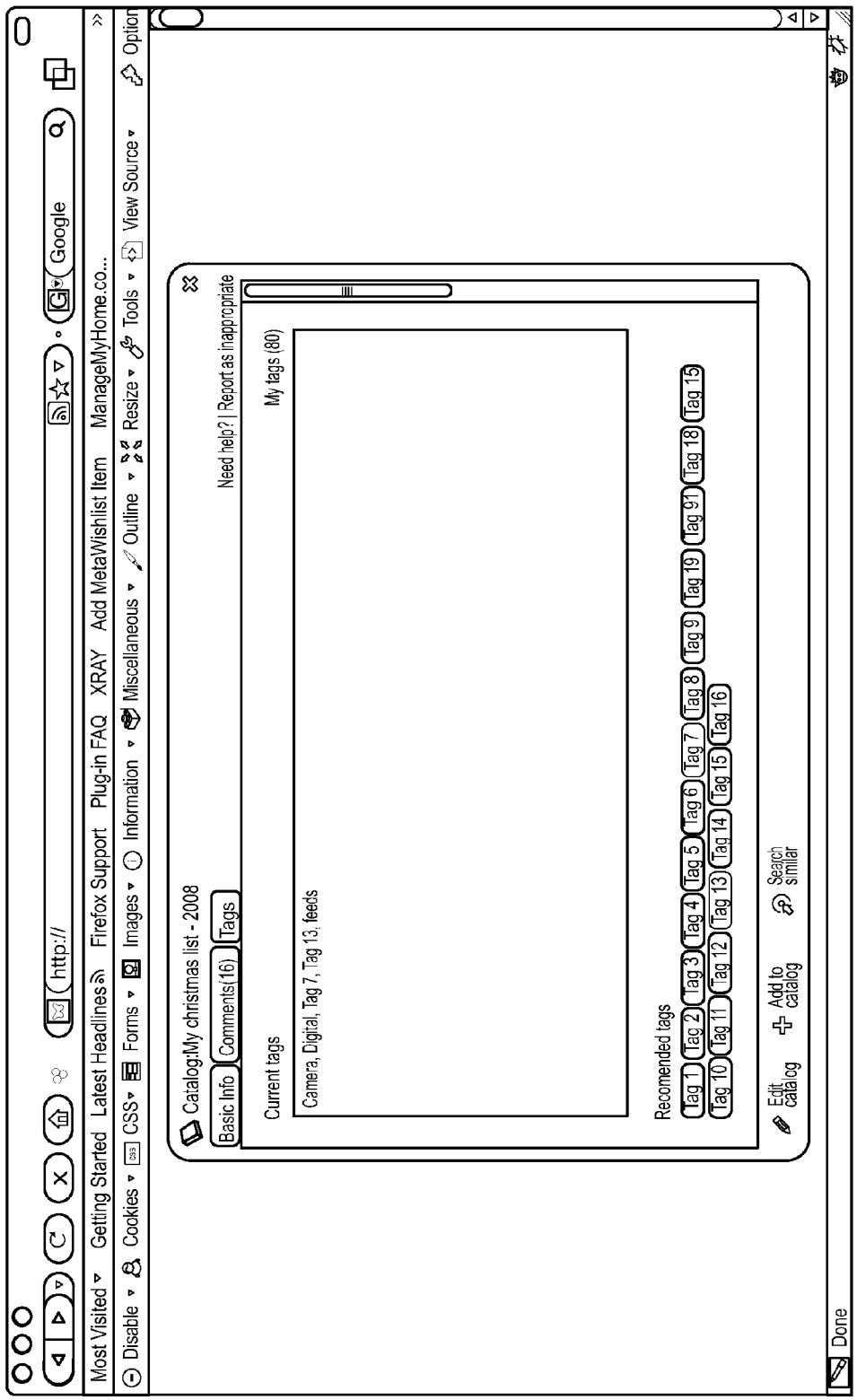
FIG. 42 shows a user interface according to an embodiment of the present disclosure.
Figure 43:
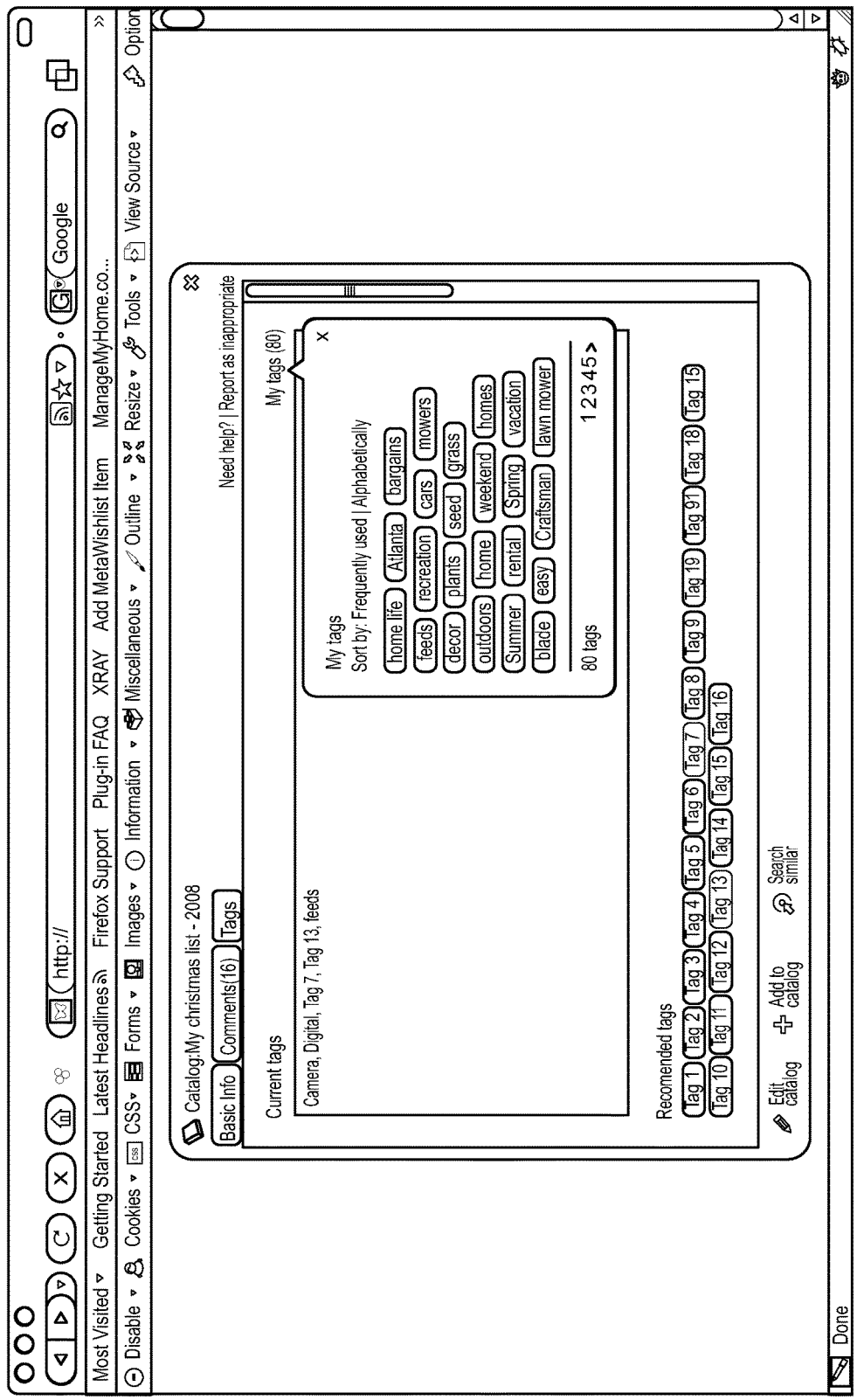
FIG. 43 shows a user interface according to an embodiment of the present disclosure.

While traversing search results or artifacts in general, the user is provided with the ability to quickly add any artifact to a current or new catalog. As shown in FIG. 39, when a user hovers the user's mouse pointer over an artifact, a dialog box is displayed that provides the option to add the artifact to a catalog. Alternatively, the user may drag and drop an artifact from the primary display into a catalog, as illustrated in FIG. 40. In either instance, the catalog manager 440 is invoked. As shown in FIG. 41, if the selected artifact is being added to a new catalog, the user may be required to enter a title and a brief description of the catalog. The user may also be asked to optionally select one or more tags to associate with the catalog, wherein tags are used to enhance search accuracy as well as to establish links and relationships with other artifacts in the database 280. The user may enter these tags manually or, as shown in FIG. 42, the user may also select from a number of predefined tags. Additionally, as shown in FIG. 43, the user may create the user's own list of frequently used tags, from which the user may then select at a later time.

b) Exemplary Vendor Experience

Figure 27:
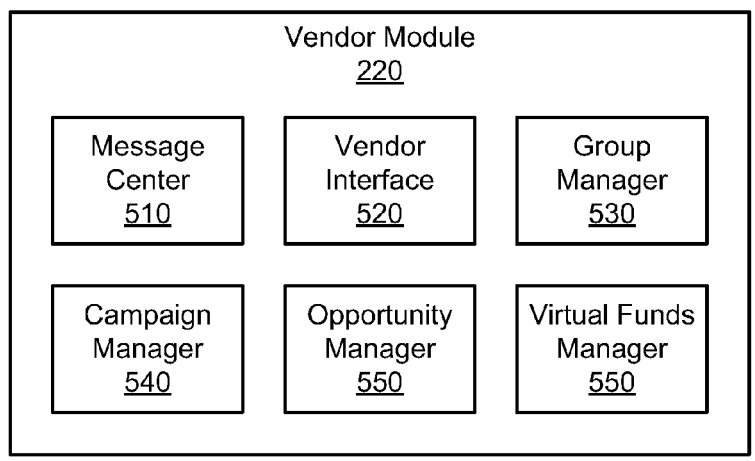
FIG. 27 shows a vendor module according to an embodiment of the present disclosure.

FIG. 27 illustrates a detailed block diagram of the vendor module 220, in accordance with various embodiments of the present invention. The vendor module 220 includes a vendor interface 520, which is a graphical user interface that allows a vendor 20 to interact with the system 200. By way of the vendor interface 520, the vendor 20 has access to the other components of the vendor module 220.

Figure 45:
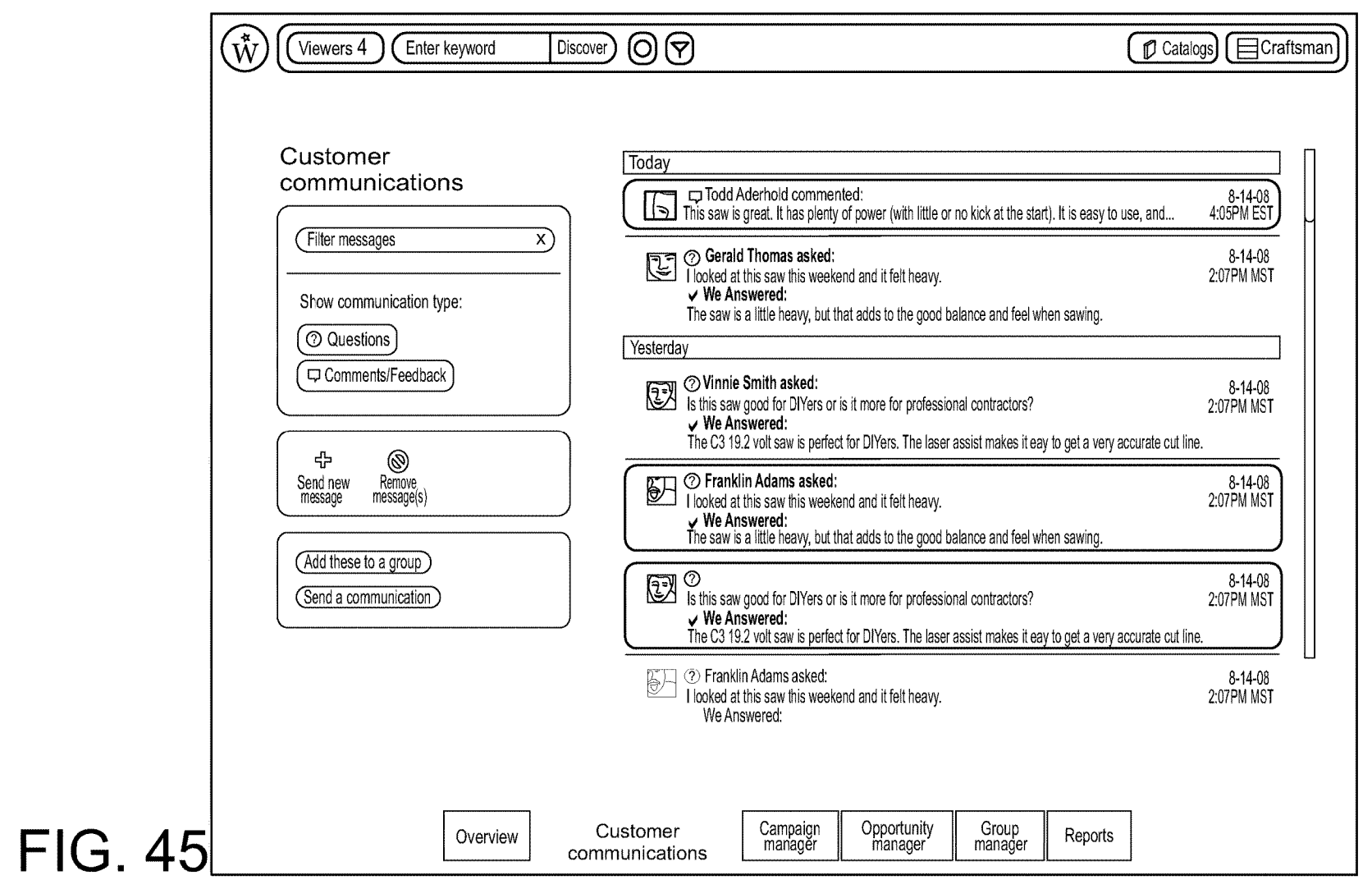

As with the consumer side of the system 200, a vendor may establish a vendor account. The vendor can then access the other components of the vendor module 220. The vendor module 220 includes a message center 510, similar to the consumer's message center 410, through which a vendor is able to send and receive e-mails and instant messages to and from consumers 10 and other vendors 20. FIG. 45 illustrates an example screenshot of one possible user interface for a message center 510.

Figure 46:
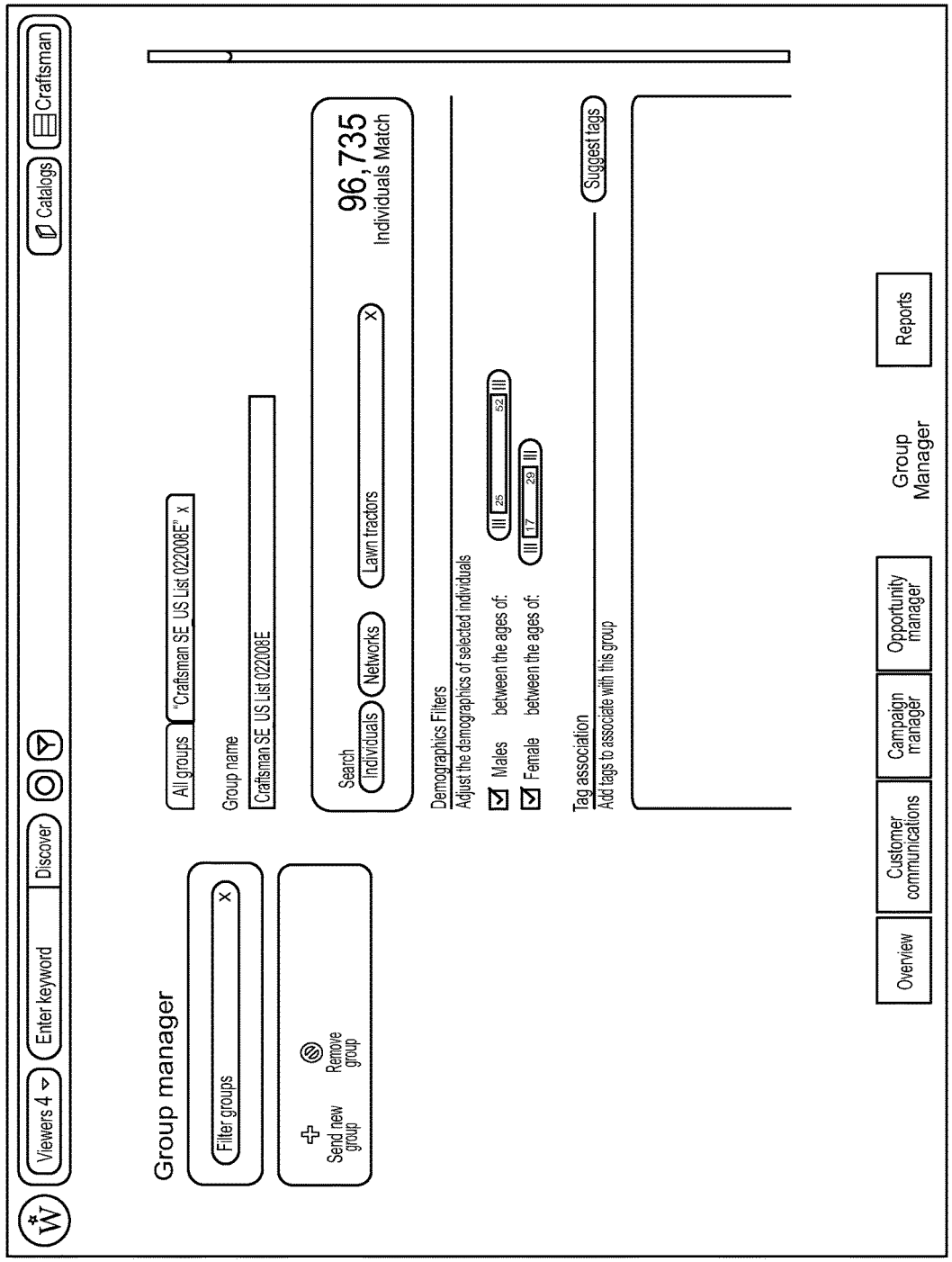
FIG. 46 shows a user interface according to an embodiment of the present disclosure.
Figure 47:
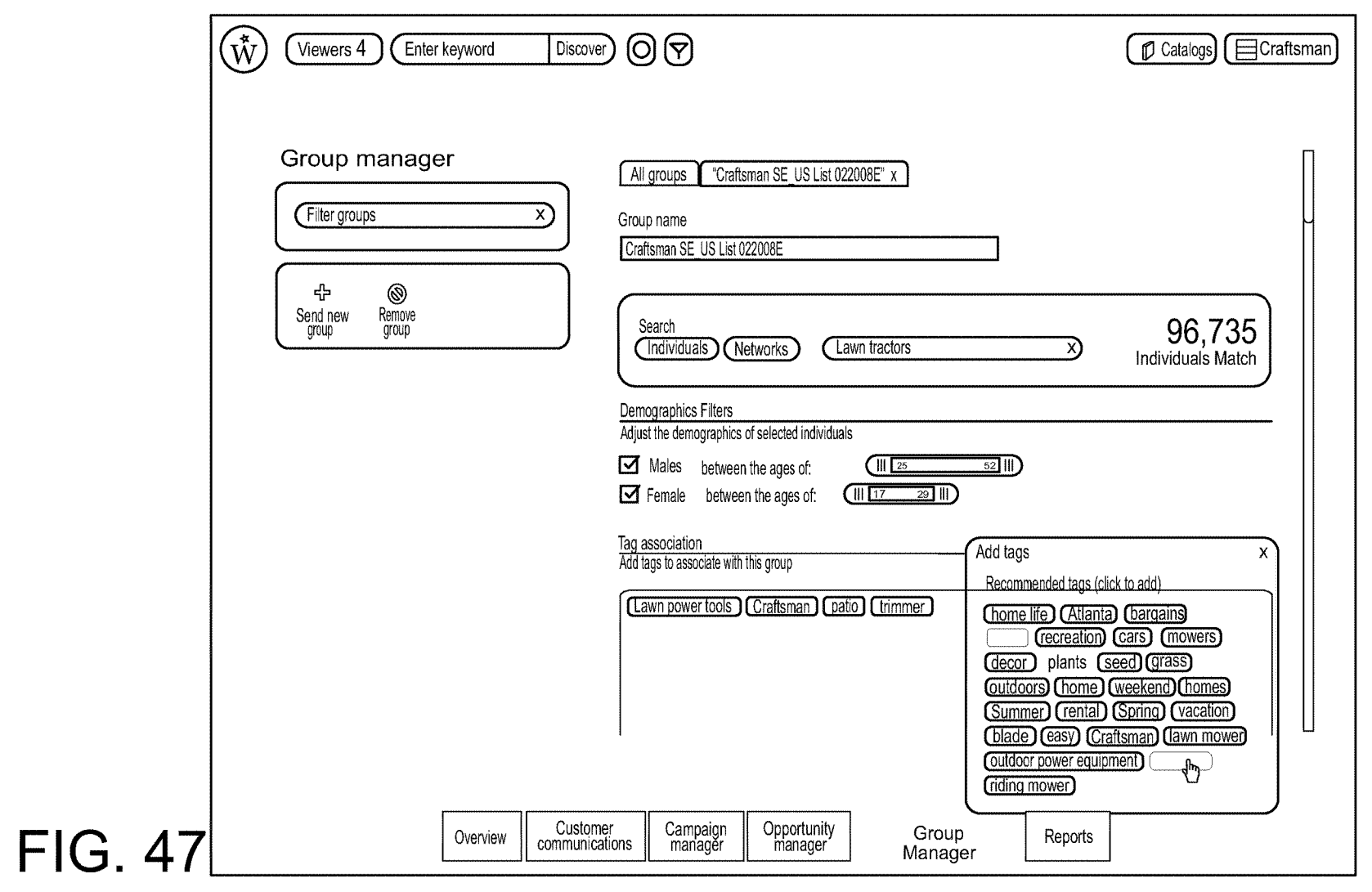
Figure 48:
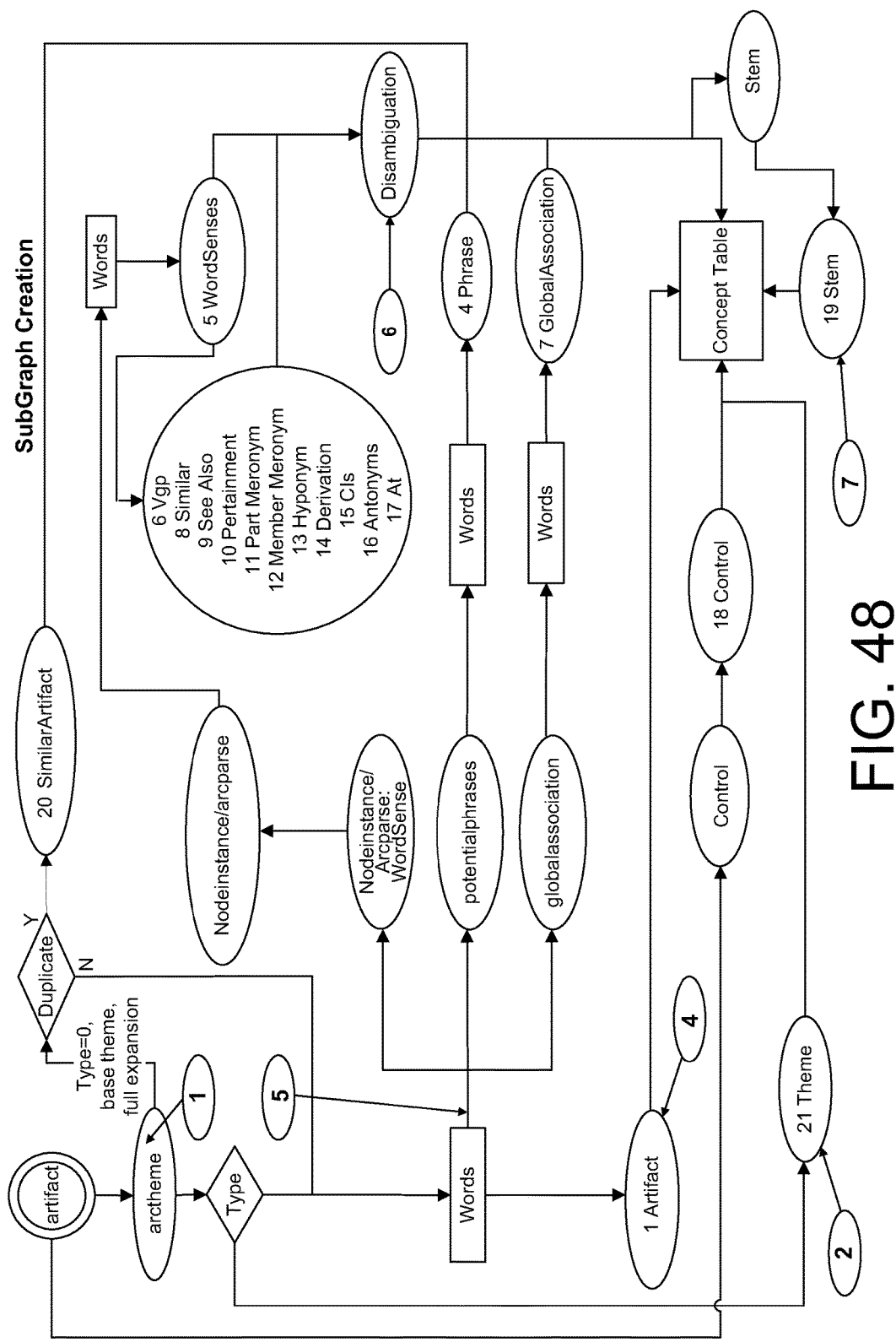
FIG. 48 shows a flow diagram according to an embodiment of the present disclosure.

The vendor module 220 also includes an opportunity manager 550, which allows the vendor 20 to create and manage commercial opportunities, e.g., advertisements, as discussed above. Opportunities may range in purpose from offering a sale price to a consumer 10 on a particular product or service to offering an incentive for a consumer 10 to participate in a survey, provide a product review, or the like. Additionally provided is a group manager 530, such as the one illustrated in FIGS. 46 and 47, but not limited thereto. Using the group manager 530, a vendor 20 can define target groups to which opportunities and/or campaigns (discussed below) are directed. These target groups can be defined based on a number of factors, including but not limited to geography, demographics and interests expressed either explicitly in a user profile or implicitly through a user's browsing habits.

The vendor module 220 also includes a campaign manager 540, which allows the vendor 20 to define and manage a number of promotional campaigns. Campaigns describe what the vendor 20 wants to accomplish with the opportunities it has created. One important benefit of the campaigns and the campaign manager 540 of the present system is that the vendor 20 does not need to conduct substantial market research in order to be able to spell out how and when opportunities that are part of the campaign should be presented. Consider the example of a consumer 10 who needs to buy a new car. In many cases, the consumer 10 may first settle on a budget for the car, in which case the consumer 10 will likely want to seek preapproval for an auto loan. The consumer may then consult a number of consumer reports and product reviews to narrow down the car models from which to choose. The consumer 10 may then want to find out which nearby car dealerships have one or more of these models in stock to test drive and ultimately purchase. After the purchase, the consumer may also need to take out a new car insurance policy.

At every step of the process just described, one or more vendors 20 may want to present one or more opportunities. However, it will be appreciated that certain opportunities are more appropriate in certain contexts than they are in others. While the above car purchase example is somewhat simplistic, it will also be appreciated that other campaigns are far more complex and would ordinarily require far more market research in order to appropriately present an opportunity. In various embodiments of the present invention, however, such extensive market research and specification of campaign details is not necessary. This is because system 200 is already equipped to analyze and consider the consumer graph, including the context in which a given consumer 10 is browsing, and can therefore deliver opportunities accordingly. Additionally system 200 can track how consumers 10 react to certain opportunities presented in certain contexts and adjust, through use of one or more agents, its implementation of a vendor's campaign accordingly.

The vendor module 220 also includes a virtual funds manager 560 for managing virtual funds associated with the user's account. The virtual funds manager 560 is discussed in greater detail in the following section.

c) Example of Monetization

A host of a system according to an embodiment may collect, and occasionally even redistribute, royalties in response to certain events. These events may be, for example, a user purchasing a good or service through the system, a user viewing an opportunity, or the like. While the following discussion may at times only refer to the purchase of a good or service, it will be appreciated that any other royalty-triggering event is equally applicable. For the purposes of this discussion, the party being charged the royalty shall be considered the vendor. In order to facilitate the charging and distribution of royalties without having to be constantly crediting and debiting actual bank accounts, user accounts may include virtual funds accounts which can be accessed and managed via virtual funds managers 450 and 560. Virtual funds may be purchased, transferred from user to user, and ultimately redeemed for goods, services, and/or cash equivalents. The dollar-to-virtual-fund exchange rate need not necessarily be 1:1. Instead, it may be desirable to have an exchange rate of, for example, 10 virtual dollars for every one actual dollar (10 virtual cents for each actual sent).

Such an exchange rate thereby allows for the transfer of "micro payments" (i.e., payments of less than a penny), which may be insignificant in and of themselves, but which may add up significantly in the aggregate.

Upon the occurrence of a royalty-triggering event, the royalty module 270 of system 200 determines a corresponding base royalty for the event. This base royalty may then be increased or reduced based on a number of factors. As discussed above, various embodiments may provide a graphical representation of a plurality of artifacts, where the artifacts are organized within the graphical representation based on relevance. To that end, each of the artifacts displayed at any one time may be assigned a corresponding relevance score or weight, as noted above, to the current context. If the royalty-triggering event relates to one of the displayed artifacts, the royalty may be weighted based on the relevance score. For example, if a user searches for "football," the search results may include a football, which may have a relevance score of 99%, and a football jersey, which may only have a relevance score of 80%. In this example, the royalty for a purchase of the football may be reduced by a factor of 0.99, while a purchase of the Jersey may be reduced by a factor of 0.80.

Figure 34:
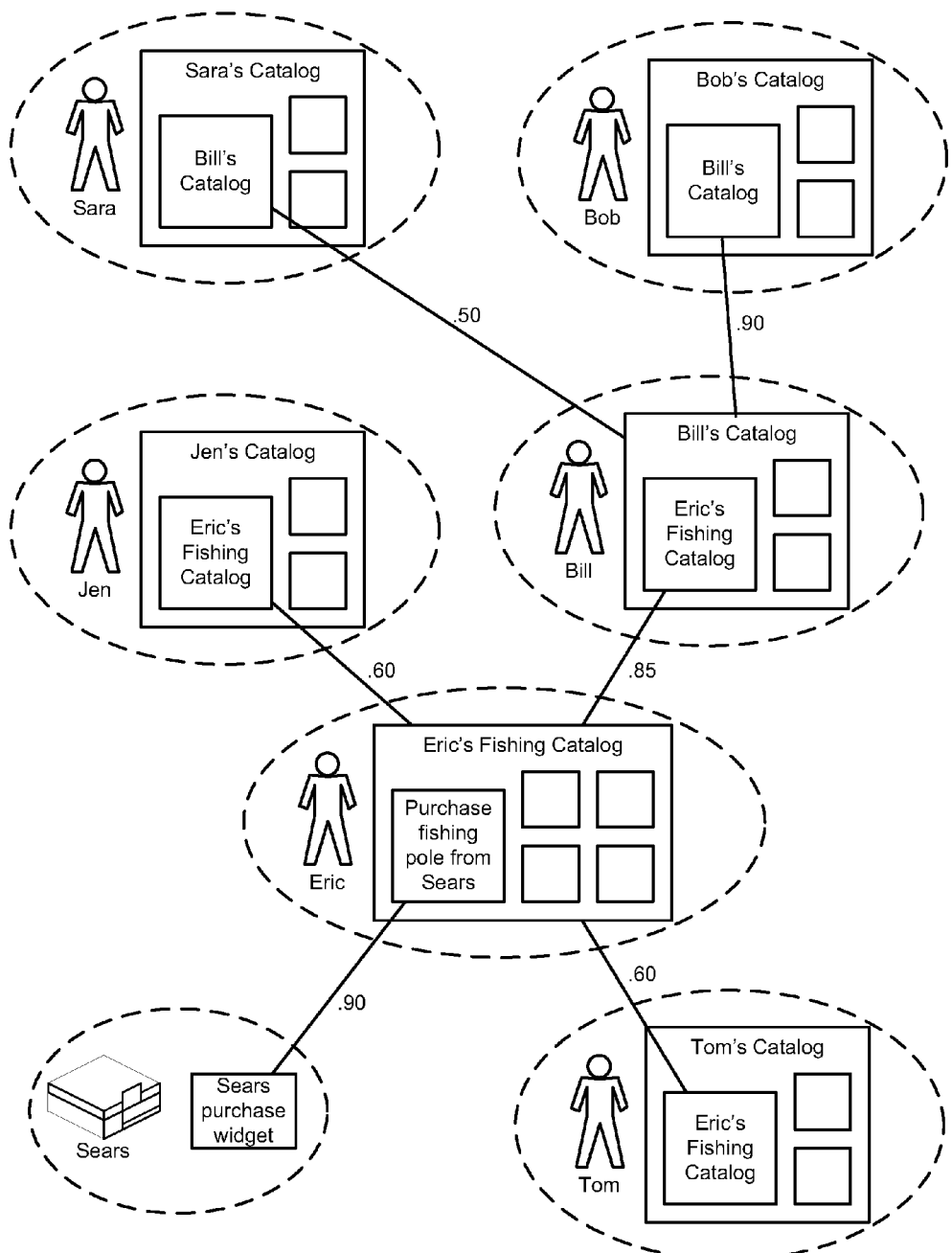
FIG. 34 shows user interrelationships according to an embodiment of the present disclosure.

Another factor based upon which royalties may be adjusted is the number of "hops" or "degrees of separation" between the royalty-triggering artifact or node and the original context. This concept is illustrated in FIG. 34, which shows interrelationships between a group of users. In this example, the vendor Sears provides a purchase widget. Another user, Eric, has put together a catalog called "Eric's Fishing Catalog," which includes a link to the Sears purchase widget to enable the purchase of a particular fishing pole. In addition, Jen, Bill and Tom have each included Eric's Fishing Catalog in their respective catalogs. Further, Sarah and Bob have each included Bill's Catalog in their respective catalogs. In this case, because of the nesting of the Sears purchase widget within Eric's Fishing Catalog, which is nested within Bill's Catalog, which is in turn nested within Sarah's Catalog, a user who is perusing Sarah's Catalog can directly use the Sears purchase widget to purchase a fishing pole. However, because the Sears purchase widget in Sarah's Catalog, through repeated nesting, is actually three degrees of separation from Sears, Sears may be charged a lesser royalty than if the fishing pole were purchased by way of Eric's Fishing Catalog, which is only one degree of separation from Sears.

In addition to charging a vendor a royalty, a portion of the royalty charged may in turn be paid to various users of the system, thereby encouraging full participation in the system by the users. Referring again to FIG. 34, in addition to charging Sears a royalty for the sale of a fishing pole via the system, the royalty module 270 may also pay a portion of the royalty to Sarah, Bob, Jen, Bill, Eric and Tom, by virtue of the fact that they have all either directly or indirectly linked to the Sears purchase widget for purchasing the fishing pole. A portion of the royalty may similarly be paid to any other users not shown that likewise have linked to the Sears purchase widget. In one embodiment, the amount of the royalty to be paid may be adjusted based on the number of hops between a given user and the royalty-triggering artifact. In the present example, Jen, Bill and Tom may each receive a smaller royalty than Eric, and Sarah and Bob may receive an even smaller royalty yet. Moreover, in one embodiment, royalties may not be paid at all to users that are more than a predetermined number of hops from the royalty-triggering artifact. For example, if the limit were two hops, neither Sarah nor Bob would receive a portion of the royalty.

Another factor by which royalties paid may be adjusted is the link strength between the user and the royalty-triggering artifact. In one embodiment, each link between two artifacts has an associated link strength as described an illustrated previously. As shown in FIG. 34, the link strength between Bill's Catalog and Eric's Fishing Catalog is 0.85, while the link strength from Jen's and Tom's respective catalogs to Eric's Fishing Catalog are each 0.60. Accordingly, Bill would receive a greater portion of the royalty than would Jen and Tom. It should be appreciated that any combination of the factors discussed above may be used to not only determine the royalty to be charged to the vendor but also to determine what portion of the royalty, if any, is to be paid to other users.

d) Exemplary Social Commerce Process

With reference to FIGS. 28-33, flowcharts 600, 645A, 740A, 650A, 1000, and 660A each illustrate example steps used by various embodiments of the present technology for a social commerce network 200. Flowcharts 600, 645A, 740A, 650A, 1000, and 660A include processes that, in various embodiments, are carried out by a processor under the control of computer-readable and computer-executable instructions. Although specific operations are disclosed in flowcharts 600, 645A, 740A, 650A, 1000, and 660A, such operations are examples. That is, embodiments are well suited to performing various other operations or variations of the operations recited in flowcharts 600, 645A, 740A, 650A, 1000, and 660A, including operations and functionality discussed above. It is appreciated that the operations in flowcharts 600, 645A, 740A, 650A, 1000, and 660A may be performed in an order different than presented, and that not all of the operations in flowcharts 600, 645A, 740A, 650A, 1000, and 660A may be performed. Where helpful for the purposes of illustration and not for limitation, FIGS. 28-33 will be described with reference to FIGS. 24-27 and 34, which illustrate hypothetical situations in which embodiments may be implemented.

FIG. 28 illustrates a flowchart 600 for a process of providing a social commerce network, in accordance with various embodiments of the present invention. Flowchart 600 may begin at block 605, where a database of data items, such as database 280, is provided.

Blocks 610-630 illustrate steps for a creating a user profile. It should be appreciated that these operations need only be performed once. At block 610, a request to create a new user profile is received, and a new user profile is then created in response to the request (block 615). Once a user profile is created, additional details relating to the user may be requested (block 620). These additional details may include, but are not limited to, additional contact information of the user, the user's demographic information, and the user's interests. Once such additional details are received (block 625), the new user profile is subsequently populated with the details (block 630).

Figure 38:
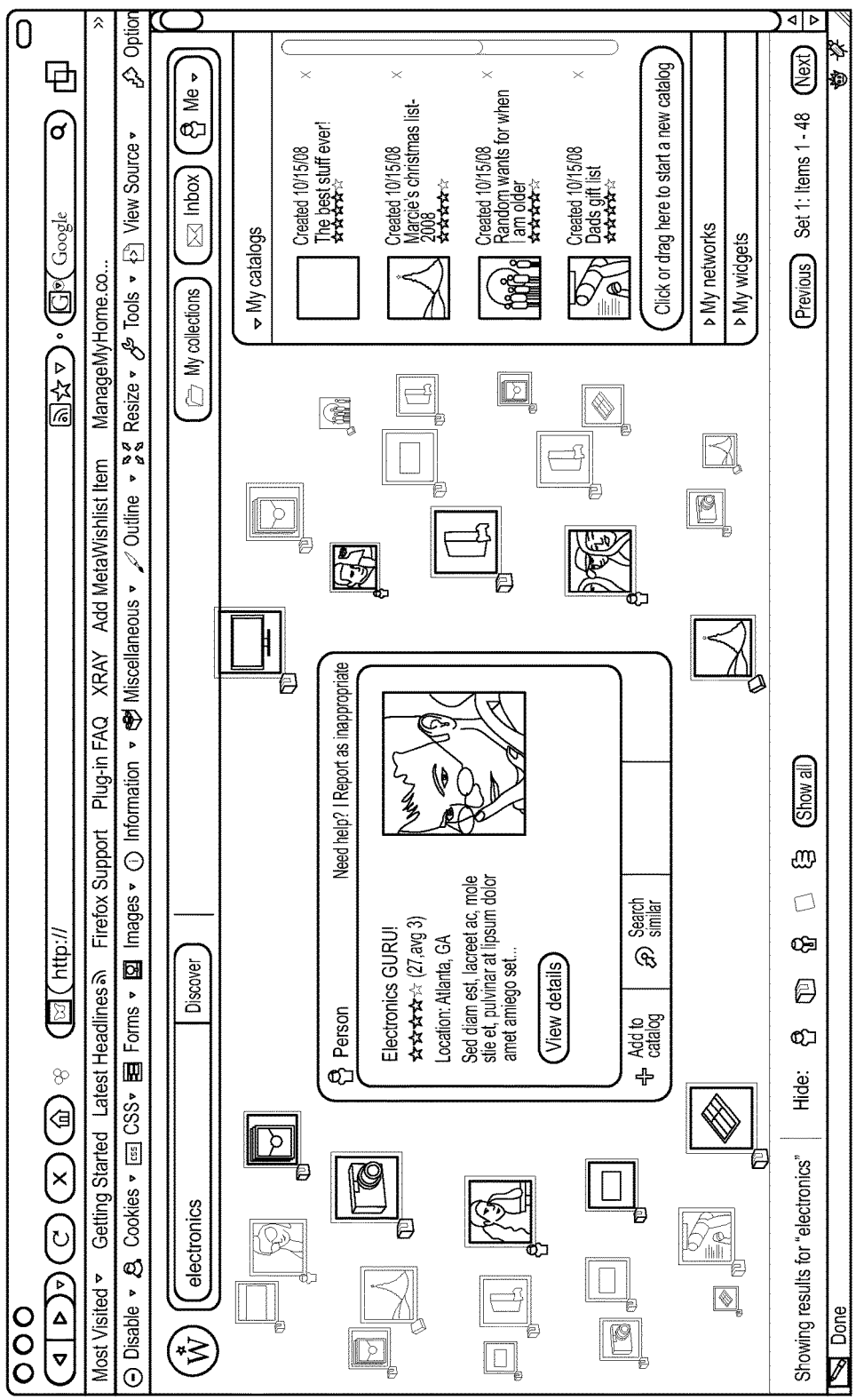
FIG. 38 shows a user interface according to an embodiment of the present disclosure.

At block 635, a graphical representation of a plurality of data items is provided. In one embodiment, this may be achieved substantially in the manner shown in FIGS. 35 and 38, but is not limited as such. In the illustrated embodiments of FIGS. 25 and 28, a data item or artifact that is considered most relevant to the current context is displayed prominently in the center of the screen. From this artifact, additional artifacts fan out towards the periphery of the screen. In one embodiment, the distance of an artifact from the center, the size of the artifact, and degree of transparency of the artifact are functions of the relevance of that artifact to the current context. Once the grouping of artifacts has been displayed, the user has several options relative to interacting with the system. For example, the user may choose to view details of a data item 640. In one embodiment, this may be achieved by activating a viewer widget, which in turn generates a display substantially as that shown in FIG. 36, but is not limited as such. If the user selects a data item other than the most prominently displayed data item, a traversal process 645 is initiated.

Figure 29:
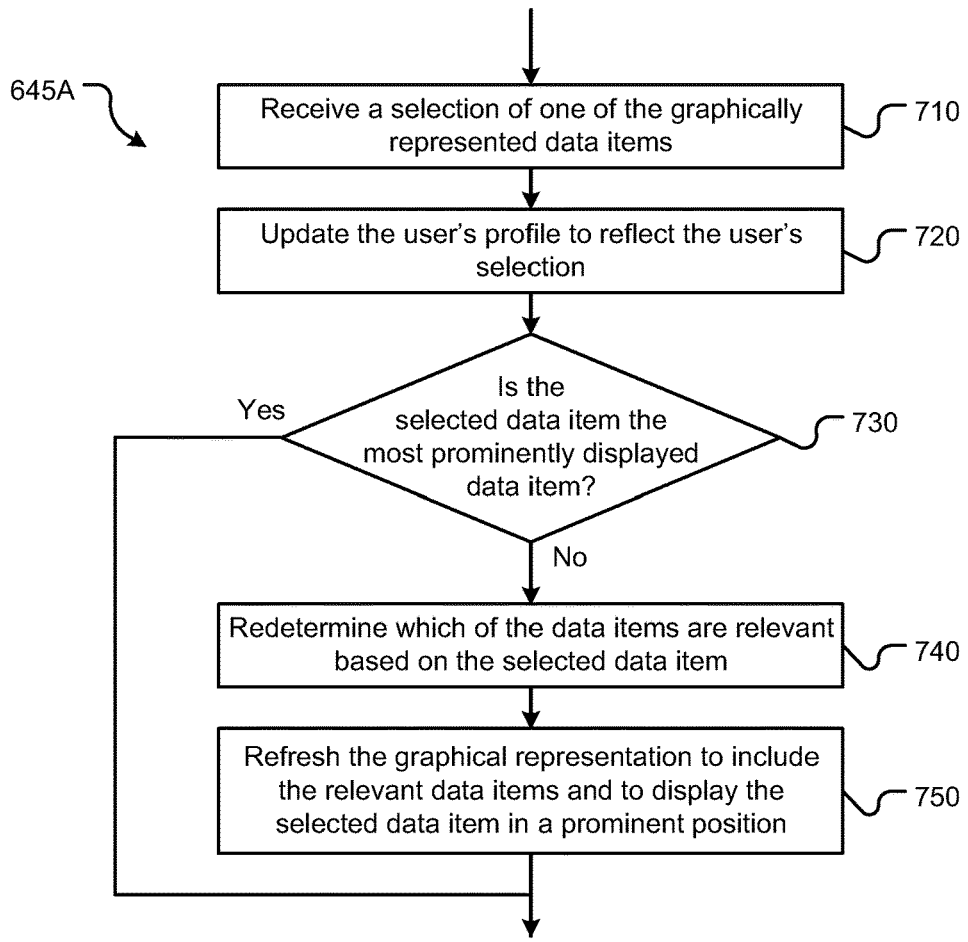
FIG. 29 shows a process for traversing data items according to an embodiment of the present disclosure.

FIG. 29 illustrates a flowchart 645A of a process for traversing data items, in accordance with an embodiment of the present invention. At block 710, a selection of one of the graphically represented data items is received. At block 720, the user's profile is updated to reflect the selection of the data item. This may involve, for example, updating a browsing history associated with the user. At block 730, a determination is made as to whether the selected data item is the currently most prominently displayed data item. If yes, then no further action is necessary. If not, the system redetermines which data items are relevant to the current context which has been updated to reflect the selection of the selected data item (block 740). The graphical representation is then updated to include the data items that were just determined to be relevant, while also moving the selected data item to a prominent position (e.g. center) within the graphical representation (block 750).

Figure 30:
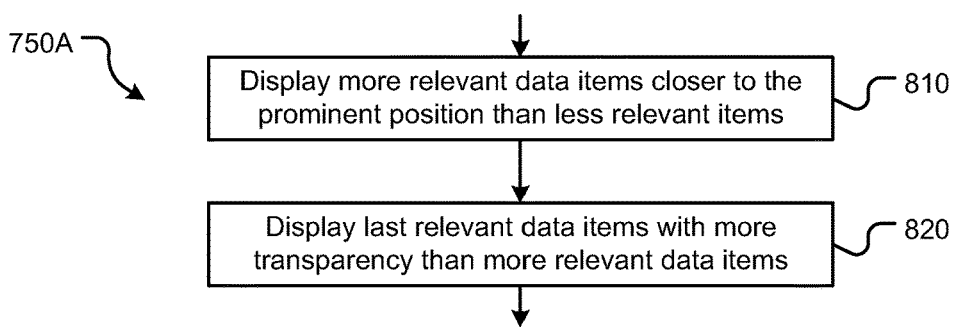
FIG. 30 shows a process for refreshing a graphical representation according to an embodiment of the present disclosure.

FIG. 30 illustrates a flowchart 750A for refreshing the graphical representation, in accordance with an embodiment of the present invention. At block 810, the system displays more relevant data items closer to a prominent position of the display and less relevant data items further from the prominent position. At block 820, the system adjusts the transparency of the graphically represented data items so that less relevant data items appear more transparent than more relevant data items.

Figure 31:
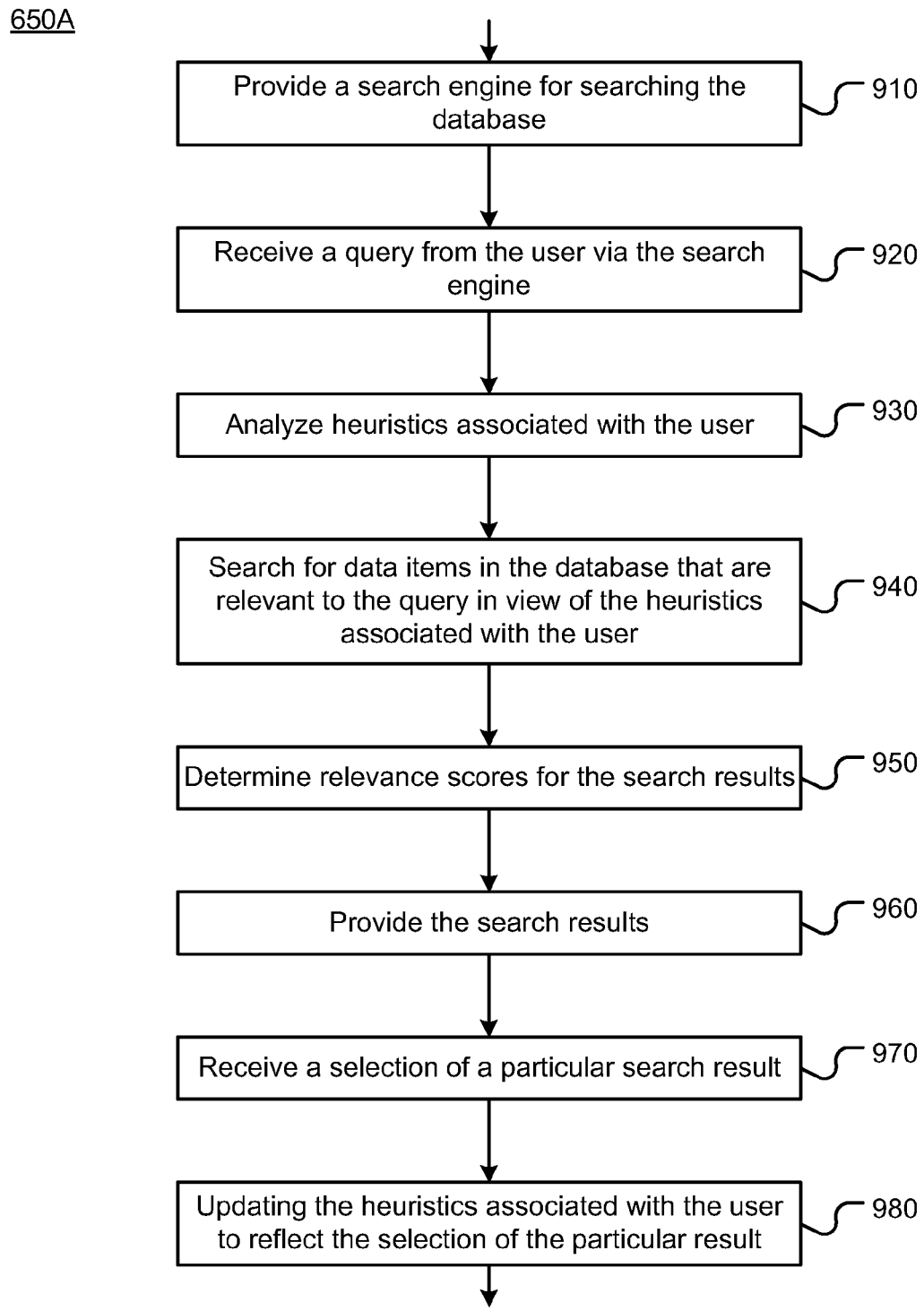
FIG. 31 shows a process for conducting a search according to an embodiment of the present disclosure.

In addition to traversing and viewing the data items, the user is also able to perform a search 650. It should be appreciated that the search 650 may be achieved in a number of ways. For example, FIG. 31 illustrates a flowchart 650A for a process of conducting a search, in accordance with various embodiments of the present invention. At block 910, a search engine capable of searching the database 280, such as search engine 230, is provided. At block 610, a query is received from a user via the search engine. The search engine then analyzes heuristics associated with the user (block 930) and searches for data items in the database that are relevant to the query in view of the heuristics associated with the user (block 940). In one embodiment, the search engine may determine relevance scores for the search results (block 950). The search engine then provides the search results to the user (block 960). In one embodiment, this may include displaying graphical representations of the data items such that more relevant data items are more prominently displayed than less relevant ones, such as the graphical display of the search results shown in FIG. 38. As discussed above, one valuable feature of various embodiments is the ability to adapt the system's concept of what is relevant to individual users, rather than to the general masses. In other words, embodiments not only consider the search terms, but they also consider the user's graph including the context in which the search was made, known characteristics of the user, etc. To that end, when a selection of a particular search result is received (block 970), the aforementioned heuristics associated with the user are updated to reflect the selection of the particular result (block 980).

Figure 32:
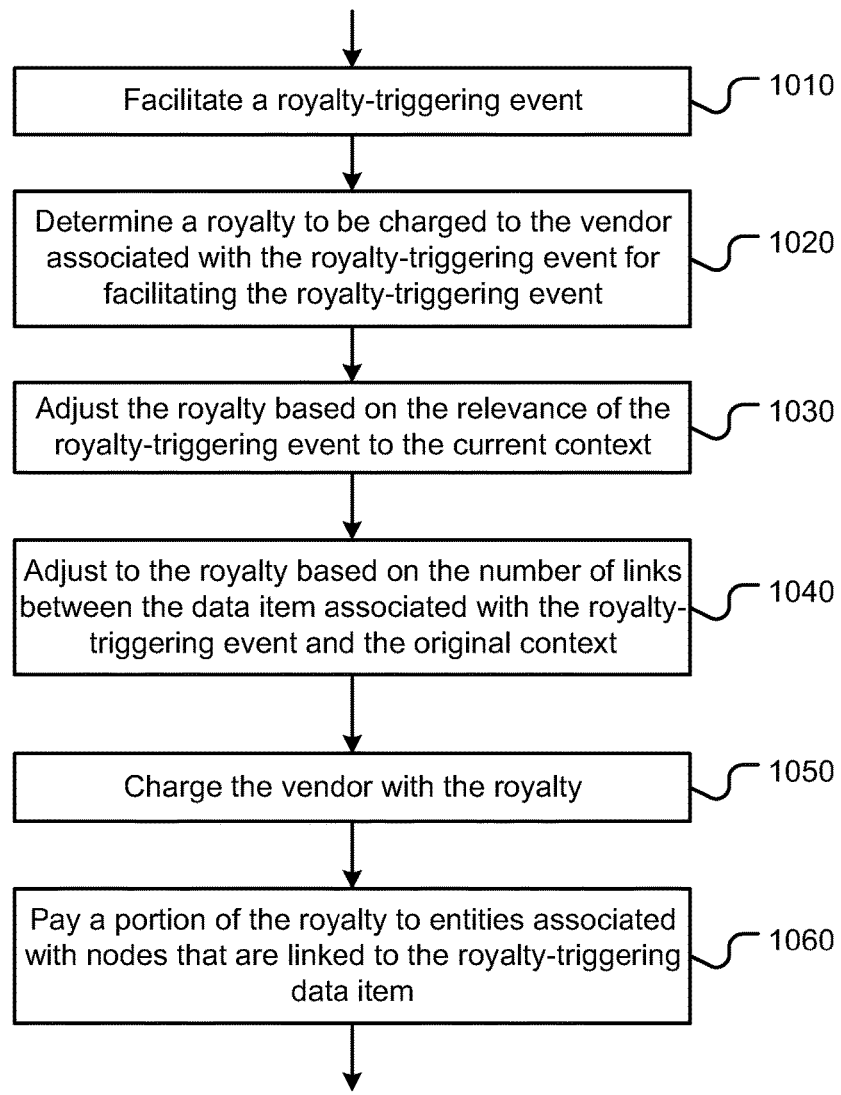
FIG. 32 shows a process for allocating royalties according to an embodiment of the present disclosure.

A user also has the ability to purchase a good or service (block 655). As discussed above, a purchase of a good or service, in addition to other types of events, may be a royalty-triggering event, where a vendor is charged a royalty and, in some cases, other users are given portions of the royalty. FIG. 32 illustrates a flowchart 1000 for a process for allocating royalties, in accordance with various embodiments of the present invention. At block 1010, a royalty-triggering event, such as a purchase of a product or service, the presentation of a commercial opportunity, or the like, is facilitated by the system. At block 1020, a royalty to be charged to the vendor associated with the royalty triggering event is determined. This may involve, for example, determining a flat fee associated with the royalty-triggering event or calculating a percentage of a sale, but is not limited as such. In various embodiments, the royalty may then be adjusted based on various factors. For example, the royalty may the adjusted based on the relevance of the royalty-triggering event to the current context (block 1030). The royalty may also be adjusted based on the number of links between the data item associated with the royalty-triggering event and the original context (block 1040). Once the final, adjusted royalty amount is determined, the vendor is charged to the royalty (block 1050). In some embodiments, a portion of the royalty charged to the vendor may actually get paid to one or more other users who have either directly or indirectly linked to the royalty-triggering event (block 1060). In one embodiment, the apportionment of the royalty to the other users may be determined substantially as described above with respect to FIG. 34.

Figure 33:
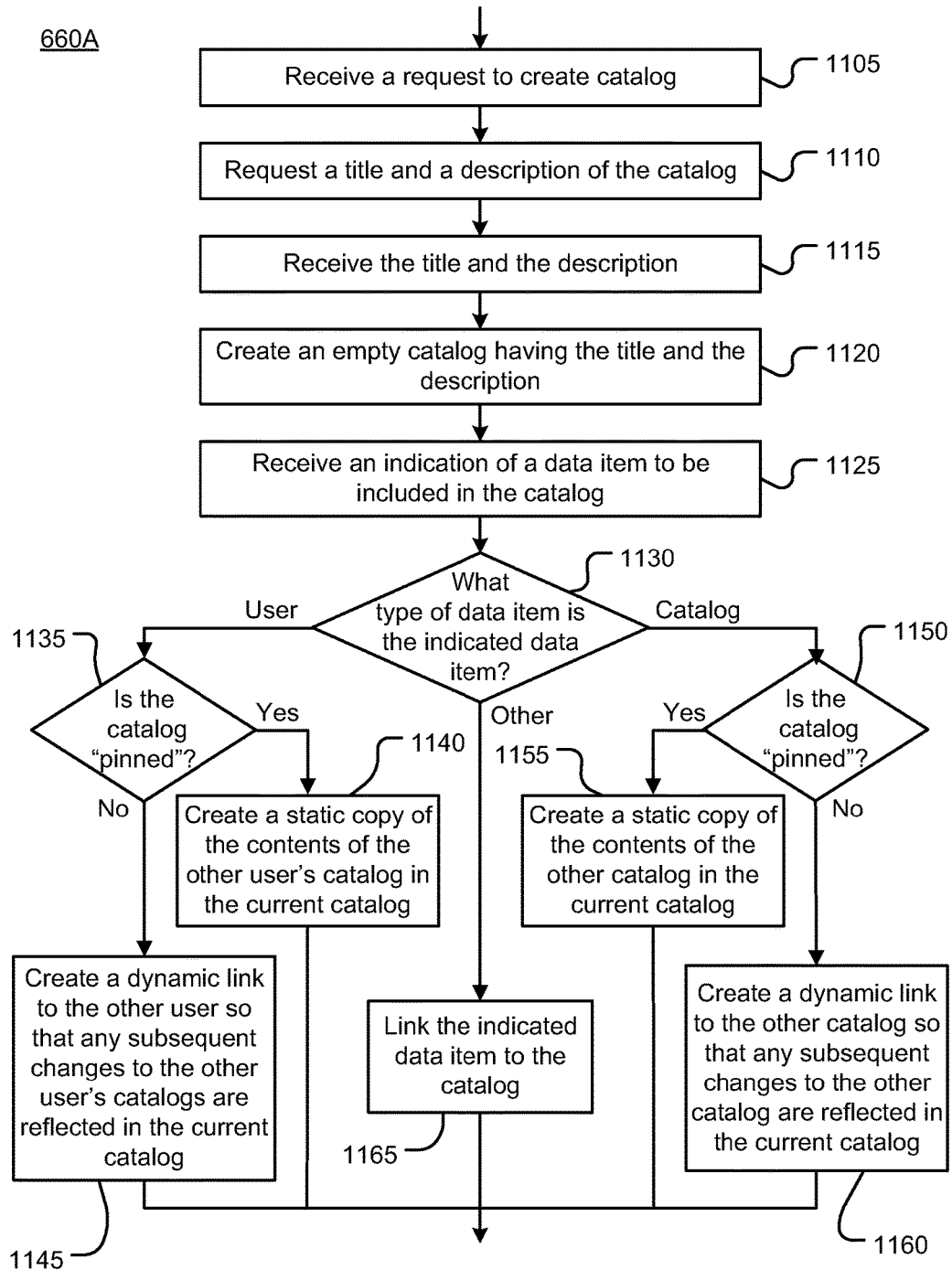
FIG. 33 shows a process for managing catalogs according to an embodiment of the present disclosure.

With reference again to FIG. 28, a user also has the ability to manage catalogs (block 660). Generally speaking, this involves creating and updating the user's catalogs. As discussed above, a catalog is essentially a collection of other data items stored in the database 280. FIG. 33 illustrates a flowchart 660A of an example process for managing catalogs, in accordance with various embodiments of the present invention. At block 1105, a request to create a catalog is received. In response, the system may then request a title and description of the catalog (block 1110). Once the title and the description are received (block 1115) and empty catalog having the title and the description is created (block 1120). Once this shell of the catalog has been created, the user may then begin to add data items of the users choosing into the new catalog. Accordingly, at block 1125, an indication of a data item to be included in the catalog is received.

Some data items, such as products or other general information data items, may be relatively static in that their content changes little, if at all. On the other hand, some data items such as catalogs and users, which may include one or more other nested items therein, have a much more dynamic content. Thus, if a user indicates that a first catalog should be included in a second catalog, the user has the option of "pinning" (block 1150) the first catalog into the second catalog so as to fix the contents of the first catalog from the perspective of the second catalog. Thus, if the first catalog is pinned, a static copy of its contents are made in the second catalog (block 1155). If the first catalog is not pinned, a dynamic link to the first catalog is created in the second catalog so that any subsequent changes to the first catalog are reflected in the second catalog (1160). Similar operations may be performed relative to the inclusion of a user in a catalog, depending on whether the user is pinned (blocks 1135-1145). Otherwise, data items added to a catalog are typically added by linking the indicated data item to the catalog (block 1165).

Thus, various embodiments provide a social commerce network that is able to analyze a user's behavior and profile so as to provide a more contextually relevant browsing experience. The more a particular user accesses a system according to an embodiment, the more the system is able to learn about how the user approaches browsing. The net result is that the system is able to predict with increasing accuracy what data the user will likely find relevant, and the system is able to do this on a user-by-user basis.

In addition to the built-in intelligence, embodiments provide a mechanism for substantially all users of the system—not just traditional vendors—to receive "monetary" benefits for their participation in the system and more particularly for their participation in the community and social networking aspects of the system.

While specific embodiments of the invention have been described in detail, it will be appreciated by those skilled in the art that various modifications and alternatives to those details could be developed in light of the overall teachings of this disclosure. Accordingly, the particular embodiments disclosed are meant to be illustrative only and not limiting as to the scope of the invention which is to be given the full breadth of the appended claims and any equivalents thereof.

What is claimed is:

1. A non-transitory computer readable media having instructions stored thereon, which instructions, when executed by a processing device, perform steps comprising:
   establishing a first user profile corresponding to a first user;
   establishing a second user profile corresponding to a second user;
   receiving a first request from the first user, via a graphical user interface of a first wireless communication device operatively coupled to an online social network, to create a first catalog;
   creating the first catalog;
   receiving a second request from the first user specifying at least one data item from a database of data items to be included in the catalog;
   updating the first catalog to include the at least one data item specified in the second request;
   receiving a third request from the second user to create a second catalog,
   creating the second catalog that incorporates a third party dynamic catalog;
   pinning the third party dynamic catalog, wherein the pinned third party dynamic catalog is made static in the second catalog;
   receiving a fourth request from the second user specifying that the first catalog shall be incorporated into the second catalog;
   updating the second catalog to incorporate into the second catalog the first catalog;
   receiving a modification request to modify the first catalog;
   modifying the first catalog in accordance with the modification request;
   automatically modifying the second catalog so as to reflect in the first catalog that was previously incorporated into the second catalog the modification that was made to the first catalog in accordance with the modification request;
   causing a graphical user interface associated with the second catalog to enable searches of an external network and searches of the second catalog based on one or more search terms and context in which the search is made; and
   causing the graphical user interface to return search results of the second catalog in a multi-dimensional graphical format in which search results are graphically centered on a graphical element representing a most relevant search result and vary in size and transparency based on relevancy, wherein the graphical user interface of the second catalog is configured to display less relevant search results as graphical elements that are displayed farther from the most relevant search result, and wherein the graphical elements of the graphical user interface of the second catalog are configured to decrease in size and increase in transparency as distance increases from the graphical element representing the most relevant search result.

2. The non-transitory computer-readable media as recited in claim 1, wherein creating the first catalog comprises code for creating one or more links in the first catalog to the at least one of the data items specified in the first request.

3. The non-transitory computer-readable media as recited in claim 2, wherein creating the second catalog comprises code for creating a link in the second catalog to the first catalog.

4. A system, comprising:
   a mobile wireless communication device comprising at least one processor coupled to on-chip memory; and
   a database of data items including user profiles,
   wherein the mobile wireless communication device comprises:
   a display with a graphical user interface;
   a user profile manager for establishing a first user profile corresponding to a first user and a second user profile corresponding to a second user;
   a communications interface operable to receive a first request from the first user for the creation of a first catalog; and
   a catalog manager operable to create the first catalog in response to the first request,
   wherein the communications interface is further operable to receive a second request from the first user specifying at least one of the data items to be included in the catalog,
   wherein the catalog manager is further operable to update the first catalog to include at least one data item specified in the second request in response to the second request,
   wherein the communications interface is further operable to receive a third request from the second user to create a second catalog,
   wherein the catalog manager is further operable to create the second catalog that incorporates a third party dynamic catalog,
   wherein the catalog manager is further operable to pin the third party dynamic catalog, wherein the pinned third party dynamic catalog is made static in the second catalog,
   wherein the communications interface is further operable to receive a fourth request from the second user specifying that the first catalog shall be incorporated into the second catalog,
   wherein the catalog manager is further operable to update the second catalog to incorporate into the second catalog the first catalog,
   wherein the communications interface is further operable to receive a modification request to modify the first catalog,
   wherein the catalog manager is further operable to modify the first catalog in accordance with the modification request and cause a modification of the second catalog so as to reflect in the first catalog that was previously incorporated into the second catalog the modification that was made to the first catalog in accordance with the modification request, wherein a graphical user interface associated with the second catalog is configured to enable searches of an external network and searches of the second catalog based on one or more search terms and context in which the search is made, and wherein the graphical user interface of the second catalog is configured to return search results of the second catalog in a multi-dimensional graphical form in which search results are graphically centered on a graphical element representing a most relevant search result and vary in size and transparency based on relevancy, wherein the graphical user interface of the second catalog is configured to display less relevant search results as graphical elements that are displayed farther from the most relevant search result, and wherein the graphical elements of the graphical user interface of the second catalog are configured to decrease in size and increase in transparency as distance increases from the graphical element representing the most relevant search result.

5. The system as recited in claim 4, wherein during creation of the first catalog, the catalog manager is further operable to create one or more links in the first catalog to the at least one of the data items specified in the first request.

6. The system as recited in claim 5, wherein during creation of the second catalog, the catalog manager is further operable to create a link in the second catalog to the first catalog.

7. The non-transitory computer-readable media as recited in claim 1, comprising capturing information about the first user or the second user and organizing the captured information within a specific context.

8. The non-transitory computer-readable media as recited in claim 1, comprising capturing and organizing information based on a collective behavior of a latent network of users that is most closely associated to the first user or the second user in a given context.

9. The non-transitory computer-readable media as recited in claim 1, comprising:
capturing and connecting social user behaviors; and
capturing and organizing information based on social user behaviors.

10. The non-transitory computer-readable media as recited in claim 1, comprising:
creating commercial operations that can be re-composed to support context specific processes that are personalized to users.

11. The non-transitory computer-readable media as recited in claim 10, wherein the commercial operations are deployed based on a user's preference across multiple distributed touchpoints.

12. The non-transitory computer-readable media as recited in claim 1, comprising:
integrating third party data stores on the fly in relating to dynamic set of life events of users.

13. The non-transitory computer-readable media as recited in claim 1, comprising:
capturing information; and
create mashups based on a behavior of other users that are determined to be similar to the first user or the second user in a specific context.

14. The non-transitory computer-readable media as recited in claim 1, comprising:
inputting user credential into a login widget; and
displaying a list of widgets and information relevant to a particular session.

15. The non-transitory computer-readable media as recited in claim 14, comprising:
sending the input user credentials to a server; and
receiving an XML message that includes user profile information, the list of widgets to display, and the information relevant to the particular session.

16. The system as recited in claim 4, wherein the mobile wireless communication device is configured for entering text and selecting a widget control to create a publishable event.

17. The system as recited in claim 4, wherein the first catalog or the second catalog includes user behaviors, widgets, products, and other catalogs.

18. The non-transitory computer-readable media as recited in claim 1, wherein the first catalog or the second catalog includes user behaviors, widgets, services, and other catalogs.

19. The system as recited in claim 4, wherein each user profile comprises an integration of information from a plurality of sources.

20. The system as recited in claim 4, wherein the mobile wireless communication device is configured to provide tools that allow users to co-create semantic mashups with retailers.

* * * * *